United States Patent
Freedman et al.

(10) Patent No.: US 9,748,989 B1
(45) Date of Patent: Aug. 29, 2017

(54) RAIN FADE MITIGATION IN A SATELLITE COMMUNICATIONS SYSTEM

(71) Applicant: RKF Engineering Solutions, LLC, Washington, DC (US)

(72) Inventors: Jeffrey Freedman, Laurel, MD (US); Erik Halvorson, Vienna, VA (US); Michael Mandell, Farmington Hills, MI (US); Ted Kaplan, North Potomac, MD (US); Arnold Berman, Washington, DC (US); Brian Sipos, Alexandria, VA (US); Scott Conrad Markley, Washington, DC (US); David Marshack, Bethesda, MD (US)

(73) Assignee: RKF Engineering Solutions, LLC, Washington, DC (US)

( * ) Notice: Subject to any disclaimer, the term of this patent is extended or adjusted under 35 U.S.C. 154(b) by 41 days.

(21) Appl. No.: 14/194,085

(22) Filed: Feb. 28, 2014

Related U.S. Application Data

(63) Continuation-in-part of application No. 13/841,572, filed on Mar. 15, 2013, now Pat. No. 9,680,559.

(60) Provisional application No. 61/697,143, filed on Sep. 5, 2012, provisional application No. 61/770,392, filed on Feb. 28, 2013.

(51) Int. Cl.
*H04B 1/12* (2006.01)

(52) U.S. Cl.
CPC .................................... *H04B 1/12* (2013.01)

(58) Field of Classification Search
CPC .............. H04B 7/18519; H04B 7/2041; H04B 7/18513; H04B 7/18543; H04B 15/00; H04B 17/345; H04B 7/0617; H04B 17/309; H04B 1/0475; H04B 1/1027; H04B 1/123; H04B 7/061; H04B 7/0619; H04B 7/086;
(Continued)

(56) References Cited

U.S. PATENT DOCUMENTS

| 5,924,015 | A | * | 7/1999 | Garrison | ............ | H04B 7/18543 |
| | | | | | | 455/13.4 |
| 6,272,679 | B1 | * | 8/2001 | Norin | ................. | H04B 7/18513 |
| | | | | | | 455/13.4 |

(Continued)

FOREIGN PATENT DOCUMENTS

EP         2290842         3/2011

OTHER PUBLICATIONS

Raviraj Adve, "Optimal Beamforming," Dept. of Electrical and Computer Engineering, University of Toronto [online], [retrieved on Feb. 28, 2014]. Retrieved from the Internet: http://www.comm.utoronto.ca/~rsadve/Notes/BeamForming.pdf, 21 pages.

(Continued)

*Primary Examiner* — Ping Hsieh
*Assistant Examiner* — James Yang
(74) *Attorney, Agent, or Firm* — Fish & Richardson P.C.

(57) ABSTRACT

A beam plan that defines beams generated by a satellite that satisfy a set of communication service requirements is obtained. Fade condition information that indicates an amount of fade at particular geographic areas for one or more of the beams is obtained. A modification to the beam plan that mitigates the amount of fade at the particular geographic areas for the one or more of the beams is determined. The beam plan is modified based on the determined modification.

17 Claims, 20 Drawing Sheets

(58) Field of Classification Search
CPC .... H04B 7/15585; H04H 20/42; H04H 20/74;
H04H 40/90
See application file for complete search history.

(56) References Cited

U.S. PATENT DOCUMENTS

| | | |
|---|---|---|
| 6,289,201 B1 | 9/2001 | Weber |
| 6,421,528 B1 * | 7/2002 | Rosen ................ H04B 7/18513 455/13.3 |
| 6,697,619 B1 | 2/2004 | Hogberg |
| 6,871,045 B2 | 3/2005 | Rubin |
| 2006/0143617 A1 | 6/2006 | Knauerhase |
| 2007/0274226 A1 | 11/2007 | Tillotson |
| 2009/0059785 A1 | 3/2009 | Jogalekar |
| 2010/0039983 A1 | 2/2010 | Yee et al. |
| 2010/0315949 A1 | 12/2010 | Agarwal |
| 2013/0136054 A1 | 5/2013 | Gineste |
| 2013/0244570 A1 | 9/2013 | Park |
| 2013/0329630 A1 | 12/2013 | Becker |

OTHER PUBLICATIONS

Restriction Requirement issued in U.S. Appl. No. 13/841,572 dated Jan. 9, 2015, 7 pages.
Office Action issued in U.S. Appl. No. 13/841,572 dated May 7, 2015, 33 pages.
Office Action issued in U.S. Appl. No. 13/841,572 dated Jan. 4, 2016, 48 pages.
Final Office Action issued in U.S. Appl. No. 13/841,572 dated Aug. 19, 2016, 40 pages.
Notice of Allowance issued in U.S. Appl. No. 13/841,572 dated Feb. 27, 2017, 15 pages.

* cited by examiner

| Unified Beam Plan | | | |
|---|---|---|---|
| Beam # | Frequency | Beam Coefficients | Power Level |
| Beam 1 | Frequency 1 | Coefficients 1 | Power 1 |
| Beam 2 | Frequency 2 | Coefficients 2 | Power 2 |
| ... | ... | ... | ... |
| Beam N | Frequency N | Coefficients N | Power N |

| Requested Beam Powers ||
|---|---|
| Beam # | Power Level Change |
| Beam 1 | Power Change 1 |
| Beam 2 | Power Change 2 |
| ... | ... |
| Beam N | Power Change N |

FIG. 14

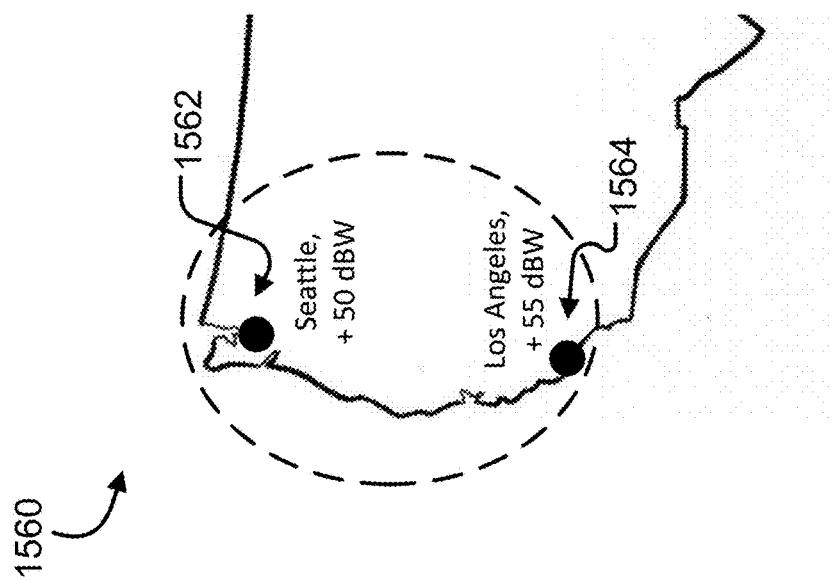

| Mitigating Power Plan ||
|---|---|
| Beam # | Power Level Change |
| Beam 1 | Power Change 1 |
| Beam 2 | Power Change 2 |
| ... | ... |
| Beam N | Power Change N |

| Mitigating Unified Beam Plan | | | |
|---|---|---|---|
| Beam # | Frequency | Mitigating Coefficients | Mitigating Power |
| Beam 1 | Frequency 1 | Mitigating Coefficients 1 | Mitigating Power 1 |
| Beam 2 | Frequency 2 | Mitigating Coefficients 2 | Mitigating Power 2 |
| ... | | ... | ... |
| Beam N | Frequency N | Mitigating Coefficients N | Mitigating Power N |

RAIN FADE MITIGATION IN A SATELLITE COMMUNICATIONS SYSTEM

CROSS-REFERENCE TO RELATED APPLICATIONS

This application claims the benefit of U.S. Provisional Application No. 61/770,392, filed on Feb. 28, 2013, and titled "BEAM FORMING SATELLITE DYNAMIC FADE MITIGATION. This application is also a continuation-in-part to U.S. patent application Ser. No. 13/841,572 filed on Mar. 15, 2013, titled "HIERARCHICHAL BEAM MANAGEMENT," which claims priority to U.S. Provisional Application No. 61/697,143 filed on Sep. 5, 2012, and titled "HIERARCHICAL BEAM MANAGEMENT."All of the applications are incorporated herein by reference in their entireties for all purposes.

TECHNICAL FIELD

The following disclosure is related to hierarchical beam management systems in communication networks.

BACKGROUND

Some communication systems can connect geographically distributed users through satellites or terrestrial connections, or a combination of both. A satellite may provide multiple beams for connecting the geographically distributed areas.

SUMMARY

The present disclosure describes methods, systems and devices for hierarchical beam management in terrestrial and satellite networks. In some implementations, a satellite communications system is composed of virtual hub servers (VHSs) and virtual hub clients (VHCs) that communicate with each other and with a satellite to update dynamic beam plans to more efficiently use the satellite's resources when providing services to enterprise customers. An enterprise customer interacts with a VHC to provide functional requirements that define a new communication service that is desired by the enterprise customer. The functional requirements are converted by the VHC and/or the VHS into communication requirements (also referred to as communication service requirements) that are inputted into a dynamic satellite resource allocation algorithm to determine whether the satellite is able to satisfy the enterprise customer's communication requirements. The dynamic satellite resource allocation algorithm attempts to satisfy the communication requirements for the newly requested service while at the same time satisfying the communication requirements of existing enterprise customers that are already receiving service from the satellite.

In attempting to satisfy communication requirements, the satellite communications system may also attempt to mitigate fade conditions. Fade conditions are conditions that cause signals between the satellite and the ground to fade. For example, if it is raining at a particular location, a signal that normally may be received at 50 dBW may be attenuated by −5 dBW by the rain so that it is only received at 45 dBW. The satellite communications system may attempt to mitigate for fade conditions to thereby prevent degradation of communications service quality that can occur as a result of the faded signals.

To ensure the satisfaction of quality of service when there are changing fade conditions, the satellite communications system may attempt to mitigate fade conditions by permanently increasing the power of all transmitted signals. However, this approach may increase the transmission power capacity requirements of the satellite communications system and waste power when no fade conditions are present. Instead of permanently increasing the power of all transmitted signals, the satellite communications system may attempt to dynamically mitigate fade conditions. The satellite communications system may dynamically mitigate fade conditions by estimating fade conditions at various locations, and then adjusting the signals from the satellite to mitigate for the estimated fade condition at the various locations. By dynamically mitigating for fade conditions, the satellite communications system may permit the use of satellites that have a lower total power output capacity and may reduce the power usage of the satellites.

The details of one or more aspects of the subject matter described in this specification are set forth in the accompanying drawings and the description below. Other features and aspects of the subject matter will become apparent from the description, the drawings, and the claims.

DESCRIPTION OF DRAWINGS

FIG. 13 illustrates an example unified beam plan.

FIG. 14 illustrates an example requested beam powers.

FIGS. 15B and 15C illustrate example requested power maps.

FIG. 16 illustrates an example mitigating power plan.

FIG. 18 illustrates an example mitigating unified beam plan.

DETAILED DESCRIPTION

Figure 1:
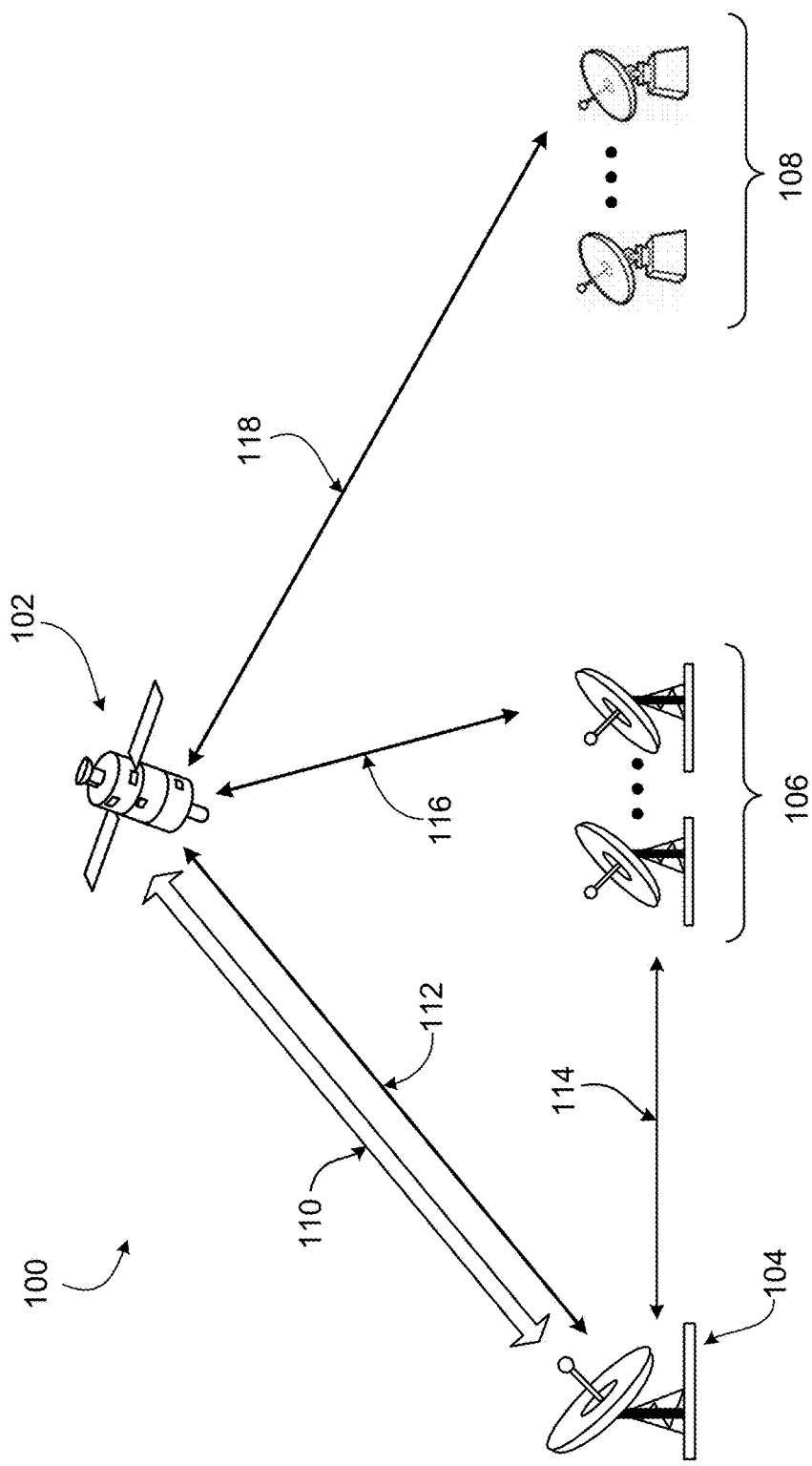
FIG. 1 illustrates an example satellite communications system that is used for hierarchical beam management.

In the context of a communications system that uses one or more satellites for connecting users, a satellite may use multiple antenna elements in, for example, a phased array antenna or as part of a reflector antenna, to form one or more communication beams for communicating with user devices on the ground or with other satellites. An antenna element refers to a resonating structure that is designed to transmit or receive electromagnetic energy in a frequency band (for example, a microwave frequency band). In a beamforming satellite system, a signal stream is divided among each of the antenna elements. Beamforming is implemented by adjusting the relative phase and/or gain of each signal path routed to each antenna element to thereby enable the energy radiated by each antenna element to be coherently combined to create a beam pattern composed of one or more beams. The same approach can also be used in the receive direction where the received signals from each receiving antenna element are coherently combined to create the beam pattern.

The beamforming may be accomplished onboard the satellite by constructing a fixed beamforming network behind the element array using processors on board the satellite. Additionally or alternatively, the beamforming may be accomplished using a ground based beamforming (GBBF) system (that is, a system on Earth) that calculates the relative amplitudes and phases that define each intended beam.

Subsequently, the signals from each beam are divided into frequency channels, each of which may have a configurable bandwidth. Selected channels from each uplink beam are then mapped to a second frequency channel. These second frequency channels are then routed to downlink beams. The downlink beams may be created by coherent phase and gain combining of signals produced by individual antenna elements. A table of phase and gain coefficients, which are collectively a referred to as the beam coefficients, may be used to create unique shaped beams on the uplink (that is, from the ground to the satellite) or on the downlink (that is, from the satellite to the ground).

Two beams generated near each other that operate in overlapping frequency bands may be referred to as co-channel beams. In some implementations, co-channel beams may receive interference from each other. In such implementations, the generation and use of beams may be coordinated so that satellite resources are not depleted and interference between co-channel beams is minimized.

An RF communication channel or connection that connects two users can be formed using four beams, with the communication path from the first user to the second user going from the ground user terminal associated with the first user to the satellite using a first beam and from the satellite to the ground user terminal associated with the second user using a second beam. The two beams may be linked together using a switching fabric on board the satellite. The communication path from the first user to the satellite is on the uplink, and the first beam may be referred to as an uplink beam. The communication path from the satellite to the second user is on the downlink, and the second beam may be referred to as a downlink beam.

A return communication path from the second user to the first user may be established by using a third beam to connect the ground user terminal associated with the second user to the satellite on the uplink, and by fourth beam from the satellite to the ground user terminal associated with the first user on the downlink. Therefore, following the terminology used in this section, the third beam is an uplink beam and the fourth beam is a downlink beam.

Some satellite communication systems provide infrastructure resources to groups of users for establishing their own networks over the satellite communication system. For example, the satellite communication system may be operated by a satellite network provider, which leases out bandwidth on the satellite network to enterprise customers of the satellite network provider. The enterprise customer uses the bandwidth provided by the satellite network to interconnect users of the enterprise customer who may be in diverse terrestrial regions.

In traditional beamforming satellite communication systems, the satellite network provider computes a set of beams, for either a beam-forming satellite or GBBF, that are generally fixed. The satellite network provider configures and fixes beams by determining the areas where the beams are going to be located, the bandwidths and frequencies of the uplink and downlink beams that are to be formed, and the beam switching on the satellite.

Once the beams are computed, the satellite network provider attempts to sell bandwidth on the beams to its enterprise customers. Since the network architecture is generally fixed once the beams are generated, the satellite network provider attempts to match the requirements of its enterprise customers with the existing beams. For example, the satellite network provider may have generated a beam that covers all of South America with a shape similar to that of South America. The satellite network provider may sell service over that beam to an enterprise customer who may have users in South America. By leasing services on that beam, the enterprise customer may interconnect its users who are located in South America.

With the fixed set of beams as described above, the satellite network provider may not be able to accommodate an enterprise customer who may want network coverage in a geographic area that is not covered by any suitable combination of the beams. In such an event, the enterprise customer may have to modify its coverage requirements such that the coverage fits one of the existing beams, or go for a different connectivity other than the satellite communications system, provided such connectivity is available.

In some cases, the satellite network provider may be able to accommodate the enterprise customer seeking coverage in a geographic area that is not suitably covered by any existing beam. However, the resource utilization may not be efficient. For example, the enterprise customer may want network coverage only over Peru, Chile and Bolivia. However, the existing beam available in the set of beams may cover all of South America. Therefore, the satellite network provider may be able to provide service to users of the enterprise customer in Peru, Chile and Bolivia using the beam that covers all of South America. However, this may be inefficient since a substantial area that is available to the beam is not used. The beam also may interfere with other beams that are attempting to provide coverage in other regions of South America.

Some satellite network providers use bandwidth management systems that provision satellite channels from a hub supporting a pool of users communicating over the satellite. Such bandwidth management systems configure channel frequencies, timing and data rates to allow users to communicate. The bandwidth management systems assume that the satellites are static bent pipes with static routing, beam and channel characteristics. In some implementations, independent management may be infeasible because beam and routing functions may interfere and utilize a common pool of resources. The bandwidth management systems may benefit from a fully-flexible beamforming and channelizing satellite network architecture.

From the perspective of an enterprise customer, the beams that are available in a conventional satellite network cannot be customized to the specific needs of the enterprise customer. Instead, the enterprise customer has to adjust its requirements to fit one of the existing beams in the satellite network. For example, the enterprise customer may check the beams that are available in the satellite network by visiting the website of the satellite network provider. The enterprise customer identifies which of the available beams listed on the website best meets the communication service requirements of the enterprise customer and may proceed to select the identified beam.

The enterprise customer may have to update its functional and communication service requirements to match resources provided by the selected beam. For example, the power level of the beams are already fixed by the satellite network provider. The enterprise customer cannot specify the power level requirement that it would like. Instead, once the beam is selected, if the enterprise customer determines that the satellite antennas in its current user terminals does not have enough power for the selected beam, then the enterprise customer will have to buy user terminals with a bigger satellite antenna that can meet the power requirements of the selected beam.

It may be useful to have a flexible satellite communications system in which the generation of the beams are tailored towards the requirements of the enterprise customers of the satellite network provider. Such a system would allow the enterprise customer to convey it's functional and/or communication service requirements to the satellite network provider, which will allocate beams on the satellite that are tailored towards the communication service requirements of the enterprise customer. Such a system also may provide the ability to update dynamically the beams as the requirements of the enterprise customers change with time, and/or as the satellite network provider adds new enterprise customers that share the satellite resources with the existing customers.

In some implementations, a flexible satellite communications system with dynamic beams may be achieved using hierarchical beam management architecture. In one such implementation, each enterprise customer may have a dedicated bandwidth management center (BMC) referred to as the virtual hub client (VHC), which is a computer system that is managed by the enterprise customer and supports the users of the enterprise customer. The satellite communications system may include multiple VHCs that are independent of one another and located in disparate regions.

In some implementations, one or more VHCs may manage assets within constraints that are determined apriori. Such VHCs manage the bandwidth and timing of user signals, beam shapes, beam locations and routing through the satellite, and transmit power levels to support services requested from the subscribers.

Each VHC determines the functional requirements of the corresponding enterprise customer based on the values the enterprise customer provides to the VHC. The functional requirements define a particular communication service need of the enterprise customer (for example, a need to setup a communication path between an office of the enterprise customer located in Los Angeles and an office of the enterprise customer located in Washington, D.C. for a video conference that will take place at a particular date and time). The VHC maps the functional requirements to communication service requirements, such as beam, power, bandwidth and routing requirements, and relays the communication service requirements to a central BMC, which is a computer system managed by the satellite network provider and is referred to as the virtual hub server (VHS).

The VHS combines the communication service requirements received from all the VHCs and generates a common resource plan, which is referred to as the unified beam plan, which determines how the satellite resources (that is, beams on the satellite) are to be allocated among the different enterprise customers. In some implementations, the unified beam plan is a data structure (for example, a matrix or a table) that includes entries for all the communication paths through the satellite. For example, the unified beam plan may include information that would enable the satellite to generate all the uplink beams and the downlink beams. For each uplink beam, the corresponding entry in the data structure of the unified beam plan may specify, for example, an identifier of the uplink beam (for example, transmit beam 45), the beam coefficients for configuring the antenna elements to generate the uplink beam, the central frequency for the uplink beam and the bandwidth of the beam. For each downlink beam, the corresponding entry in the data structure of the unified beam plan specifies the identifier of the downlink beam, the beam coefficients for configuring the antenna elements to generate the downlink beam, the central frequency and the bandwidth of the downlink beam, and the power level for the downlink beam. In addition, the unified beam plan also includes information on switching between the beams, that is, which uplink beam will be connected to which downlink beam by the switching fabric on the satellite.

The VHS communicates the unified beam plan to the VHCs. The VHS, which may be co-located at or otherwise coupled to a central managing gateway in the system, configures the antenna elements on board the satellite to generate the beams based on the unified beam plan.

Therefore, the implementation of the hierarchical beam management architecture may allow multiple independent bandwidth management systems associated with different enterprise customers to manage simultaneously communication resource assets on board a channelizing beam-forming satellite, such as uplink beams, downlink beams and routing from the uplink beams to the downlink beams. The architecture may allow the bandwidth management systems to acquire required satellite resources in real time in order to better provision the communication service requirements of their corresponding enterprise customers.

Unlike conventional systems that allow minimal or no change to an existing beam plan, the satellite communications system with the hierarchical beam management is able to modify any or all of the beams in the beam plan to satisfy the communication requirements of the services to existing enterprise customers while also satisfying the communication service requirements of new enterprise customers. By enabling the beams to be dynamically modified to accommodate new services requested by enterprise customers, the satellite resources may be used more efficiently, resulting in decreased costs.

System, methods and devices are described in the following sections for hierarchical beam management in a satellite communications system. For the purposes of this discussion, the terms "satellite communications system," "satellite network" and "network" are used interchangeably. The terms "network client," "enterprise customer" and "virtual hub client" (VHC) are used synonymously. The terms "satellite network provider" and "virtual hub server" (VHS) are used synonymously. The terms "communication channel" and "connection" are used interchangeably, with a communication channel or connection being considered between two users. Each communication channel or connection is composed of two or more communication paths, with each communication path being between a user terminal and the satellite (that is, either an uplink or a downlink path). An uplink or a downlink beam is associated with a communication path, depending on the direction of the signal flow.

In addition, though the remaining sections are described in reference to generating and managing beams on board a satellite in a satellite communications system, the techniques described here may be equally applicable to other forms of beam generation and management and other types of communications systems. For example, ground-based beam forming may be configured to employ these operations. As another example, a wireless terrestrial network may implement a hierarchical beam management architecture.

FIG. 1 illustrates an example satellite communications system 100 that is used for hierarchical beam management. The satellite communications system 100 includes a satellite 102 that is connected to a satellite gateway 104 through satellite links 110 and 112. The satellite communications system 100 also includes one or more virtual hub clients (VHCs), which are collectively identified by the label 106 in FIG. 1. The VHCs are connected to the satellite 102 through satellite links 116. Some of the VHCs 106 also may have terrestrial connectivity to the satellite gateway 104, which is indicated by the link 114. The satellite communications system 100 also includes user terminals corresponding to the users of enterprise customers that are serviced by the satellite communications system 100. The user terminals are collectively identified by the label 108. The user terminals 108 may be geographically distributed and connect to the network using via satellite links indicated by 118.

The satellite 102 may be located at a certain orbital location, for example, a low earth orbit, or a medium earth orbit, or a geostationary orbit. While only a single satellite 102 is shown, a plurality of satellites may be used. The satellite 102 connects the gateway 104 to the VHCs 106 and the user terminals 108, and VHCs 106 to their respective user terminals 108. The satellite 102 also interconnects user terminals 108 that are in disparate locations via RF communications channels created over spot beams covering the disparate locations. While only a single gateway 104 is shown, multiple gateways may be employed.

The satellite 102 may include one or more computer processors on-board, which may be used to perform beamforming calculations to form desired beam patterns. The satellite 102 may include multiple antenna elements or feeds to enable transmission of information in both directions from the satellite 102 to the gateways or user terminals. The antenna elements transmit signals to or receive signals from the satellite gateway 104, the VHCs 106 and the user terminals 108.

A processor on board the satellite 102 may sample signals from each of the incoming RF channels. The processor may combine the phase and gain of individual RF antenna elements to create receiving radiating beams. Other RF or optical feed elements also may be received at the processor in isolation to create signal element uplink beams.

In some implementations, the satellite 102 is a direct radiating satellite that includes an array of elements that instead directly radiate energy from the satellite to the Earth or directly receive energy from the Earth without the energy being reflected or redirected by any surface or dish on the satellite. In other implementations, the satellite 102 is a reflecting satellite that includes multiple reflecting dishes for reflecting or redirecting the energy used to form the beams.

The satellite gateway 104 includes one or more modules that process signals exchanged with the satellite elements for beamforming. The gateway 104 may transmit signals to the satellite 102 over the satellite return links for phase and/or gain calibration for the uplink and the downlink beams. The signals used for phase and/or gain calibration may include unique code words that identify such signals as being configured for phase and/or gain calibration. The satellite 102 may measure the phase and gain of the transmitted calibration signals to enable calibration and/or pointing correction.

In some implementations, a VHS may be co-located with the satellite gateway 104, while in other implementations a VHS may be located separately from the satellite gateway 104, but coupled to the satellite gateway 102, for example, using a dedicated network connection. The satellite 102, the satellite gateway 104 and the VHS may be managed by the satellite network provider.

The VHS may include logic embedded in a server, or a collection of servers, which is configured to perform resource allocation on board the satellite 102 based on communication service requirements that are received from the VHCs 106. In one implementation, the VHS may include a collection of software modules stored in the memory of a server computer. The software modules may include algorithms which, when executed by the server processor, provide network resource allocation functionality.

Each of the VHCs 106 may be associated with individual enterprise customers of the satellite network provider. Each VHC may include logic embedded in a computer, or a collection of computers, which is configured to determine the communication service requirements of the users associated with the respective enterprise customers and, accordingly, compute the resources in the satellite communications system 100 that are needed by the enterprise customer for providing service to its users. In one implementation, the VHC may include a collection of software modules stored in the memory of a computer at an enterprise customer site. The software modules may include algorithms which, when executed by the computer processor, provide functionality for computing communication service requirements.

As shown in FIG. 1, each VHC 106 may be coupled to a satellite antenna for communicating with the satellite gateway 102 and the user terminals 108 over the satellite channels. For example, a VHC 106 may receive information on the functional requirements of the users associated with the corresponding enterprise customer via a communication channel formed over the satellite links 116 and 118. The VHC 106 may translate the functional requirements into communication service requirements for the enterprise customer and send the communication service requirements to the VHS by a communication channel formed over the satellite links 112 and 116 and through the satellite gateway 104. In some implementations, the VHC 106 may additionally or alternatively send the communication service requirements to the VHS over the terrestrial link 114.

The VHCs 106 communicate with the VHS to provision beams, frequencies, bandwidths and power levels in the satellite communications system 100 in order to utilize efficiently the resources of the satellite 102. A VHC may be constrained by the maximum number of beams that the VHS is allowed to use. The VHC also may be constrained by a limit on satellite power utilized by the user terminals of the VHC enterprise customer. Furthermore, the VHC may be constrained by bandwidth per beam, or a geographic region where service for the enterprise customer is allowed.

The minimum communication service requirements for an enterprise customer may be specified in a constraint agreement that is made between the enterprise customer and the operator of the satellite network 100 (that is, the satellite network provider). The constraint agreement may include values of lower and/or upper limits of one or more network parameters for the enterprise customer, which are described in a following section. In one implementation, the VHS is responsible for ensuring that each VHC stays within its constraint agreement such that satellite resources are efficiently deployed.

In one implementation, a VHC uses an Application Programming Interface (API) to determine channelization and beam configurations corresponding to the communication service requirements of its enterprise customer. The API may be configured locally in the VHC and may take into account the constraints associated with the VHC. The API may allow the VHC to perform trade analyses on beam configurations before submitting an official request to the VHS.

The VHS considers all communication service requirements, which include beam, power, bandwidth and routing requirements, in the aggregate from all VHCs. In the process, the VHS may take into consideration beam to beam interference (for example, co-polarization, cross-polarization or adjacent channel interference); satellite power resources; and other satellite constraints (for example, number of channels and beams). Then the VHS generates a common resource plan, also referred to as a unified beam plan, with unified beam, power, frequency, timing, bandwidth and routing, which is sent to the different VHCs. Once a VHC receives its beam plans, it provisions channels and beams to its associated users.

The satellite gateway 104 and the VHCs 106 may be connected through the satellite links 112 and 116, or through the terrestrial link 114, or both. In some implementations, the satellite links 112 and 116 may be configured as dedicated command/control channels for the virtual hubs. For example, 2.5 mega-hertz (MHz) of the satellite bandwidth (2.5 MHz in both the uplink and the downlink) may be dedicated to the control channel, with the control channel beams for all VHCs 106 sharing the same 2.5 MHz bandwidth. Since the satellite beams may cover a large geographical area (for example, far-flung regions of the Earth), the VHCs 106 may be widely distributed.

In some implementations, the terrestrial link 114 may provide a terrestrial option for the virtual hub command/control channel. The terrestrial link 114 may be part of a closed network accessible only to components of the satellite communications system 100, such as the satellite gateway 104/VHS and the VHCs 106. For example, the terrestrial link 114 may be a dedicated physical cable connecting the VHS to the VHCs. Alternatively, the terrestrial link 114 may be part of an open network, such as the Internet. In either case, the terrestrial link 114 may be a high-speed connection, such as an optical connection with data rates in the range of gigabits per second.

Implementations that employ the terrestrial command channel approach may limit the geographical locations of the VHCs 106, for example to areas where connectivity through physical cables is possible. At the same time, such implementations do not need satellite bandwidth for the command/control channel, which may be more cost-effective since satellite connectivity may be more expensive than terrestrial connectivity. In some implementations, a combination of satellite and terrestrial connectivity may be employed to provide the virtual hub command/control channel.

Each enterprise customer may manage its own set of users, who are represented by the user terminals 108, which are networked computing devices configured to communicate over the satellite links 118. The user terminals may be computers, cable set-top boxes, or phone booths that are coupled to satellite antennas for communicating over the satellite links 118. For example, an enterprise customer may be a chain of gas stations, with individual gas stations being the users. The user terminal for each gas station may be a desktop computer that is connected to a very small aperture terminal (VSAT) antenna. The user terminals also may be mobile devices such as handheld phones, electronic tablets, or personal digital assistants with in-built satellite antennas, or networked computers in vehicles with satellite connectivity. For example, an enterprise customer may be a commercial freight company that has a fleet of tractor-trailers and freight trains, which are equipped with laptop computers connected to satellite antennas that are affixed to the vehicles. The fleet drivers may represent the users of the freight company, which may lease bandwidth in a satellite network so that the vehicles may be connected to the company headquarters while they are on the road.

The user terminals 108 in separate satellite coverage areas may be serviced by different formed beams. The user terminals may communicate with each other and with the VHCs 106 via the satellite links 118 and 116.

The satellite communications system 100 provide flexible and dynamic beam allocation to enterprise customers through hierarchical beam management in a manner described by the following illustrative example. Consider a law firm as an enterprise customer that has office locations distributed throughout North America. Each office location may have a satellite modem and VSAT antenna as the user terminal 108. The law firm has a VHC in one of its office locations. For example, the law firm may have a computer at its headquarters that runs software modules implementing VHC functionalities, which may include algorithms to determine communication service requirements based on functional needs of the different office locations.

The law firm determines the typical connectivity requirements for the various office locations such that employees may be consistently connected across the different offices. The connectivity requirement for each office may include, for example, the aggregate network bandwidth or the data rate and minimum quality of service (QoS) such that an acceptable enterprise-level network connection may be available for the particular office.

The law firm computes the overall network requirement based on the individual office connectivity requirements. For example, an operator at the firm headquarters enters the different office connectivity requirements in the computer hosting the VHC modules as the functional requirement for the law firm, and runs the VHC modules to determine the overall communication service requirements for the law firm.

The firm may have an agreement with a satellite network provider for leasing network resources offered by the satellite network provider. The agreement may include, among other constraints, the geographic areas where the satellite network provider will provide coverage to connect the users of the firm. For example, the geographic coverage areas in the agreement may map to the areas where the offices of the firm are located. The agreement also may include the minimum data rate provided by the satellite communication channels that will interconnect the various offices of the firm. In addition, the agreement may include a minimum radiating power for the beams such that the satellite antennas associated with the user terminals of the enterprise customer may successfully receive the transmitted signal, and, in some implementations, also may include a percentage up-time that takes into account inclement weather conditions.

If the communication service requirements for the law firm are within the values specified in the constraint agreement for the law firm, the VHC module at the offices of the law firm conveys the communication service requirements to the VHS run by the satellite network provider. The network operator may, for example, run VHS modules on the computer at the offices of the satellite network provider to determine how resources on the satellite 102 may be allocated so that the service requirements of the law firm may be satisfied as per the agreement. The resource allocation, which is encompassed in a beam plan for the enterprise, may include, for example, shapes and locations of the beams, link bandwidths, uplink and downlink frequencies, and, optionally, a strategy for mitigating signal fades due to atmospheric conditions such as rain, which may be referred to as fade mitigation strategy.

When attempting to allocate satellite resources to satisfy the law firm's communication service need, the current resource allocation in the satellite network for existing enterprise customers also may be affected, since in a satellite network a communication link may affect one or more other communication links Therefore, the VHS modules will have to ensure that the communication service requirements for existing enterprise customers are also being satisfied while allocating resources for the new enterprise customer (that is, the law firm). Accordingly, the VHS modules have to check that existing constraint agreements are being met. This may be achieved in the satellite communications system 100 because the VHS is a centralized entity that receives the communication service requirements for all the enterprise customers and, therefore, has a global view of the resource needs in the network.

When the VHS comes up with a unified beam plan, the VHS conveys the individual portions of the unified beam plan for each enterprise customer to the VHC associated with the respective enterprise customer. In some implementations, the VHS obtains approval from all the enterprise customers before implementing the unified beam plan.

The VHS sends the unified beam plan to the satellite 102 via the satellite gateway 104 and over the command/control channel 112. The unified beam plan may include, for example, a list of all the beams, and for each beam, beam coefficients on the uplink, frequency translation, frequencies on the uplink and the downlink, the beam bandwidth and beam coefficients on the downlink, and a beam power value on the downlink. The antenna elements on the satellite 102 are configured to generate the beam patterns according to the beam coefficients in the plan. The logic on the satellite on-board processor is updated such that content received from a source user terminal on an uplink beam is switched to the corresponding downlink beam that connects the source user terminal to the intended destination user terminal.

The operator for an enterprise customer receives the new beam plan from the VHS through its VHC computer. For example, a display coupled to the VHC may show the details of the beam plan on a user interface. The operator accordingly configures the user terminals of the enterprise customer to receive the RF channels over the beams allocated to the enterprise customer. For example, the operator orients each user terminal in the direction of the beam; sets the transmission and/or reception frequency to that of the allocated RF channel; and sets the terminal transmit and/or receive power levels such that the RF transmission or reception may be successfully made. Subsequently, once the beams are activated on the satellite 102, the user terminals of the enterprise customer may communicate with one another and with other entities over the satellite network 100, while being provided with a QoS based on the agreement with the satellite network provider.

In some implementations, the VHS may update the overall unified beam plan frequently. For example, as enterprise customers join or leave the network, or the service requirements of existing enterprise customers change, the VHS updates the resource allocation by, for example, adding new resources or deleting unused resources to ensure that the agreed-upon communication service requirements of the current enterprise customers are met. The VHS may perform these updates periodically (for example, once a week, once a day, or once an hour) or substantially continually (for example, once every few seconds) at regularly predetermined time intervals or in response to the changing service needs of enterprise customers.

In some implementations, while updating the unified beam plan, the VHS attempts to ensure that existing enterprise customers whose communication service requirements have not changed are not disturbed. That is, while the specific resources allocated to such existing enterprise customers may change, they do not change in a manner that would cause the existing enterprise customers to have to re-configure their user terminals to avoid service interruption. For example, the orientation of the user terminals and the frequency channels allocated to the enterprise customers (to which the user terminals are tuned) may not be changed by the updated unified beam plan. The resources allocated to the existing enterprise customers, however, may change in the updated unified beam plan, for example, in that the particular beam or beams that currently provide service to one or more of the existing enterprise customers may change in shape or may be replaced by one or more new beams that still satisfy the communication service requirements of those enterprise customers and do so without requiring the enterprise customers to have to reconfigure their user terminals.

A user of the VHC of an enterprise customer may view such changes to the beams by, for example, using the VHC to view beam characteristics for each allocated beam, such as, for example, one or more of a map of power distribution over geography for a downlink beam, a map of gain of antenna over effective noise temperature (G/T) distribution over geography for an uplink beam, and a map of the target carrier to interference ratio (C/I) distribution over geography for both uplink and downlink beams. As the beam plan is dynamically updated by the VHS to accommodate new enterprise customers and/or new services to existing enterprise customers, the user may view changes over time in each of these maps that reflect the corresponding changes in beams and beam shapes that have been allocated to the particular enterprise customer. In some implementations, because the updated unified beam plan still satisfies the communication service requirements of existing enterprise customers that are receiving service from the network provider and does so without requiring the existing enterprise customers to reconfigure their user terminals, the system 100 may not provide the existing enterprise customers with an option to view and accept or reject the updated unified beam plan. Instead, the system 100 may merely deploy the updated plan and communicate the new corresponding beam characteristics to each VHC. In some implementations, if the beam characteristics change in a manner that is deemed to be above a predetermined threshold, despite that change not violating the communication service requirements, the VHC of the system 100 may prompt the enterprise customer to accept or reject its portion of the updated unified beam plan, and the updated unified beam plan may only be deployed if all of the prompted enterprise customers accept their corresponding portions of the plan. For example, the updated unified beam plan may result in an appreciable increase in interference (that is, the C/I beam characteristic) that, while not violating the communication service requirements of the enterprise customer, is deemed large enough to require explicit acceptance from the enterprise customer before the updated unified beam plan may be deployed.

In some implementations, the VHS updates the unified beam plan to provide service to new enterprise customers and/or additional service to existing enterprise customers without regard to whether the updated unified beam plan requires that the existing enterprise customers have to re-configure their associated user terminals. In such implementations, the VHCs corresponding to existing enterprise customers may receive updated resource allocations that require that the enterprise customer re-configure the associated user terminals. In some of these implementations, some or all of the users of the VHCs may be given the ability to accept or reject their portion of the updated unified beam plan when their portion requires reconfiguration of associated user terminals. For example, the VHC may inform the operator of the VHC via a GUI that the network provider wishes to update the unified beam plan, may provide details of the enterprise customer's portion of the updated unified beam plan, and may prompt the user to accept or reject the updated unified beam plan. In these implementations, the updated unified beam plan may not be deployed if a user rejects its portion of the updated unified beam plan. If the updated unified beam plan is rejected, the VHS may attempt to determine a new updated unified beam plan to accommodate the new enterprise customers and/or the new services desired by existing enterprise customers.

In some implementations, the VHS and VHC modules may be closely tied in their functionalities. For example, the VHC and VHS may be the client and server, respectively, in a client-server system implemented by the satellite network provider, who deploys the VHC modules at the enterprise customer sites. As described previously, the VHS and VHC modules may be linked by dedicated command/control channels, such as over the satellite links 112 and 116, and/or the terrestrial link 114.

The beams allocated to the law firm in the preceding example may be referred to as reserved beams, which are formed within pre-defined constraints (that is, the agreement between the enterprise customer and the satellite network provider). The enterprise customer reserves the beams by specifying the bandwidth, power and geographic region. The reserved beams may be configured in near real-time, for example, in the order of seconds or tens of seconds from the time the communication service requirements are conveyed by the VHC.

The unified beam plan may include static operator-defined beams, which are designed by the satellite operator. In such cases, the enterprise customers may purchase virtual transponders in the pre-configured beams. The unified beam plan also may include static user-defined beams, which are customized beams that are allocated at the time of purchasing a lease on the satellite 102. The static user-defined beams do not change subsequently.

The unified beam plan may include ad-hoc beams, which are beams that are outside the scope of pre-determined agreements between the enterprise customers and the satellite network provider. For example, an enterprise customer may temporarily require additional connectivity between its users that fall beyond the resources provided to the enterprise customer based on the agreement. The VHC of the enterprise customer may request the VHS for the additional allocation. The VHS may satisfy the request if network resources are available, while providing the resources to all the enterprise customers based on their respective agreements.

As an example of a resource allocation with ad-hoc beams, the law firm may want to establish a video-conferencing session between its offices in Washington D.C. and Silicon Valley, in addition to making use of the network resources allocated to the law firm for regular connectivity. If the coverage and bandwidth requirements for the video-conferencing session can be satisfied by the network resources that are already allocated to the law firm based on its agreement with the satellite network provider in addition to use of the resources for other purposed, then the video-conferencing session may be established over the existing beams without further provisioning by the VHS.

However, the case may be that the coverage and bandwidth requirements for the video-conferencing session cannot be satisfied by the network resources that are already allocated to the law firm based on its agreement with the satellite network provider. For example, the existing agreement between the law firm and the satellite network provider may not cover the office in Silicon Valley, and therefore a beam may not be presently available for the law firm to use in its Silicon Valley office. An alternative situation may be that both offices of the law firm are covered by existing beams, the bandwidth requirement for the video-conferencing session exceeds the bandwidth guaranteed and/or allocated to the law firm in the network. In such a case, the VHC at the headquarters of the law firm may make a new request to the VHS for the additional resources needed to establish the video-conferencing session.

Since the additional resources requested are outside the scope of the constraint agreement with the law firm, the satellite network provider may not be obligated to provide the resources. For example, upon receiving the request, the VHS attempts to generate a new unified beam plan that provides service to existing enterprise customers that meets their respective communication service requirements while at the same time provides the desired service in response to the request. If the VHS is unable to generate such a new unified beam plan (for example, because the service to existing customers along with the new service cannot be simultaneously satisfied by available network resources), the VHS may refuse the request. However, if the new unified beam plan can be generated, then the VHS may allocate the network resources that are needed for the video-conferencing session. If a new coverage is required, the VHS may configure antenna elements on the satellite 102 to generate a new beam or re-configure an existing beam (which may be otherwise unused) to cover the offices in Silicon Valley. If additional bandwidth is needed, the VHS may provide the extra bandwidth on the transponders that link the two offices in Washington D.C. and Silicon Valley.

When the VHS updates the unified beam plan after the ad-hoc network resource allocation is made as above, a situation may later arise that the guaranteed requirements for all enterprise customers, which are based on their respective constraint agreements, cannot be made. For example, a new enterprise customer may subsequently join the network. The VHS may determine that the guaranteed requirements for the enterprise customers can be met by removing the resource allocation made to the law firm for the video-conferencing session. Since the resource allocation was ad-hoc, the VHS may proceed to terminate the resource allocation. In such a case, the VHS may notify the VHC associated with the law firm about the termination. Once the network resources are re-claimed, the VHS may reallocate them to satisfy the guaranteed requirements for the various enterprise customers.

Figure 2:
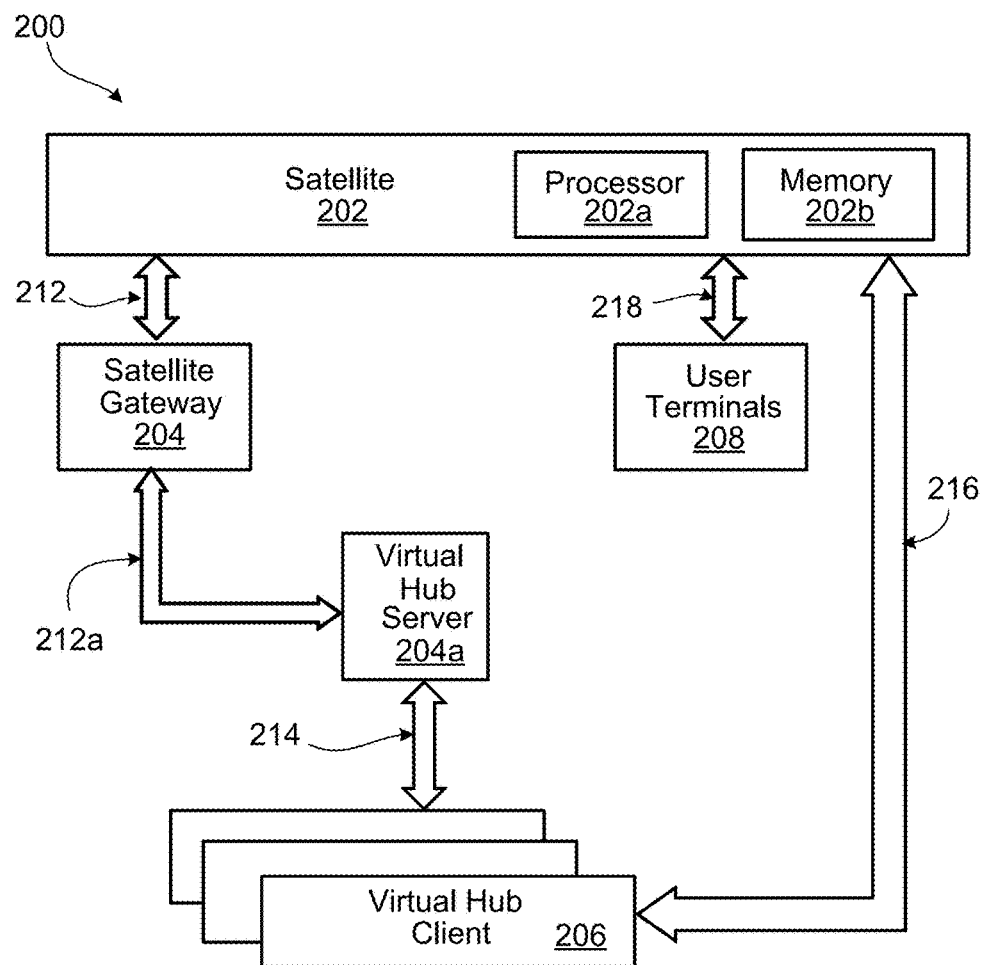
FIG. 2 illustrates a block diagram of an example satellite communications system that may be used for hierarchical beam management.

FIG. 2 illustrates a block diagram of an example satellite communications system 200 that may be used for hierarchical beam management. The satellite communications system 200 includes a satellite 202 with on-board processor 202a and memory 202b. The satellite communications system 200 includes one or more virtual hub clients (VHCs) 206, one or more user terminals 208, and also includes a satellite gateway 204 that is coupled to a virtual hub server (VHS) 204a. The satellite gateway 204 communicates with the satellite 202 via a satellite link 212, and the gateway is coupled to the VHS 204a using the link 212a. The VHS 204a has a terrestrial link 214 with the VHCs 206, which are also connected to the satellite 202 via the satellite links 216. The user terminals 208 are connected to the network through the satellite 202 via the satellite links 218.

The satellite communications system 200 may be similar to the satellite communications system 100. For example, the satellite 202 may have features similar to that of the satellite 102. The processor 202a may be similar to the processor described with reference to the satellite 102. The processor 202a is configured to receive the beam coefficients from the satellite gateway 204 that are sent by the VHS 206 for the current unified beam plan. Based on the received beam coefficients, the processor 202 combines the phase and gain of individual RF antenna elements on the satellite 202 to create downlink and uplink beams.

The processor 202a also links beams together to create communication channels based on the information received from the VHS. For example, a communication path between two user terminals through the satellite 202 may include an uplink beam and a downlink beam. The processor 202a configures the switching fabric on board the satellite 202 such that data received from a user terminal on an uplink beam is switched to the corresponding outgoing downlink beam that completes the communication path. The processor 202a may perform other functions as part of the resource allocation, such as setting the power levels of the beams, or modifying the beam power based on environmental conditions (for example, rain fade).

In some implementations, the satellite 202 includes memory 202b. The memory 202b may be volatile memory (such as static or dynamic random access memory), or non-volatile memory (such as flash memory or hard disk), or both. The memory 202b may be configured to store the logic that is executed by the processor 202a for generating the beams, for configuring the switching fabric, or for some other suitable use. The memory 202b also may store the information from the VHS 206, such as the beam coefficients for the current resource allocation.

The satellite gateway 204 may be similar to the satellite gateway 104. The satellite gateway 204 acts as the conduit for the VHS 204a to exchange command and control information with the VHCs 206 over the satellite 202, and also for the VHS 204a to send commands to the processor 202a for configuring the satellite 202 for the current resource allocation. The satellite link 212 represents both the space processor command channel between the satellite 202 and the VHS 204a, and the virtual hub command/control channel between the VHS 204 and the VHCs 206.

The satellite gateway 204 and the VHS 204a may be co-located, for example, at the site of the satellite network provider for the satellite communications system 200, such as at the network operations center (NOC). The VHS 204a may be similar to the VHS described with reference to the satellite communications system 100.

In some implementations, the satellite communications system 200 may have multiple VHSs 204a. This may be the case, for example, for load balancing of the resource allocation computations performed by the VHS. The multiple VHSs also may provide redundancy in case one or more of the virtual hub servers fail. The multiple VHSs may be co-located with the satellite gateway 204, for example, on a cluster of servers at the NOC. Alternatively, the multiple VHSs may be distributed across servers located in various sites of the satellite network provider. This may be useful for providing backup services in situations where an entire site hosting a VHS goes down, for example, due to an earthquake or a fire.

The VHCs 206 may be similar to the VHCs 106, associated with the enterprise customers of the satellite network provider of the satellite communications system 200. The VHCs 206 are connected to the satellite 202 through the satellite link 216 that provides the space-based command/control channel, along with the links 212 and 212a, between the VHS 204a and the VHCs 206. In some implementations, the VHS 204a and the VHCs also may share a terrestrial command/control channel through the terrestrial link 214.

The user terminals 208 may be similar to the user terminals 108, representing the subscribers or users of the enterprise customers. Each enterprise customer may manage a separate group of user terminals 208. The user terminals 208 are interconnected to each other, and to their respective VHCs, through the satellite 202 via the satellite links 218. In some implementations, the user terminals 208 may have terrestrial links to their respective VHCs 206, for example over public networks such as the Internet. The user terminals 208 also may have terrestrial links to the VHS 204, for example over the Internet.

As described previously, in some implementations, the VHS 204a and the VHCs 206 implement a client-server system, with the VHCs being the clients for the VHS. Each enterprise customer site runs one or more computers that implement the logic, for example as software modules, corresponding to the VHC.

The VHC modules implemented on computers at an enterprise customer site may provide an interface for the enterprise customer to enter the functional requirements of its users. For example, the VHC 206 may have a user interface (UI) that is shown on a display coupled to the computer running the VHC at the enterprise customer's office. The operator for the enterprise customer, or some other authorized entity, enters the various functional requirements for the users of the enterprise customer through the UI. The functional requirements entered by the operator define a communication service need of the enterprise customer. The functional requirements may include, among other parameters, one or more of coverage areas, time(s) of coverage, sizes of the user terminals, terminal and link parameters, and minimum and/or maximum data rate.

Once the operator enters the functional requirements, the VHC module translates the functional requirements into communication service requirements for the enterprise customer. The VHC may generate a custom beam plan for the enterprise customer based on the communication service requirements. For example, the VHC may evaluate the sizes of the user terminals to estimate the signal power that is needed on the satellite for the beam such that the user terminal of a given size is able to transmit or receive successfully. The power may be given, for example, by equivalent isotropically radiated power (EIRP), expressed in decibel watts (dBW). The VHC module may use terminal characteristics, such as terminal transmit power and terminal antenna gain, to determine whether the ratio of the carrier power (C) to interference power (I) meets C/I requirements for both the uplink and downlink transmission links. The VHC module also may estimate, from the terminal characteristics, the bandwidth needed on the satellite channel such that the desired data rate may be supported.

For the purposes of this description, the terms "communication service requirements" and "custom beam plan" are used interchangeably, since the two are closely related, with the latter being based on the former as described in the preceding section. In some implementations, the VHC may send the communication service requirements directly to the VHS, while in some other implementations, the VHC may send to the VHS a custom beam plan that translates the communication service requirements into desired beams.

The custom beam plan may include, among other parameters, the beam information, such as the beam location, satellite power given to the beam (for example, 50 dBW of EIRP) and bandwidth allocated to the beam (for example, 50 MHz). The custom beam plan also may include information on whether the connectivity is single-hop (that is going through a single satellite) or multi-hop (that is going through more than one satellite), and the uplink and downlink locations for the communication paths. The bandwidth and power needed for each communication path may be specified by the custom beam plan.

The enterprise customer may have multicast or broadcast groups in its network. In such cases, the custom beam plan may include custom multicast or broadcast beams respectively that are needed to cover the users in the multicast or broadcast groups.

For multicast situations, the beams may be configured to support directly the users of the enterprise customer that are part of the multicast group. The beam shape may be designed to cover just the multicast subscribers. In some implementations, the beam shape may be weighted to account for rain fade conditions. In some implementations, the multicast beams may be designed in non-real time, that is, statically. For example, a multicast beam may be designed for a cable service provider to cover the subscribers of the cable service. The cable service provider VHC designs the beam initially when generating the custom beam plan. Once the beam is deployed by the VHS as part of the global resource allocation, the shape of the beam may not change frequently. However, in some other implementations, the multicast beams also may be designed in real time. For example, as the cable service subscribers join or leave, the shape of the multicast beam may be updated to reflect the changed coverage area.

For broadcast situations, a beam may be configured to include multiple uplink locations corresponding to multiple sources for the broadcast. The enterprise customer operator may input information on the uplink locations and characteristics such as the sizes of the user terminals. The network also may enter information on the distribution of terminal characteristics (for example, user terminals in Washington D.C. may be larger than the terminals in Silicon Valley or Dallas).

Based on the communication service requirements for the broadcast situation, the VHC module at the enterprise customer may design a custom beam plan that includes a broadcast beam. While designing the custom beam plan, the VHC module may take into account the terminal characteristics, such as, for example, the EIRP, bandwidth and C/I requirements for the user terminals. After the beam is determined by the VHS based on a unified beam plan and is then deployed, performance feedback from the user terminals may be used to improve the shape of the beam over time to meet the functional requirements.

The VHC may take into consideration the population distribution in the broadcast beam coverage area. The VHC may access population databases for the information on population distribution. The VHC also may take into account rain and propagation models to optimize static beam gain contours for the beam. In some implementations, the VHC accesses databases provided by the International Telecommunication Union (ITU) for the rain and propagation models. The broadcast beam may be designed such that dynamic beam gain contours can be optimized during rain events.

In some implementations where the enterprise customer is an enterprise, the beam plan may be customized for an enterprise solution. In one such implementation, the beam plan may specify that the network is a single hop. For example, the communication channel may be from user terminal A to user terminal B. In this case, the uplink and downlink spot beams may be centered over the specific locations of the user terminals A and B. Such a beam plan may improve performance, for example by enabling communication channels with low latency. The beams may be dynamically configured for each communication channel, with each leg of the communication channel (that is, the communication paths) configured dynamically to meet interference and margin user terminal requirements.

Another beam plan customized for an enterprise may specify a hub configuration network. For example, the communication channel may be from a source user terminal to a hub at a satellite gateway, and from the hub to destination user terminals, resulting in a double-hop network. This may be useful in situations where the spectrum is re-used. The spectrum may be fully re-used by intelligent placement of the hubs. The beam plan may include feeder links to any location that may be customized for the feeder link terminal and target QoS.

The VHC 206 at an enterprise customer may provide additional functionalities. For example, the VHC modules may include financial planning software. The enterprise customer may use the financial planning software to determine the cost of the custom beam plans that are generated by the VHC based on the communication service requirements. The financial planning software may allow the enterprise customer to perform trade-off analysis of different custom beam plan options.

The VHC 206 may include fade planning/provisioning features. For example, the VHC 206 may include in the beam plan features to mitigate rain fade or other environmental conditions, such as additional power (such as EIRP) during rain fade events.

The VHC 206 may include tools for link budget analysis, which enable the administrator at the enterprise customer to estimate link budgets for the satellite links that are needed based on the communication service requirements. As part of the link analysis, the enterprise customer may be able to design virtual satellites for determining network communication service requirements.

Other features of the VHC 206 may include tools for monitoring the RF spectrum, service troubleshooting during outage conditions at user sites, carrier resource optimization, simulation and modeling of the satellite payload (that is, the processor 202*a* and/or memory 202*b*) and data export/import from databases and storage.

As described previously, the VHC 206 may provide a UI for the operator to enter the functional requirements for a service request that are then used to determine the communication service requirements and corresponding custom beam plan. The UI may include features allowing the operator to see the parameters of the communication service requirements that are computed based on the user-inputted functional requirements. In some implementations, the UI may allow the operator to visualize the custom beam plans that are generated. For example, the UI may provide animations illustrating the beam radiation patterns for the custom beam plan. Similarly, the UI also may provide information on the beams as they are deployed on the satellite 202, when such information is received by the VHC 206 from the VHS 204*a* (for example, in the individual beam plan update for the specific enterprise customer). The information on the beams may include, for example, one or more of a map of power distribution over geography for a downlink beam, a map of G/T distribution over geography for an uplink beam, and a map of the target C/I distribution over geography for both uplink and downlink beams.

In some implementations, the VHC 206 may include tools for the enterprise customer to perform trade-off analyses on various sizes of the user terminals. For example, an analysis may trade off the size of the user terminal to the beam power needed at the satellite 202 for different user terminal sizes, and the cost to the enterprise customer associated with the amount of beam power needed to connect its user terminals. The cost analysis may include full-price trade-off studies.

As described previously, in some implementations, a VHC 206 may be a non-real time virtual hub. The enterprise customer provides the constraints associated with its users, such as geography, bandwidth and power. The non-real time VHC 206 designs beam plans based on the constraints, such that the beam plans meet user terminal, QoS and throughput requirements within the constraints.

A non-real time beam plan may include beam patterns, channel frequency and beam power. The beam plan may provide customized broadcast or multicast beams, or feeder link beams. The beam plan may include options for dynamic weather adaption, for example, rain fade mitigation. For each beam or channel transmitted, the beam plan may provide real-time view of the channel signal band, along with estimates of terrestrial interference (for example, due to transmissions from other user terminals or from the VHC 206 itself).

In some implementations, a VHC 206 may be a real time virtual hub. A real time VHC includes all the features of a non-real time VHC. In addition, a real-time VHC may control directly the beams used by the associated enterprise customer. For example, the enterprise customer may request the VHS 204*a* for coverage, power and time slots in real or near-real time. The VHS accordingly generates the beams and allocated spectrum to the enterprise customer, while satisfying the constraints associated with the unified beam plan.

The real-time VHC may send further requests to the VHS as needed, for example, to move the beams to the top of the user terminals to maximize performance. The real-time VHC may assign single-hop private networks dynamically, or design multicast beams in real time to cover exactly the multicast users.

Figure 3:
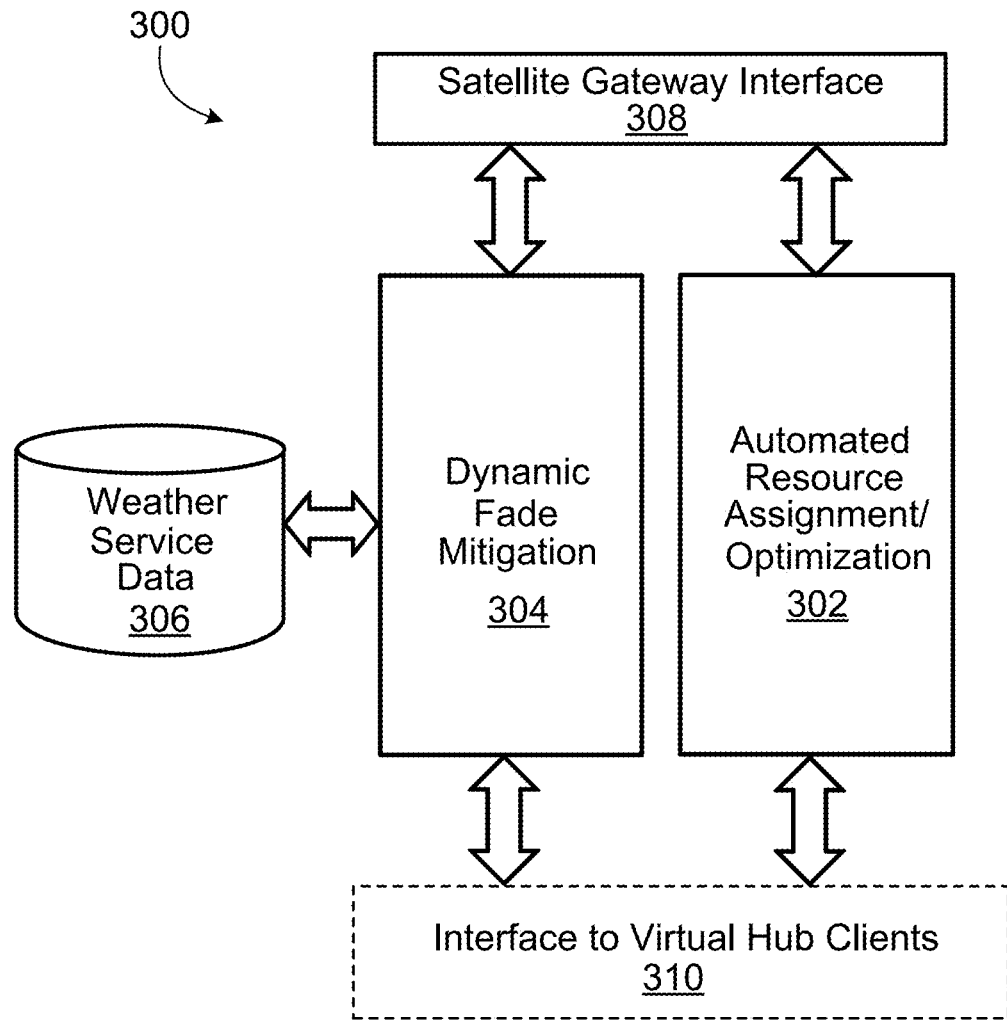
FIG. 3 illustrates an example block diagram of a virtual hub server (VHS) for hierarchical beam management in a satellite communications system.

FIG. 3 illustrates an example block diagram of a virtual hub server (VHS) 300 for hierarchical beam management in a satellite communications system. The VHS 302 includes an automated resource assignment/optimization module 302 and a dynamic fade mitigation module 304, along with a weather service database 306. The VHS 300 also includes a satellite gateway interface 308 and an interface to virtual hub clients (VHCs) 310.

The VHS 300 may be same as the VHS 204*a*. Accordingly, VHS 300 is described with reference to the satellite communications system 200. However, the VHS 300 also may be implemented in other communications systems.

The VHS 300 may be implemented as server software on one or more computers at the premises of the satellite network provider, for example at the NOC as described previously. The VHS 300 includes multiple modules that perform various functionalities for managing the resources in the satellite network.

The automated resource assignment/optimization module 302 receives communication service requirements from the VHCs that are deployed at the sites of the enterprise customers of the satellite network provider. Based on the communication service requirements, the automated resource assignment/optimization module 302 generates a unified beam plan for the overall network. The automated resource assignment/optimization module 302 may optimize the coefficient tables for the beams and generate pointing correction tables as part of computing the unified beam plan for the network.

In some implementations, the unified beam plan generated by the automated resource assignment/optimization module 302 may be based on constraint agreements in addition to the communication service requirements. In such implementations, the automated resource assignment/optimization module 302 takes into consideration the requirements of all the enterprise customers as set forth in the constraint agreements to ensure that the optimal beam/spectrum plans satisfy the requirements of the enterprise customers as stipulated in their respective agreements with the satellite network provider. The agreement may restrict parameters such as the bandwidth, spectra, power and geographic coverage provided to the users of the enterprise customer, which may be referred to as constraints. The constraint agreements also may indicate the priority that will be given to competing service requests from the enterprise customers. For example, as described in more detail below with respect to FIG. 5, requests designated as "ad-hoc" my be assigned a lower priority than "non-ad-hoc" requests and allocations that satisfy ad-hoc requests may be removed in favor of allocations to satisfy new non-ad-hoc requests.

In some implementations, a unified beam plan generated by the automated resource assignment/optimization module 302 may be considered acceptable if the plan satisfies the communication service requirements and the constraint agreements for each enterprise customer. The automated resource assignment/optimization module 302 optionally may attempt to provide to an enterprise customer best effort for C/I and power that is above the minimum guaranteed by the agreement between the enterprise customer and the satellite network provider.

In some implementations, the beam plan generated by the automated resource assignment/optimization module 302 for an enterprise customer may be based on dynamic purchase of resources by the enterprise customer. In such implementations, the bandwidth, power and beams are allocated ad-hoc to the enterprise customer. The satellite network provider may bill the enterprise customer based on usage of the network resources, for example in a manner similar to a phone service. As described previously, in the ad-hoc approach, the request or plan may be rejected by the VHS if the corresponding communication service requirements cannot be met.

In some implementations, the beam plan generated by the automated resource assignment/optimization module 302 for an enterprise customer may be formula-based. In such implementations, the agreement between the enterprise customer and the satellite network provider may include monetary value constraints instead of communication service requirements. For example, the agreement may specify that the enterprise customer will pay the satellite network provider at most $X for the network resources that are allocated to the enterprise customer. In such cases, a resource request by the VHC of the enterprise customer may be rejected by the VHS if the requested resources exceed the agreed-upon monetary value.

In some implementations, the beam plan generated by the automated resource assignment/optimization module 302 for an enterprise customer may be based on a fixed allocation. In such implementations, the network resources are purchased by the enterprise customer at one time and the bandwidth, power and beams are allocated accordingly by the VHS. The allocations do not change subsequently. However, minor changes to the beams may be allowed to optimize performance (for example, moving the exact beam center or rain fade mitigation).

Once the unified beam plan is generated, the VHS 300 communicates the individual portions of the plan to the VHC at each enterprise customer corresponding to the individual portion. The communication between the VHS 300 and the VHCs occurs through the interface 310. The interface 310 may be a network interface that connects the VHS 300 to the VHCs. For example, the interface 310 may be the terrestrial command/control channel 214.

When the unified beam plan is approved by the VHCs, the VHS 300 sends the beam coefficients to the satellite through the satellite gateway, for example the satellite gateway 204. The VHS 300 communicates with the satellite gateway through the interface 308, which may be a network interface that connects the VHS 300 to the satellite gateway. For example, the interface 308 may be the connection 210*a*.

The dynamic fade mitigation module 304 estimates signal fade conditions across the different service areas in the satellite network where beam coverage is provided. The dynamic fade mitigation module 304 may access historical weather service data from the database 306 to perform the estimates of the signal fade conditions. The weather service data may provide information on the precipitation (for example, rain, hail or snow) conditions during days of the year, or times of the day, and corresponding variations in the signal conditions. The weather service data also may provide information on other environmental conditions, such as solar flares or variations in the Earth's magnetic field, which may affect the beam signals.

The dynamic fade mitigation module 304 may determine strategies to adapt the beams (for example, regional beams or spot beams) to the estimated fade conditions. For example, additional power may be supplied to the transponders of the affected beams during the fade conditions. The unified beam plan may include the provisions for allocating additional resources to the affected beams during the fade conditions, such that the effects of the fade conditions may be mitigated.

Although two modules 302 and 306 are shown, the VHS 300 may include other modules. For example, the VHS 300 may include modules for beam spectrum monitoring. There also may be modules for monitoring the status of the different VHCs, and for acting on alarms that may be received from the VHCs.

Figure 4:
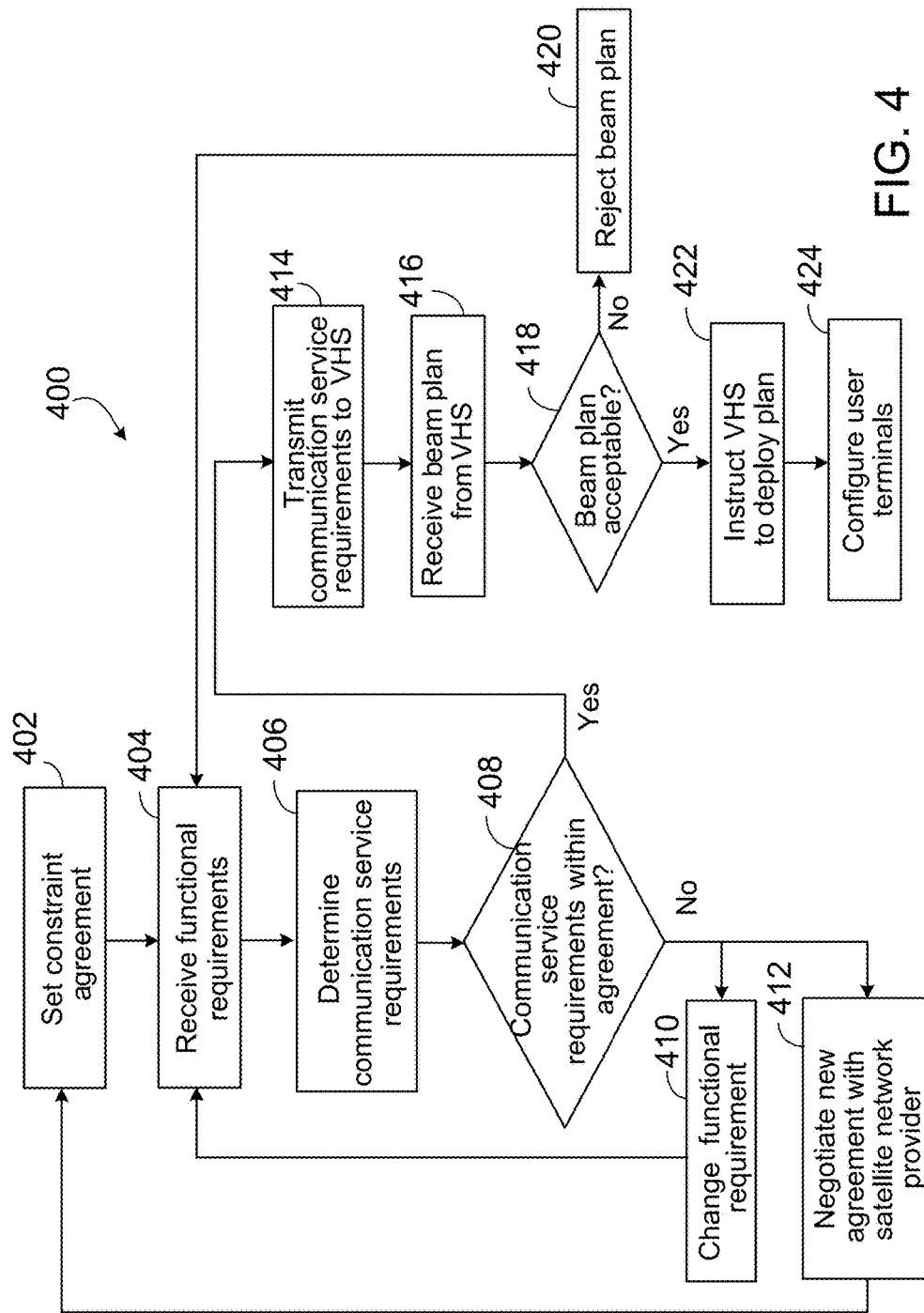
FIG. 4 illustrates an example process performed by a virtual hub client (VHC) for hierarchical beam management in a satellite communications system.

FIG. 4 illustrates an example process 400 performed by a virtual hub client (VHC) for hierarchical beam management in a satellite communications system. The process 400 may be performed by a VHC 206 at an enterprise customer site in the satellite communications system 200. Accordingly, the following sections describe the process 400 in the context of the satellite communications system 200. However, the process 400 also may be performed by other devices in other networks or systems.

The process 400 may, for example, be implemented at an enterprise customer site to design a beam plan that satisfies the needs of the users of the enterprise customer. For example, the enterprise customer may be a cable service provider that runs the VHC 206 client software on computers at its offices to generate a beam plan for its subscriber base.

Initially, when the enterprise customer becomes a customer of the satellite communications system 200, it establishes a constraint agreement with the satellite network provider. The constraint agreement may be set (402) by using the VHC running on the enterprise customer site. The constraint agreement determines limits, either minimum or maximum or both, on the resources of the satellite communications system 200 that the satellite network provider will provide to the enterprise customer. As such, the constraint agreement limits the range of communication service requirements that will be deemed acceptable by the satellite system 200 for purposes of allocating resources to the enterprise customer in response to a communications service request from the enterprise customer. The constraint agreement may be established before a beam plan is designed or deployed for the VHC 206.

One of the constraints in the agreement may be the amount of clear sky power that will be provided to a user of the enterprise customer. The constraint agreement may specify that the satellite network provider will provide X dBW of EIRP (X being a non-negative number) in the beams that connect users of the enterprise customer during normal operating conditions. For example, the clear sky power in the constraint agreement may be 50 dBW of EIRP. The enterprise customer may determine the clear sky power based on the nominal (that is, during normal operating conditions) power requirement of its user terminals.

Another parameter that may be included in the constraint agreement is the interference power, which may be specified as C/I, that is, the ratio of the power in the beams provided to the enterprise customer ("C") to the interference power due to the beams of other customers ("I") of the satellite network provider. For example, the agreement may specify a 10 dB C/I, which means that the satellite network provider will ensure that the interference power from all other sources is $1/10^{th}$ of the power in the beams allocated to the enterprise customer.

When designing a beam plan for the enterprise customer, the interference power may be used to determine the maximum data rate over a fixed beam bandwidth that may be provided to the users of the enterprise customer. More satellite resources may be needed to achieve a lower interference power, and therefore the satellite network provider may charge the enterprise customer more to guarantee lower interference power.

A third parameter in the constraint agreement may be extra power during rain. This is additional power that is provided to the beams allocated to the enterprise customer during rainy conditions to counter the effects of signal fading due to the rain. For example, the agreement might say that when it is raining, the satellite network provider will add 6 dBW of extra power to the 50 dBW clear sky power mentioned in the agreement.

In some implementations, the extra power during rain may be specified it in terms QoS, and not as EIRP. The QoS may be specified in terms of network availability. For example, the agreement may state that satellite communications system will guarantee network availability to the users (that is, a certain power level to the user terminals) of the enterprise customer 99% of the time. The VHS at the satellite network provider can convert the QoS metric to effective power for the beams allocated to the enterprise customer during rain fade situations.

Another parameter that may be included in the constraint agreement is the bandwidth allocated to the users. The bandwidth that may be indicated in the agreement is the bandwidth of the beams allocated by the satellite network provider. The satellite network provider may provide bandwidth to the enterprise customer in increments of 2.5 MHz.

The geographic coverage requirements of the enterprise customer also may be included in the constraint agreement. For example, the agreement may specify the locations of the user terminals of the enterprise customer, which determine the areas that are to be covered by the beams allocated to the enterprise customer. Greater coverage areas may be covered by larger beams, which require more resources on the satellite, and therefore, may be more expensive for the enterprise customer.

The beams that are designed based on the geographic coverage requirements may be spot beams, which are approximately circular or elliptical beams covering small areas, or they may be shapes. For example, the geographic area specified by the enterprise customer may be a polygonal shape, which can be covered by a polygonal beam.

A sixth parameter that may be included in the constraint agreement is switching. The enterprise customer may specify how the user terminals in its coverage areas should be connected, which determines how an uplink beam should be connected to a downlink beam by the switching fabric on the satellite to provide the desired connectivity. For example, the enterprise customer may specify that its office in Washington D.C. should be connected to its office in Silicon Valley. This implies that a beam that covers the Washington D.C. office should be connected on board the satellite to a beam that covers the Silicon Valley office so that an end-to-end connection can be established.

It is to be noted that in some implementations, the constraint agreement may be optional. In such implementations, some enterprise customers may not establish a constraint agreement with satellite network provider. When the VHC associated with such an enterprise customer sends a request to the VHS for satellite resources, the VHS does not check the communication service requirements for the enterprise customer, which is sent with the request, against a constraint agreement. Instead, the VHS determines whether spare resources (that is, beams) are available that may be allocated to satisfy the communication service requirements of the enterprise customer without affecting the services that are being provided to existing enterprise customers.

Returning to an implementation where the constraint agreement is used, after the constraint agreement is set between the enterprise customer and the satellite network provider, the enterprise customer may request a communication service from the satellite that will require that the satellite allocate resources to the enterprise customer. In some implementations, an operator of a computer running the VHC may input functional requirements of the users associated with the enterprise customer that will be receiving communication service from the satellite network provider. The functional requirements define a communication service need of the enterprise customer. For example, the operator sitting in front of the computer running the VHC at the enterprise customer site may enter the functional requirements of the users through the VHC UI shown on the computer display. Accordingly, the VHC receives the functional requirements (404).

Based on the functional requirements, the VHC determines the communication service requirements of the enterprise customer (406). In some implementations, the operator may not enter the functional requirements in terms of the constraint parameters such as power levels or beam bandwidth. Instead, the operator may specify the characteristics of the user terminal and the desired data rate. For example, the operator may say that it wants to connect users located at Washington D.C. with users in Silicon Valley, where the satellite antenna deployed at each user site is a 5-meter dish with 2 watts of transmit power. The operator also specifies that it needs X kilo-bits per second data rate for the connection. The VHC translates the terminal and data rate information entered by the operator into communication service requirements that can be understood by the VHS, such as the beam coverage area, beam bandwidth, beam connectivity, interference requirements, and power requirements. In determining the communication service requirements, the VHC may take into consideration the terminal characteristics and locations of population. The VHC also may take into account known terrestrial interference sources.

In some implementations, when the VHC translates the functional requirements into communication service requirements, the VHC performs resource optimization. For example, the VHC may optimize the power levels, carrier placement and the beams for the users of the enterprise customer. The VHC may perform tradeoffs between different parameters for the resource optimization. For example, the VHC may tradeoff between the interference power and the beam bandwidth.

The VHC checks whether the communication service requirements are consistent with the constraint agreement (408). For example, the VHC may check whether any of the communication service requirements that it has determined from the functional requirements violate the constraint agreement set with the satellite network provider. Each of the communication service requirements such as, for example, one or more of the coverage area, the bandwidth or the power level has to be within the limits set by the constraint agreement.

If the communication service requirements are not consistent with the constraint agreement, the VHC notifies the enterprise customer. For example, the VHC may flash an error message on the computer display for the operator to see. Based on the VHC notification, the enterprise customer may do one of two things. For one, the enterprise customer may change the functional requirements (410). For example, the communication service requirements may have been violated because the data rate previously indicated for the functional requirements exceeded the bandwidth set in the constraint agreement. In such an event, the enterprise customer may check whether a reduced data rate would be acceptable for the connection between its users. If the functional requirements can be changed, then the operator may enter the new functional requirements through the UI, and the process repeats as described previously (404).

Alternatively, the enterprise customer may negotiate a new constraint agreement with the satellite network provider (412). The customer may negotiate a new constraint agreement, for example, when the functional requirements for the users may have changed since the time the last constraint agreement was set. In such a case, the enterprise customer negotiates a new agreement with the satellite network provider (402), and the process repeats.

On the other hand, if the communication service requirements are consistent with the constraint agreement, then the VHC transmits the communication service requirements to the VHS (414). By negotiating the constraint agreement, the VHC had set general service requirements previously. Now, the VHC is sending specific communication service requirements to the VHS for resources that are needed by the enterprise customer at the present instance.

The communication service requirements may include, for example, the coverage requirements for the service (for example, polygons of coverage areas or a list of point locations), transmit beam power requirements (for example, minimum/average ERIP requirements), receive beam signal quality requirements (for example, minimum/average G/T requirements), interference requirements (for example, target C/I ratios), beam connectivity information (for example, uplink beam to beam x to downlink beam y), and bandwidth requirements. In some implementations, the communication service requirements may also include connection time information (for example, the connection is needed for 8 hours between 0900 hours and 1700 hours Central Standard Time on Mar. 15, 2013).

The VHS determines a unified beam plan based on the communication service requirements that are transmitted to the VHS by the VHC. Subsequently, the VHS sends the portion of the beam plan, which provides information on the beams allocated to the enterprise customer, to the VHC.

The VHC receives the individual portion of the beam plan from the VHS (416) on the computer running the VHC modules at the enterprise customer site. In some implementations, the received beam plan may be displayed on the UI of the VHC software that is shown on the computer display. The UI may show the beams that are allocated to the enterprise customer. For example, the UI may display the geographic distribution of the beams, the beam power levels, interference from other beams, and the orientation of the user terminals for receiving the beams. In some implementations, the beam information may include data that the UI of the VHC uses to generate one or more of a map of power distribution over geography for a downlink beam, a map of G/T distribution over geography for an uplink beam, and a map of the target C/I distribution over geography for both uplink and downlink beams. In some implementations, the individual portion of the beam plan received by the VHC from the VHS includes the portion of the unified beam plan data structure previously described that is specific to the beams allocated to the enterprise user.

The beam plan shown on the UI provides information on the RF spectrum and bandwidth allocated to the beams. For each beam, the UI may display the starting frequency and the ending frequency, from which the beam bandwidth may be computed.

The operator determines whether the beam plan is acceptable (418). For example, the operator may examine the beam plan that is shown on the UI and check whether the beams meet the functional requirements that the operator had entered.

The operator may determine that the beam plan is not acceptable. For example, the bandwidth provided to each beam may not be sufficient for the connection data rate requirement. In some implementations, the beam plan may be deemed unacceptable even if the beam plan largely meets the communication service requirements. For example, the interference level indicated in the beam plan may be marginally higher than the agreed constraint, for a fraction of the total duration requested. However, the marginal variation may be unacceptable to the present needs of the enterprise customer.

In such an event, the operator rejects the beam plan (420). For example, the operator may enter a user input through the UI indicating that the beam plan is rejected. Based on the user input, the VHC sends a message to the VHS informing the latter that the beam plan has not been approved by the enterprise customer. In some implementations, when the plan is rejected, the operator may go back and update the functional requirements, and the process repeats (404). This may be done in an attempt to come up with communication service requirements that may yield an acceptable beam plan.

On the other hand, the operator may determine that the beam plan is acceptable. For example, the beam plan may satisfy all the communication service requirements, the constraint agreement, and the functional requirements. In some implementations, the beam plan may be marginally outside the communication service requirements for one or more parameters, such as the interference level being slightly higher than the agreed requirement for a fraction of the total duration requested. However, the operator may determine that the marginal variation does not affect substantially the present needs of the enterprise customer, and therefore may accept the plan.

If the beam plan is acceptable, the operator may enter user input through the UI indicating that the beam plan is accepted. Based on the user input, the VHC may send a message to the VHS instructing the VHS to deploy the plan (422). The operator also may configure the user terminals (424) such the transmission or reception in the allocated beams can be made. For example, the operator may ensure that the user terminals are oriented in the direction of the beams; the transmit and receive frequencies are set to the frequencies indicated in the beam plan; and the power levels of the antennas are set to values consistent with the power levels specified in the beam plan. Once the plan is deployed on board the satellite, the users of the enterprise customer may receive the service that has been requested.

In the manner described by the process 400, an enterprise customer may access beams in a satellite communications system that are customized to the service needs of the enterprise customer. Whenever the functional requirements change, the enterprise customer may re-run the process 400.

The VHC determines the updated communication service requirements based on the changed user functional requirements. In some implementations, the VHC performs the computations to determine the updated communication service requirements without using knowledge of communication service requirements calculated in the past. The VHC may then send the updated communication service requirements to the VHS. An updated beam plan may then be deployed to address the changed requirements. The enterprise customer may perform the updates as often as needed to address its functional requirements.

In some implementations, the VHC software modules may be deployed at the enterprise customer site when the enterprise customer signs up for network service with the satellite network provider. For example, the satellite network provider may provide the address of a website and a password to the operator at the enterprise customer site. The operator may access the website where links are available for the VHC software modules. The operator may be able to download and install the VHC software on the computer at the enterprise customer site after entering the password. The satellite network provider may periodically update the VHC software and distribute the updated software to the various enterprise customers through network connections, for example the terrestrial and/or space-based command/control channel.

Figure 5:
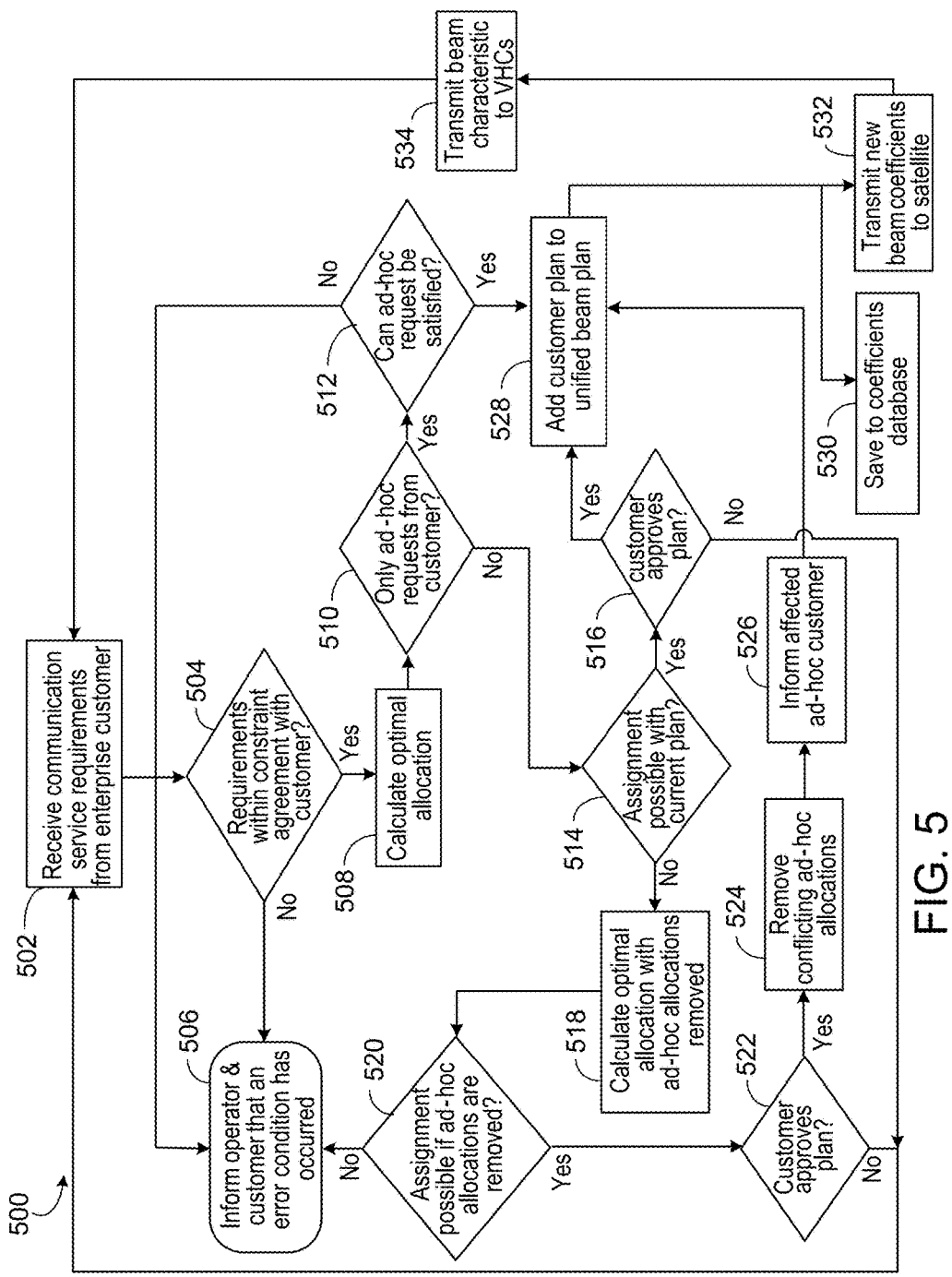
FIG. 5 illustrates an example process performed by a virtual hub server (VHS) for hierarchical beam management in a satellite communications system.

FIG. 5 illustrates an example process 500 performed by a virtual hub server (VHS) for hierarchical beam management in a satellite communications system. The process 500 may be performed by the VHS 204a at the offices of the satellite network provider in the satellite communications system 200. Accordingly, the following sections describe the process 500 in the context of the satellite communications system 200. However, the process 500 also may be performed by other devices in other networks or systems.

The process 500 may, for example, be implemented at the satellite network provider site to design a unified beam plan that addresses the communication service needs of the enterprise customers (as represented by the corresponding determined communication service requirements) while satisfying the constraint agreement established with each enterprise customer. For example, the VHS modules may be running on a computer at the satellite gateway 204 or at the NOC. The VHS modules may execute the process 500 whenever an enterprise customer sends a request for beams on the satellite 202.

Accordingly, the process 500 may be initiated when the VHS receives communication service requirements from an enterprise customer (502). For example, the VHS 204a may receive a request over the command/control channel for network resources from the VHC 206 associated with an enterprise customer. The request may include or specify communication resource requirements that may include, among other parameters, the locations over which beam coverage is needed; the bandwidth and power level for the beams; the percentage availability desired for the communication channel, and the duration for which the coverage is needed.

Upon receiving the request from the VHC, the VHS checks whether the communication service requirements are consistent with the constraint agreement with the customer (504). As described with reference to the process 400, an enterprise customer may first negotiate a constraint agreement with the satellite network provider before sending requests for resources. Therefore, when the VHS receives a request, the VHS checks whether the communication service requirements included in the request are within the limits set by the constraint agreement.

For example, the VHS checks whether the locations mentioned in the request fall within the geographic coverage requirements specified in the constraint agreement with the enterprise customer. The VHS also checks whether the nominal beam power requested is within the limits of the clear sky power in the agreement. Thirdly, the VHS ensures that the desired interference in the request is consistent with the interference power specified in the constraint agreement. Then the VHS checks whether the desired availability can be translated into power requirements during rain fade conditions that are achievable based on the extra rain power indicated in the agreement. Finally, the VHS checks whether the requested bandwidth for the beams is within the bandwidth limits mentioned in the agreement.

In some implementations, the request from the VHC may be ad-hoc such that the communication service requirements do not satisfy one or more parameters indicated in the constraint agreement. However, the agreement may include a provision that allows the enterprise customer to make ad-hoc requests. In such implementations, the request may indicate that it is an ad-hoc request and, therefore, the VHS may consider the request without checking the requirements against the constraint agreement. Alternatively, the VHS may consider the request as an ad-hoc request if it determines that one or more requirements do not satisfy the constraint agreement, but that the enterprise customer may make ad-hoc requests.

If one or more of the communication service requirements are not consistent with corresponding parameters within the constraint agreement, and the constraint agreement does not have a provision for ad-hoc requests, then the VHS informs the operator and the customer that an error condition has occurred (506). For example, the VHS may generate a warning message or an error message that is shown on the computer running the VHS. The warning or error message may be generated on the VHS UI that is shown on the computer display. The operator at the satellite network provider's office can see the message and, therefore, be informed that a request was made by a customer that violated the agreement with the customer. In addition, the VHS may send a message to the VHC making the request, such that the VHC can also display a warning or error message on the UI of the VHC at the enterprise customer's site.

On the other hand, if the communication service requirements are consistent with the parameters within the constraint agreement, or the request is an ad-hoc request that is covered by the constraint agreement, then the VHS proceeds to calculate an optimal allocation (508). The optimal allocation refers to the unified beam plan for all enterprise customers in the satellite communications system, which attempts to accommodate the communication service requirements of all active enterprise customers while ensuring that the constraint agreements with all the enterprise customers are satisfied. Therefore, to calculate the optimal allocation, the VHS may take into account the constraint agreements with all the enterprise customers and the communication service requirements for the active enterprise customers. An example of calculating a resource allocation for the unified beam plan is described following the description of the process 500.

In some implementations, the VHS modifies an existing unified beam plan to add the request. For this reason, the VHS may maintain a history of one or more unified beam plans that it had generated in the past. In some implementations, the VHS attempts to ensure that the network resources that have already been allocated to the currently active enterprise customers are not disturbed. However, in other implementations, the VHS may update the beam plans for the currently active enterprise customers while allocating resources for the new request.

For calculating the unified beam plan, the VHS determines whether the request includes only an ad-hoc request from the enterprise customer (510). For example, the connectivity specified by the enterprise customer in the request might all be for areas that are outside the geographic regions included in the constraint agreement. As another example, the date rate for all connections in the request may be higher than the bandwidth specified for the beams in the constraint agreement. In such cases, the request is outside the scope of the constraint agreement with the enterprise customer. The request is still given due consideration by the VHS since the constraint agreement may include the provision that the enterprise customer is allowed to make ad-hoc requests.

If the VHS determines that the request includes only an ad-hoc request from the enterprise customer, the VHS checks whether the ad-hoc request can be satisfied (512). The existing unified beam plan may have "holes" in the plan, which are network resources that have not been allocated to any particular enterprise customer. Some enterprise customers may not be utilizing the network resources all the time, even though they may have established constraint agreements with the satellite network provider. However, the agreements contractually obligate the satellite network provider to ensure that whenever an enterprise customer makes a request, the request can be accommodated at least within the constraints specified in the corresponding agreement. Therefore, the VHS maintains sufficient spare resources in the satellite communications system at all times such that requests from existing customers that fall within the bounds of their respective agreements can be accommodated.

In some implementations, when an ad-hoc request is received, the VHS checks whether the some of the spare resources can be allocated to satisfy the request. If that is not possible, the VHS may check whether some of the existing allocations can be modified to accommodate the new request, while ensuring that the active customers are not thrown out.

If the ad-hoc request still cannot be satisfied, the VHS rejects the request, since the VHS is not obligated to accommodate an ad-hoc request. In such an event, the VHS informs the operator and the customer that an error condition has occurred (506), as described previously. In this case, the error condition is that the ad-hoc request cannot be satisfied.

On the other hand, if the ad-hoc request can be satisfied, for example, by simply plugging in the communication service requirements into one of the "holes" in the existing unified beam plan, then the VHS adds the customer plan to the unified beam plan (528). The VHS updates the unified beam plan with the new allocation and proceeds to transmit to the satellite the beam coefficients for the new allocation, as described in the following sections.

On the other hand, if the request from the enterprise customer is not entirely an ad-hoc request, then the VHS is contractually obligated to allocate resources for the request, or at least for the non-ad hoc portions of the request. For example, the request may specify two connections. The communication service requirements for the first connection may be within the values specified in the constraint agreement, while the communication service requirements for the second connection may be outside the bounds of the constraint agreement. In such a case, the VHS may have to accommodate the first connection. The VHS also may accommodate the second connection, but it is not obligated to do so, since the second connection may be considered as an ad-hoc request. However, in some implementations, a request is considered non-ad hoc if the entire communication service requirements are within the constraint agreement, and otherwise the request is considered ad-hoc. In such implementations, the VHS has to accommodate the entirety of a non-ad hoc request. In the following sections, a non-ad hoc request is considered to include communication service requirements that are entirely satisfied by the constraint agreement, while noting that the description may be equally applicable to requests that are only partly non-ad hoc.

If the request is non-ad hoc, the VHS checks whether an assignment is possible with the current plan (514). For example, the VHS may check whether the communication service requirements indicated in the request can be satisfied by allocating some of the resources that are included as spare resources in the existing unified beam plan. As indicated earlier, this may be one of the primary reasons why the VHS maintains the spare resources—so that it may satisfy non-ad hoc requests from the enterprise customers without affecting the resources that have been allocated to active customers.

If the VHS determines that an assignment is possible with the current plan, the VHS identifies the beams that may be allocated to satisfy the request. The VHS then sends a prospective beam plan to the VHC at the enterprise customer so that the enterprise customer may approve or reject the plan. The beam plan is prospective because resources on the satellite are not yet deployed to create the beams that have been identified for allocation to satisfy the request. Instead, the resources on the satellite are deployed only if the enterprise customer approves the prospective beam plan.

As described previously, the prospective beam plan sent by the VHS to the VHC may provide information on the beams allocated for the connection in the request. The beam plan also may include information on one or more parameters of the resource allocation, such as the power levels of the beams, interference power, the assigned frequencies, the duration of allocation and the orientation of the user terminals for receiving the beams.

The VHS determines whether the customer approves the plan (516). For example, the VHS receives a message from the VHC at the enterprise customer site that indicates whether the enterprise customer has accepted or rejected the plan. If the message received from the VHC indicates that the customer beam plan has been approved by the enterprise customer, then the VHS adds the customer plan to the unified beam plan (528). The VHS updates the unified beam plan to include the beams that are allocated to the enterprise customer for the request, and proceeds to transmit to the satellite the beam coefficients for the new allocation, as described in the following sections.

On the other hand, if the VHS determines that the customer has not approved the plan, for example if the message received from the VHC indicates that the prospective beam plan has been rejected by the enterprise customer, the VHS discards the beam plan. The VHS proceeds to wait for new beam and performance requirements from the enterprise customer (502), and the process repeats.

Going back to the check whether an assignment is possible with the current plan (514), the VHS may determine that an assignment is not possible with the current plan. This may be the case when the unused resources included in the existing unified beam plan are not sufficient to satisfy the communication service requirements indicated in the request. For example, the beams that may be generated with the antenna elements available on the satellite cannot provide coverage in the locations indicated in the request; or, the frequency spectrum that is available in one of the requested coverage areas is not sufficient to provide the requested bandwidth.

If the VHS determines that an assignment is not possible with the current plan, the VHS may proceed to calculate an optimal allocation with the ad-hoc allocations removed (518). Since the request made by the enterprise customer is covered by the constraint agreement, the satellite network provider (that is, the VHS) is obligated to accommodate the communication service requirements in the request. However, since the request cannot be satisfied with the existing allocations, and ad-hoc allocations have lower priority compared to requests that are covered by constraint agreements, the VHS proceeds to check whether the request can be satisfied with one or more of the current ad-hoc allocations removed. For example, some existing beams in the requested coverage areas may be currently allocated to ad-hoc connections. The VHS may check whether the existing beams can satisfy the communication service requirements in the request if the ad-hoc connections are terminated, or moved to some other beams. As another example, the VHS may tweak substantial portions of the unified beam plan by removing some ad-hoc allocations, modifying the remaining beams or moving beams around to free resources for the request, to come up with an optimal allocation that may satisfy the request.

The VHS then checks whether an assignment is possible with the ad-hoc allocations removed (520). In some implementations, the VHS may determine that an assignment is not possible with the ad-hoc allocations removed. For example, the VHS may determine that even after removing all the ad-hoc allocations, the beams that are available cannot satisfy the communication service requirements in the request. This indicates an error in provisioning the satellite resources, since the satellite network provider should have verified the resources that it can guarantee while negotiating the constraint agreement with the enterprise customer. Consequently, the inability to satisfy the communication service requirements in a request that is within agreement may indicate that either the miscalculated the resources that are available at the time of negotiating the constraint agreement, or it had over-committed the resources to the enterprise customers.

Accordingly, the VHS may generate an error message on the UI shown on the display of the computer running the VHS. The message may inform the operator at the satellite network provider's office that there are errors in provisioning the satellite resources. In addition, the VHS may send a message to the VHC making the request, such that the VHC can also display a warning or error message on the UI of the VHC at the enterprise customer's site.

On the other hand, if the VHS determines that an assignment is possible with the ad-hoc allocations removed, the VHS identifies the beams that may be allocated to satisfy the request. The VHS then creates a prospective beam plan, which it sends to the VHC at the enterprise customer, and waits for confirmation whether the customer approves the plan (522). Subsequently, the VHS may determine that the customer has not approved the plan, for example if the message received from the VHC indicates that the prospective beam plan has been rejected by the enterprise customer. In that case, the VHS discards the prospective beam plan and proceeds to wait for new beam and performance requirements from the enterprise customer (502), and the process repeats.

However, if the enterprise customer approves the plan, then the VHS removes the conflicting ad-hoc allocations (524). The VHS may receive a message from the VHC at the enterprise customer site that indicates that the enterprise customer has approved the plan. In that case, the VHS removes the ad-hoc connections that are currently allocated beams that would interfere with the beams being allocated for the request. For example, the resource allocation for the request may be achievable only by taking away the beams that were previously servicing an ad-hoc connection, and allocating the beams for the request. Alternatively, the acceptable C/I for the beams allocated to the request may be possible only by removing some neighboring ad-hoc beams that would otherwise cause interference. In such cases, the VHS proceeds to terminate the corresponding ad-hoc connections and remove or reallocate the conflicting and/or interfering beams.

In some implementations, the VHS informs the affected ad-hoc customer (526). For example, before tearing down an active ad-hoc connection, the VHS may send a warning message to the enterprise customer using the ad-hoc connection. The message may be sent to the VHC associated with the affected enterprise customer, such that the VHC can display the warning on the UI of the VHC at the affected enterprise customer's site. This may allow the affected customer to wrap up activities on the ad-hoc connection, or try to find replacement resources for the ad-hoc connection.

Then the VHS adds the customer plan to the unified beam plan (528). The VHS updates the unified beam plan to accommodate the resources corresponding to the beam plan that has been approved for the request. For example, in some implementations, the beams corresponding to the recently-approved beam plan does not affect the other existing unified beam plans (although the beam plan affected the ad-hoc plans that have been cancelled to accommodate the new beam plan). In such implementations, the VHS updates the unified beam plan simply by plugging in the beams for the new beam plan in the unified beam plan.

In some other implementations, while adding the new beams to the unified beam plan, the VHS modifies the existing beams. For example, some existing beams that are neighbors of the new beams may cause interference that reduces the C/I for the new beams below the limits in the constraint agreement corresponding to the new beams. In such implementations, when adding the new beams to the unified beam plan, the VHS updates the power to the neighboring beams such that their side-lobes are made smaller, thereby reducing the interference caused by the neighboring beams.

After the unified beam plan has been updated by addition of the new beam plan for the enterprise customer, the VHS saves to the coefficients database (530). The VHS may be coupled to a database where the details of the unified beam plan are saved. For example, the database may be a hard disk or some other suitable form of persistent storage in the computer running the VHS. Alternatively, the database may be a networked storage server that is connected to the computer running the VHS. The current unified beam plan, and one or more previous unified beam plans may be saved to the database.

The VHS stores the beam coefficients for the beams in the updated unified beam plan in the database. The VHS may add the coefficients for the new beams to the already-stored coefficients for existing beams, or the VHS may update the entire table of coefficients. In addition, the VHS may store other parameters of the unified beam plan, such as the beam power levels, frequencies allocated to each beam, time duration for each beam, among others.

The VHS transmits the new beam coefficients to the satellite (532). For the new beams that are allocated based on the request, the VHS sends the coefficients to the satellite (such as 202) over the space processor command channel (for example, 212) via the satellite gateway (such as 204). The VHS also sends the coefficients to the satellite for any existing beams that are modified.

The coefficients may be sent as payload of command/control messages. Upon receiving the messages, the processor on board the satellite configures the antenna elements based on the coefficients to create the beam radiation patterns on the Earth covering the geographic areas corresponding to each beam. In some implementations, the satellite also stores the coefficients in the on-board memory (for example, memory 202b).

The VHS transmits the beam characteristics to the VHCs (534). The VHS sends the new beam plan that is deployed for the request to the VHC associated with the enterprise customer that made the request. If existing beams associated with any other enterprise customer is modified, the VHS sends the updated beam plans to the VHCs associated with the respective affected customers. In some implementations, the VHS sends the respective portions of the updated unified beam plan to all enterprise customers, even if some of the individual beam plans for some enterprise customers have not been modified.

The request from the enterprise customer is thereby addressed. The VHS proceeds to receive new requests with communication service requirements from the enterprise customers (502) and the process 500 repeats as described in the preceding sections.

Figure 6:
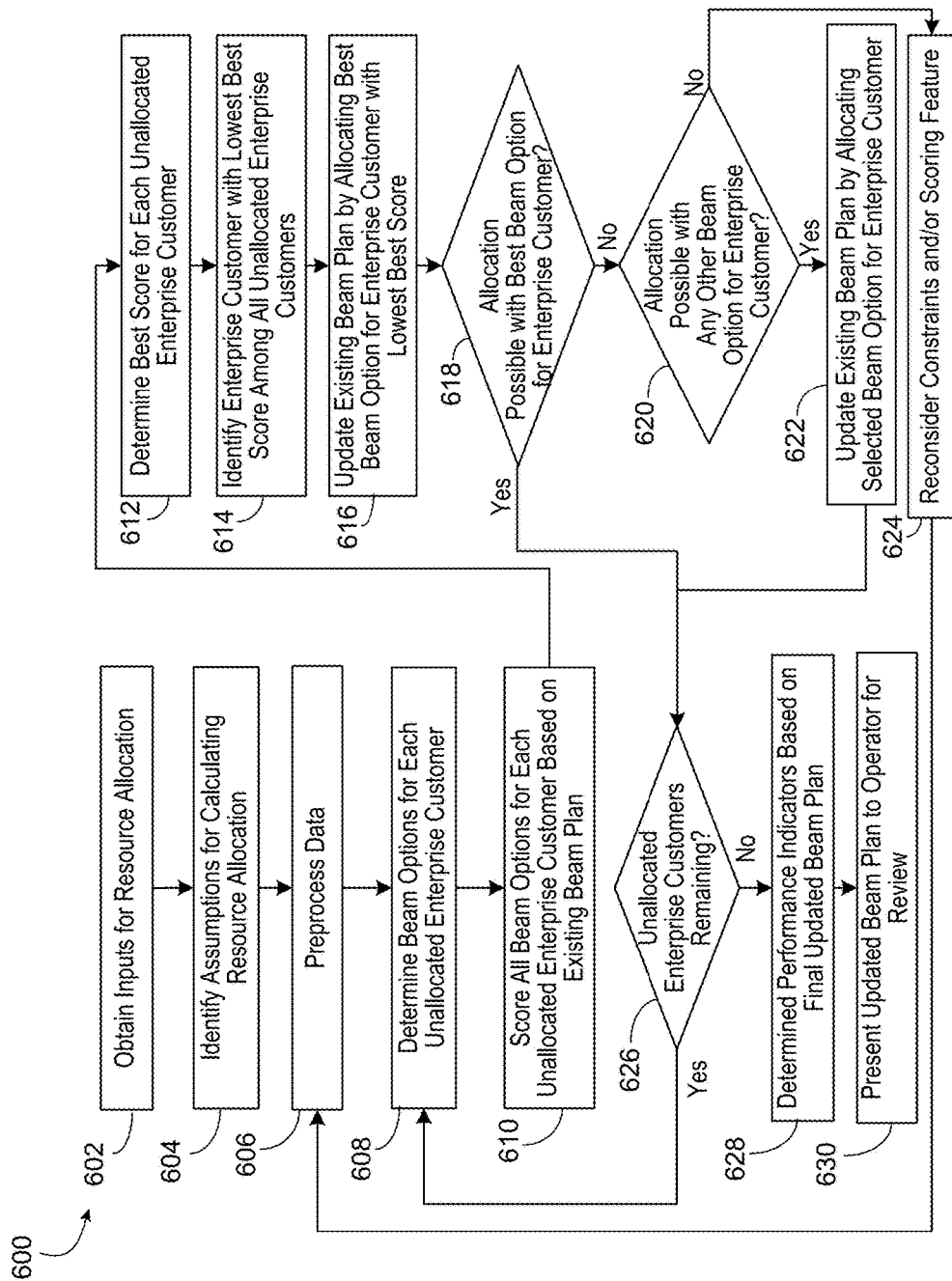
FIG. 6 illustrates an example process performed by a virtual hub server (VHS) for dynamic resource allocation in a satellite communications system.

FIG. 6 illustrates an example process 600 performed by a virtual hub server (VHS) for dynamic resource allocation in a satellite communications system. The process 600 may be performed by the VHS 204a at the offices of the satellite network provider in the satellite communications system 200. Accordingly, the following sections describe the process 600 in the context of the satellite communications system 200. However, the process 600 also may be performed by other devices in other networks or systems.

The VHS 204a performs the resource allocation described by the process 600 for generating a unified beam plan, or updating an existing unified beam plan to allocate beam options for a new enterprise customer. The process 600 may be performed by a resource allocation module implemented in the VHS for calculating an optimal or near-optimal allocation (508), (518). In some implementations, the resource allocation module performs the resource allocation based on a constrained optimization algorithm, which attempts to arrive at an optimal or near-optimal allocation of beams for the different enterprise customers subject to satisfying the communication service requirements that are established with the enterprise customers.

As part of the process 600, the resource allocation module obtains inputs for the resource allocation (602). For example, the resource allocation module accepts, as input, communication service requirements for VHCs. The communication service requirements may include, among other requirements, a list of uplink and downlink beams as one input for performing the computation. The list of beams may include all the beams that are requested by the VHCs associated with the enterprise customers. The beams may, for example, have been generated by the VHCs using the process 400 based on the functional and communication service requirements of the respective enterprise customer.

The coverage requirement is specified for each beam in the list of beams. For a spot beam, the coverage requirement may be specified as a list of point locations. For a geographic area, the coverage requirement may be specified as a polygon covering the area.

The power requirement for each beam in the list of beams, expressed as EIRP, is also specified. The EIRP may be specified either as a minimum power that is needed for the beam, or as an average power that may be needed for the beam. The EIRP may be a function of the bandwidth of the beam with wider beams requiring more EIRP.

The EIRP is specified only for beams that are downlink beams. For example, a 48 dBW EIRP may be specified for a downlink beam.

If a beam is an uplink beam, then a third parameter that is specified for the beam is the ratio of the antenna gain (G) to the effective temperature (T), that is, the G/T requirement for the beam, which is related to the signal quality of the beam that is received at the satellite. For example, an uplink beam may have a G/T of 17 decibels per kelvin (dB/K). The G/T may be specified either as a minimum G/T requirement for the uplink beam or as an average G/T requirement for the uplink beam.

In this context, the antenna gain G is a property of the receive antenna on the satellite that will be receiving a signal on the uplink beam from the user terminal. The effective temperature T is a measure of the thermal noise temperature that is related to the actual temperature of the receive antenna.

As described previously, the operator at the enterprise customer site enters the functional requirements for the users of the enterprise customer through the UI of the VHC running at the enterprise customer site. The VHC translates the functional requirements, such as the terminal characteristics of both transmit and receive user terminals, into communication service requirements for the enterprise customer.

In some implementations, the VHC runs a link budget calculation to determine the communication service requirements for the enterprise customer. For example, based on the functional requirements, the VHC may determine that a source user terminal will be transmitting a signal with W dBW EIRP that is received on the uplink beam by a receive antenna on the satellite with X G/T. The satellite will switch the signal to a transmitting antenna that transmits on the connected downlink beam with Y dBW EIRP. The signal is received by a destination user terminal on the ground with a Z G/T of the antenna at the user terminal. Based on the link budget calculation, the VHC can determine what modulation and coding scheme may be suitable to close the link from the source user terminal to the destination user terminal to achieve the desired data rate of M bits per second.

The VHC sends the EIRP and G/T requirements that are determined as described above to the VHS as part of the custom beam plan for the associated enterprise customer. The VHS receives such EIRP and G/T values from all VHCs that are requesting beam allocations on the satellite, and enters these EIRP and G/T values as an input for the resource allocation module.

Another input to the resource allocation module is the interference requirement for each beam. The interference requirement may be specified as a target C/I for a beam (for example, 16 dB), with the value being provided by the VHC as part of the custom beam plan for the associated enterprise customer. One objective for the resource allocation module is to maximize the C/I for each beam, which may be achieved by minimizing the interference (I) for the beam, since less interference results in more efficient data transfer (that is, more bits per hertz of bandwidth).

In addition to the list of uplink and downlink beams, the input to the resource allocation module includes the connectivity on the satellite between the uplink beams and the downlink beams. The connectivity specifies how each communication path from a user terminal to the satellite on the uplink will be switched to a communication path from the satellite to one or more second user terminals on the downlink so that an end-to-end "bent-pipe" connection may be established. The switching is performed by the satellite processor using the switching fabric on board the satellite.

The connectivity requirement also specifies the bandwidth for the end-to-end connection. The bandwidth of an uplink beam and a downlink beam that are connected to create a "bent pipe" between a single source user terminal and a single destination user terminal have to be the same.

In some implementations, one uplink beam may be connected to multiple downlink beams. For example, this may be the case for a multicast or a broadcast connection where a source user terminal may be transmitting to multiple destination user terminals. In such implementations, the connectivity information that is input to the resource allocation module will specify how the communication path on the uplink will be switched to multiple communication paths on the downlink. The bandwidth of the uplink beam may be different from the bandwidths of the downlink beams. In some cases, the bandwidth of the uplink beam may be an aggregate of the bandwidths of the downlink beams.

In some implementations, multiple uplink beams may be connected to one or more downlink beams. In such implementations, the connectivity information that is input to the resource allocation module will specify how the different communication paths on the uplink are switched to one or multiple communication paths on the downlink, as the case may be. The bandwidth of the uplink beams may be different from the bandwidth of the downlink beam, or the bandwidths of the downlink beams. In some cases, the bandwidth of the downlink beam may be an aggregate of the bandwidths of the uplink beams.

The output of the resource allocation module specifies the start and end frequencies for each beam, and the beam coefficients for the beam, in the list of beams. The difference between the start and the end frequencies for a beam correspond to the bandwidth for the beam. The output of the resource allocation module also specifies the power for the user terminals corresponding to the uplink beams, such as 1.3 watts for an uplink user terminal. The frequencies and the uplink power information for a beam are relayed to the VHC associated with the enterprise customer to whom the beam is allocated. The beam coefficients are relayed to the satellite such that the antenna elements may be configured to create the radiation patterns corresponding to the beams.

As a specific example, an enterprise customer may want to connect users in three cities A, B and C to a user in city D for a conference session. The VHC for the enterprise customer translates the functional requirement into communication service requirements for the conference session, based on which the VHC creates a custom beam plan that has three uplink beams, with one each for A, B and C. The custom beam plan has one downlink for city D.

The custom beam plan is sent to the VHS, which proceeds to check calculate resource allocation including the custom beam plan after ensuring that the custom beam plan is within the bounds of the constraint agreement with the enterprise customer.

The parameters that the VHS inputs to the resource allocation module for the custom beam plan includes the list of uplink beams for A, B and C, and the downlink beam for D. The uplink beam for A specifies the coverage required for city A, the G/T for the antenna receiving element on the satellite that will receive uplink beam for city A and the C/I and the bandwidth for the beam. Similarly, the uplink beams for cities B and C specify the coverage required for cities B and C respectively, the G/T for the antenna receiving elements on the satellite that will receive the uplink beams for B and C respectively, and the C/I and the bandwidths for the respective beams. The downlink beam for city D specifies the coverage required for city D, the EIRP for the antenna transmitting element on the satellite that will transmit the downlink beam for city D, and the C/I and the bandwidth for the downlink beam. The input parameters also specify that the uplink beams for A, B and C are to be connected to the downlink beam for D. The bandwidth for the downlink beam may be the sum of the bandwidths for the uplink beams.

The resource allocation module outputs the start and end frequency and the beam coefficients for each of the uplink beams for A, B and C, and the downlink beam for D. The resource allocation module also outputs the power that is needed on the user terminals for the uplink beams. The VHS sends the frequency and terminal power information to the enterprise customer, who accordingly sets the transmit power on the uplink user terminals and configures the tuners for the user terminals at A, B, C and D. The VHS sends the beam coefficients for the A, B, C and D beams, along with the beam coefficients for all other new and updated beams, to the satellite, which configures the antenna elements for the new and updated beams.

Continuing with the description of process 600, the resource allocation module identifies some assumptions for calculating the resource allocation (604). For example, the resource allocation module assumes that any portion of the bandwidth available at the satellite may be allocated to beams in any coverage area. Such an assumption may be useful since in some circumstances, the bandwidths that can be used in some coverage areas can be restricted due to regulatory issues.

Another assumption is that only simple beam shapes are considered. For example, the user terminals in a coverage area may be placed such that a single beam covering all the user terminals may result in a convoluted shape. In such cases, the resource allocation module may consider the user terminals in separate beams such that the shape of the beams may be kept simple.

A third assumption is that the size of the smallest bandwidth segment on the satellite. For example, the smallest bandwidth may be 2.5 MHz. Different connections may have different bandwidths, with the bandwidths allocated in multiples of 2.5 MHz. There may be an upper limit on the largest bandwidth segment. For example, the largest bandwidth segment may be 500 MHz. In this context, a fourth assumption is that when a bandwidth is allocated to beams for an enterprise customer, the bandwidth is in contiguous spectrum. For example, if two beams, each of bandwidth 10 MHz are allocated to an enterprise customer, then the frequencies of the beams may be 2150 MHz to 2160 MHz, and then 2160 MHz to 2170 MHz, which are contiguous. The frequencies of the two beams may not be 2150 MHz to 2160 MHz, and then 2200 MHz to 2210 MHz, since the two spectra are not contiguous.

The resource allocation module proceeds with the calculation of the optimal or near-optimal allocation after all the inputs have been entered. The calculation is split into several stages, which includes preprocessing, options development, option scoring, allocation, reprocessing and review, among others.

As a first stage in the calculation, the resource allocation module preprocesses the data (606). In some implementations, the VHS has cached values of radiation patterns for different antenna elements on the satellite that are provided to the resource allocation module. The resource allocation module uses the cached radiation patterns for each of the antenna element as seed values to determine beamforming coefficients for the antenna elements based on the input parameters.

During preprocessing, the resource allocation module determines beam options for each unallocated enterprise customer (608). In this context, an unallocated enterprise customer is an enterprise customer for which beams have not been allocated in the unified beam plan. In some implementations, the resource allocation module determines a set of reasonable beam options for each unallocated enterprise customer that would satisfy the communication service requirements for the enterprise customer, while taking into account the beams that have already been allocated to active enterprise customers. Therefore, the resource allocation module refers to the existing unified beam plan while coming up with possible beam options for the unallocated enterprise customers. However, in some other implementations, providing service to some enterprise customers may be more financially lucrative to the satellite network provider than providing service to other enterprise customers. As such, in these implementations, the resource allocation module may remove some capacity previously allocated to less financially lucrative enterprise customers and provide that capacity to unallocated enterprise customers who are more financially lucrative.

The beam options include beam coefficients corresponding to beams with usable service area that can cover a particular user terminal. The coverage area for a beam can extend for a reasonable distance around the center of the beam. The resource allocation module will consider beam coefficients that may cover the desired location, even if the corresponding beam is centered elsewhere, but will not consider beam coefficients that generate beams with no coverage at the desired location. For example, for a beam that is formed with Washington D.C. at its center, there is a reasonable chance that service from the same beam may be received at Baltimore, which is close to Washington D.C. However, the possibility that service from the same beam may be received at San Francisco is negligible, since the coverage area for a beam centered on Washington D.C. will likely not extend to such a great distance. Therefore, for a user terminal located in San Francisco, beam coefficients that create a beam centered over Washington D.C. are infeasible. Accordingly, the resource allocation module will not consider such beam coefficients while determining a beam covering San Francisco. However, the resource allocation module will consider such beam coefficients while determining a beam covering Baltimore.

Each beam option for an unallocated enterprise customer represents an alternative resource allocation for satisfying the communication service requirements of the enterprise customer. For example, for a downlink beam to a user terminal X, the resource allocation module may identify several combinations of the frequency spectrum (that is, the start and end frequencies and the bandwidth), the beam and EIRP of the transmit antenna element on the satellite that would satisfy the communication service requirements for X. Similarly, for an uplink beam from a terminal Y, the resource allocation module may identify several combinations of the frequency spectrum, the beam and G/T of the receive antenna element on the satellite that would satisfy the communication service requirements for Y.

For different uplinks or downlinks, the resource allocation module may come up with different combinations of beam options, each of which having different characteristics. An option for an uplink or a downlink is considered viable if the option satisfies the communication service requirements for the particular enterprise customer, such as desired coverage area, the bandwidth and the power at the user terminal.

In coming up with the options for an enterprise customer, the resource allocation module inputs the communication service requirements for the enterprise customer to a beam forming algorithm that produces a set of beams (and the corresponding beam coefficients) for the given communication service requirements. In some implementations, the beam forming algorithm outputs the best beam options that are possible for the particular communication service requirements.

The resource allocation module may use several different beam forming algorithms in determining the beam options for a given communication service requirement. A beam forming algorithm may perform trade-offs between different input parameters in generating multiple beam options. For example, the algorithm may use varying values of noise levels (that is, a combination of interference and thermal noise) in different iterations of the algorithm to come up with several beam options. Each beam option attempts to maximize the gain of the corresponding beam for different values of the noise level, while suppressing side lobes for the beam. Each of the beam options will be a slightly different beam shape from the other beam options for meeting the same communication service requirements.

Once the beam options are determined, the resource allocation module derives the gain of each beam, which is a function of the topography of the area covered by the beam, and the location of the user terminals within the coverage area. Then the resource allocation module uses the gain of the beam to derive the power for the beam option. The EIRP for the beam option is computed as the combination of the beam gain and the transmit power of the antenna element. The resource allocation module selects the absolute minimum EIRP that would satisfy the communication service requirements. The selection of the EIRP takes into account the minimum C/I for the beam option.

After the beam options are determined, the resource allocation module scores all beam options for the unallocated enterprise customers based on the existing beam plan (610). While all the beam options that are determined as described in the preceding section satisfies the communication service requirements, some of the options may be better than the other options in terms of satisfying the long term needs of the system. Therefore, the resource allocation module attaches a numeric score to each beam option to determine whether one option is better than another, or vice versa. The score for a beam option is computed in the context of the current unified beam plan, which may include allocated beams that are used by active enterprise customers. A score is attached to every candidate beam option that are determined for the enterprise customers seeking allocation, and the scored options are ranked in some order, for example, from the lowest score to the highest score.

The scoring feature that is used in computing the numeric score for the beam options is a weighted combination of some relevant aspect of the beam plan. For example, the scoring feature may be an aggregate average C/I of all the beams. Another scoring feature may be the amplifier back-off power level on the satellite, which represents how close satellite amplifiers are to saturation. A beam option that results in higher amplifier back-off level (that is, further from saturation) would get a higher score. The scoring feature also may be the satellite power used by the beam option, with an option that uses a lower satellite power being given a higher score. The unallocated bandwidth corresponding to each beam option may be used for scoring, with an option that results in greater unallocated bandwidth given a higher score. Other scoring features that may be used include the residual link margin (in dB) on the allocated enterprise customer.

When adding a score to an option, the resource allocation module considers the option in the context of the existing unified beam plan. The resource allocation module adds the option to the existing unified beam plan and calculates a score for the option in the context of the entire beam plan, for the given scoring feature.

For each enterprise customer, all the beam options that are determined are scored. For example, if there are 20 new enterprise customers and 10 beam options are determined for each enterprise customer, then the resource allocation module computes scores for a total of 200 options.

Once the options are scored, the resource allocation module determines the best score for each unallocated enterprise customer (612). For all the beam options corresponding to each enterprise customer, the resource allocation module identifies the beam option that has garnered the highest score. The highest score is selected as the best score for the particular enterprise customer.

After the best score for all the enterprise customers have been selected, the resource allocation module identifies the enterprise customer with the lowest best score among all the unallocated enterprise customers (614). The lowest best score for the enterprise customer indicates that the beam options that are available to the enterprise customer are less than the beam options that are available to other unallocated enterprise customers. Therefore, before allocating beam plans for other enterprise customers, the resource allocation module allocates the beam plan for the enterprise customer with the lowest best score.

The resource allocation module updates the existing beam plan by allocating the best beam option for the enterprise customer with the lowest best score (616). For example, the resource allocation module selects the beam option corresponding to the best score for the enterprise customer with the lowest best score, and adds the selected beam option to the existing unified beam plan. In the process, the resource allocation module determines whether the allocation is possible with the best beam option for the enterprise customer (618). For example, the resource allocation module may determine that the beam option corresponding to the best score for the enterprise customer with the lowest best score would create interference for an allocated beam being used by an active enterprise customer to an extent that would lower the C/I for the allocated beam below the margin corresponding to the customer service requirements (and/or the constraint agreement) for the active enterprise customer. The beam option for the unallocated customer cannot be modified (for example, by reducing the sizes of the side lobes) to reduce the interference to a sufficient level that the C/I for the allocated beam would satisfy the communication service requirements.

If the resource allocation module determines that the allocation is possible with the best beam option for the unallocated enterprise customer under consideration, then the enterprise customer is then removed from the selection pool. The resource allocation module checks whether there are unallocated enterprise customers remaining (626) and the proceeds to re-compute the beam options for the remaining unallocated enterprise customers (608) based on the unified beam plan that is recently updated.

However, if the resource allocation module determines that the allocation is not possible with the best beam option for the unallocated enterprise customer being considered, then the resource allocation module checks whether allocation is possible with any other beam option for the enterprise customer (620). In the event that the beam option with the highest score (that is, the best beam option) cannot be allocated and there are one or more other beam options available for the enterprise customer, then the resource allocation module checks whether one of the other beam options can be allocated in the existing unified beam plan.

In some implementations, for each enterprise customer, the resource allocation module have sorted the beam options in order from the beam option with the highest score to the beam option with the lowest score. The resource allocation module may have performed the ordering previously, for example, when it determined the beam option with the highest scores for the unallocated enterprise customers. Therefore, upon failing to allocate the best beam option for the enterprise customer with the lowest best score, the resource allocation module attempts to allocate the next-best beam option for the particular enterprise customer, that is, the beam option with the second highest score. If the second beam option cannot be allocated, then the resource allocation module attempts to allocate the third beam option (if available), and so on, till either the allocation is successful, or the beam options for the enterprise customer under consideration are exhausted.

If the resource allocation module is successful in allocating an alternative beam option (that is, a beam option other than the one with the highest score) for the enterprise customer, then the resource allocation module updates the existing beam plan by allocating the selected beam option for the enterprise customer (622). It is to be noted that the enterprise customer being considered is the enterprise customer with the lowest best score among all the remaining unallocated enterprise customers.

The resource allocation module then removes the allocated enterprise customer from the selection pool and checks whether there are unallocated enterprise customers remaining (626). If there are unallocated enterprise customers remaining, the resource allocation module proceeds to re-compute the beam options for the remaining unallocated enterprise customers (608) based on the unified beam plan that is recently updated.

If the resource allocation module determines that allocation is not possible with any other beam option for the enterprise customer with the lowest best score among all unallocated enterprise customers (620), then a failure mode is reached. This may be the case, for example, when the communication service requirements or the constraints for the enterprise customer have values that cannot be satisfied by any candidate beam option for the enterprise customer. Alternatively, or in addition, this may be the case when the scoring feature used for scoring the beam options is inadequate, that is, the scoring feature does not consider all the constraints that are indicated by the communication service requirements. For example, the scoring feature that is used is based entirely on unused bandwidth and does not consider the C/I for the beams. Consequently, the beam options that are generated may not be able to satisfy the C/I specified in the communication service requirements when the beam options for all the enterprise customers are considered together during the allocation and reprocessing stages. In such cases, the resource allocation module reconsiders the constraints and/or the scoring feature (624), and reprocesses the data (606) based on modified constraints and/or scoring features.

As described previously, in some implementations, the existing unified beam plan already has beams allocated to existing enterprise customers. This may be the case when the resource allocation module is run in an incremental mode for updating the unified beam plan with new enterprise customers. In such cases, the resource allocation module adds the allocated beams for a new enterprise customer to the list of allocated beams for existing enterprise customers.

While adding the option for the new enterprise customer in the incremental mode, the allocated beams for some of the existing enterprise customers may be affected. In such cases, the resource allocation module reprocesses the allocated beams for the affected existing enterprise customers while adding the allocation for the new enterprise customer. For example, the side lobes of an existing beam used by an active enterprise customer may cause significant interference to a new beam allocated to a new enterprise customer, resulting in a C/I for the new beam that is below the limit set in the constraint agreement with the new enterprise customer. The resource allocation module may modify the beam coefficients of the existing beam to suppress the side lobes without affecting the primary lobe, such that the interference caused to the new beam is reduced, resulting in a C/I for the new beam that is within the limits of the constraint agreement with the new enterprise customer.

In some other implementations, the resource allocation module may start the calculations with an existing unified beam plan that is empty. This may be the case when the resource allocation module is run in a full mode for updating the unified beam plan with all new enterprise customers. In such cases, the resource allocation module adds the beam allocations for the enterprise customer with the lowest best score to the empty beam plan, then iterates over the remaining enterprise customers and adds the allocation with the next-lowest best score, and so on. In this manner, the resource allocation module populates the empty beam plan. It is to be noted that after adding the beam allocations for the enterprise customer with the lowest best score to the empty beam plan, the plan is no longer empty. In this case, re-processing the options for the remaining unallocated enterprise customers is similar to the re-processing for a non-empty beam plan.

The scoring features that are used may depend on whether the existing unified beam plan is empty or non-empty. Some scoring features, such as C/I, depend on beam allocations being present in the existing unified beam plan, since the interference I is due to the beams from other enterprise customers. Therefore, such scoring features may not be selected when the existing unified beam plan is empty. Some other scoring features, such as the amplifier back-off power, does not depend on the presence of other beams in the plan. Therefore, such scoring features may be selected when the existing unified beam plan is empty.

In some implementations, scoring features that may not be useful when the unified beam plan is empty, such as C/I, may be unused initially when the unified beam plan is empty, but may then be taken into consideration after at least one beam option is allocated in the unified beam plan. For example, the resource allocation module may start with an empty beam plan, but wants to include C/I and output back-off for scoring. Initially, when the unified beam plan is empty, the resource allocation module uses only the output back-off as the scoring feature. However, after one enterprise customer has been allocated a beam option in the unified beam plan, such that the unified beam plan is no longer empty, then the resource allocation module may then use both C/I and output back-off for scoring. This may be achieved by assuming C/I is very large initially (when I=0), or by scoring slightly differently (for example, as I/C).

Once the beam option for an enterprise customer is allocated in the unified beam plan, the beam options for the unallocated enterprise customers may be affected. For example, an enterprise customer X may be allocated a beam with a frequency spectrum from A to B and a power P. When considering allocating a neighboring beam to an enterprise customer Y with the same frequency spectrum, the C/I for the neighboring beam may be reduced due to interference caused by the side lobes of the beam allocated to X. Therefore, during the reprocessing stage, the beam options for enterprise customers who have not been allocated are recomputed (608).

In a conventional system where the beams are pre-computed, the reprocessing of the beam options as described above are not possible. Instead, a beam option for an enterprise customer, which is not yet allocated, that does not meet the communication service requirements for the enterprise customer due to the allocation to another enterprise customer, is discarded. Accordingly, the hierarchical beam management implementation with the VHS described here has the flexibility of modifying candidate beam options that is not possible in conventional systems.

The reprocessing may be done separately for the uplink beams and the downlink beams, since the communication service requirements in the two directions are different. When considering a candidate downlink beam option for an enterprise customer, the beams that have been already been allocated to all other enterprise customers are considered in aggregate. This is because the C/I for the candidate downlink beam option is affected by the aggregate interference caused by the neighboring downlink beams that share the same frequency spectrum (that is, co-channel beams). For example, a candidate downlink beam option for enterprise customer X may have a C/I that is below the communication service requirements for X due to interference from co-channel beams for enterprise customers Y and Z, where the co-channel beams for Y and Z already have been allocated. In such a case, the resource allocation module can either increase the power for the candidate downlink beam for X to increase C, and/or modify the co-channel beams for Y and Z to reduce I.

Increasing the power for a downlink beam also may increase the side lobes for the beam, thereby causing greater interference in neighboring beams. Therefore, in some implementations, the resource allocation module may not increase the power P of the candidate downlink beam option for X or may increase the power P by a smaller amount. Additionally or alternatively, the resource allocation module may attempt to modify the beam coefficients for the co-channel beams for Y and Z such that the interfering side lobes of the Y and Z beams on the X beam are reduced without affecting the primary lobes of the Y and Z beams.

If the attempt successfully increases the C/I for the candidate downlink beam option for X such that a C/I that is consistent with the communication service requirements for X is achieved, then the candidate downlink beam option for X with, if applicable, an increased power P is considered a viable option. If the co-channel beams for Y and Z were modified to enable the beam option X to satisfy the communication service requirements, then the modified beam coefficients for the co-channel beams for Y and Z are accepted as the updated beam coefficients for the allocated beams for Y and Z.

On the other hand, if the attempt at modifying the beam coefficients for the co-channel beams for Y and Z and/or increasing the beam X power does not increase the C/I for the candidate downlink beam option for X to a value that satisfies the communication service requirements for X, then the candidate downlink beam option for X may be discarded. The beam coefficients for the co-channel beams for Y and Z may be reverted to the previous values without accepting the modifications.

On the other hand, when considering a candidate uplink beam option for an enterprise customer, the beams that have already been allocated to other enterprise customers do not need to be considered. Instead, the co-channel interference caused by the co-channel adjacent beams Y and Z may be decreased by simply changing the beam forming coefficients of beam X to reduce the side lobes of beam X without substantially affecting the primary lobes of beam X. As such, the C/I for the candidate uplink beam option depends only on the shape of beam X.

If the attempt successfully increases the C/I for the candidate uplink beam option such that the C/I satisfies the communication service requirements for the associated enterprise customer, then the candidate uplink beam option is considered as a viable option. Otherwise, the resource allocation module discards the candidate uplink beam option.

In the above manner, beam options are allocated to the enterprise customers iteratively and the unified beam plan is updated. When the resource allocation module determines that there are no unallocated enterprise customers remaining (626), the resource allocation module determines performance indicators based on the final updated beam plan (628). For example, the resource allocation module computes various parameters for the allocated beam options, such as C/I, link margins and other key performance indicators, based on final unified beam plan and power levels.

The resource allocation module presents the updated beam plan to the operator for review (630). For example, the resource allocation module may present the final unified beam plan, along with the computed parameters, to the operator of the VHS for review. The operator may approve the plan and proceed to deploy the beam coefficients on the satellite. Alternatively, the operator may reject the plan and provide a new scoring feature that is used by the resource allocation module to perform the computations all over again.

Figure 7A:
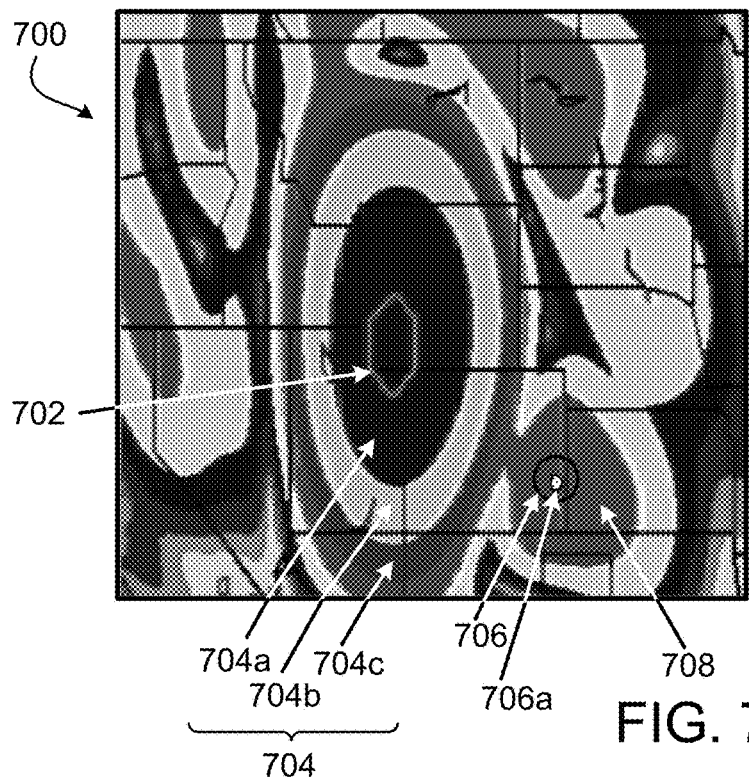
FIGS. 7A and 7B illustrate an example user interface (UI) of a VHC that is shown on a display coupled to a computer running the VHC.
Figure 7B:
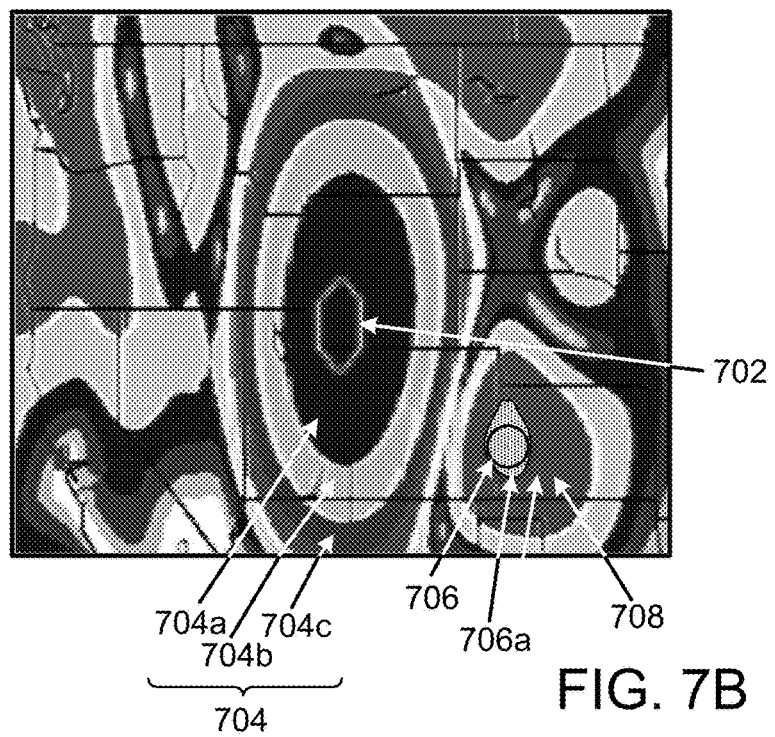

FIGS. 7A and 7B illustrate an example UI 700 of a VHC that is shown on a display coupled to a computer running the VHC. The UI 700 shown in FIG. 7A is displayed at a time preceding the time when the UI 700 shown in FIG. 7B is displayed. The UI may correspond to a VHC 206 in the satellite communications system 200. Accordingly, the following section describes the UI 700 with reference to the satellite communications system 200. However, the UI 700 also may be implemented by other VHCs in other systems.

The UI 700 may be shown on the computer display such that an operator of the enterprise customer sitting in front of the computer can see how the beams allocated to the enterprise customer change over time, for example, due to the addition of removal of beams for other customers in the unified beam plan. The coverage area corresponding to the enterprise customer is given by the hexagon 702.

The region covered by the primary lobe of the beam that is allocated to the enterprise customer for covering the area 702 is given by 704. The primary lobe provides the connectivity in the coverage area 702. The gain in the primary lobe varies with distance from the center of the beam (that is, the coverage area 702). For example, the region 704a that includes coverage area 702 has the highest gain, followed by the region 704b, and then by the region 704c, and so on.

Region surrounding the region 704 may be covered by one or more side lobes of the beam. For example, 708 represents a region that is affected by a side lobe of the beam that is providing coverage for the area 702. The side lobes may interfere with neighboring beams. For example, a beam may be intended for providing coverage to the area 706 where another enterprise customer is active on the same frequency as the enterprise customer associated with region 702. However, FIG. 7A shows that the side lobe in the region 708 interferes with the beam that is intended for providing coverage to the area 706, such that the beam is unable to produce meaningful gain for covering the entire region 706. Instead, the beam is shown to cover region 706a.

The VHS may modify the beam for the enterprise customer corresponding to the UI 700, to reduce the interference caused to the beam covering 706 by the side lobe 708 of the beam covering the area 702. In some implementations, the VHS modifies the beam by changing the beam coefficients such that the side lobes are reduced without affecting the primary lobe.

When the VHS sends the portion of the beam plan corresponding to the enterprise customer associated with the region 702, the modified beams shown on the UI 700 is illustrated in FIG. 7B. As shown, the gain over the region 704 due to the primary lobe has remained largely unchanged. However, the side lobe patterns have changed, which is indicated by the region 708 in FIG. 7B being smaller than the corresponding region in FIG. 7A. The VHS has intentionally adjusted the side lobe covering region 708 such that the interference in region 706 is reduced. Consequently, the C/I of the beam that is providing coverage to the area 706 has increased, such that the region 706a is considerably greater in FIG. 7B compared to that in FIG. 7A. As shown in FIG. 7B, the beam is able to produce sufficient gain to cover region 706.

Accordingly, the operator at the enterprise customer site, sitting in front of the computer running the VHC modules, can see on the UI 700 the variations in the patterns of the beams allocated to the enterprise customer. The VHS may send the beam characteristics to the VHC whenever the beam is updated. The VHC modules will correspondingly update the beam patterns displayed on the UI 700.

As described above, the satellite communication system 100 may attempt to mitigate fade conditions. For example, using dynamic fade mitigation 304 as described above in the context of FIG. 3. The following describes dynamic fade mitigation in greater detail.

Figure 8:
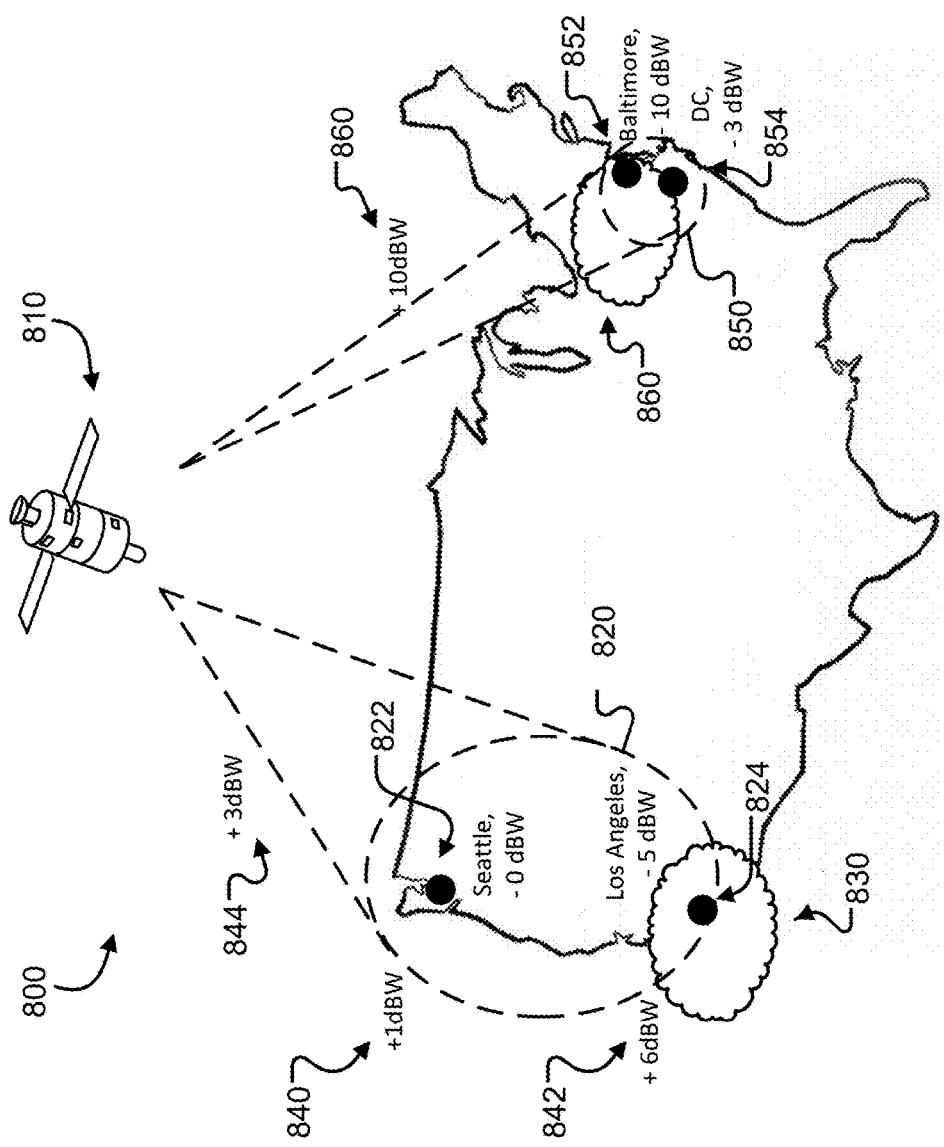
FIG. 8 illustrates an example satellite communications system that may be used for fade mitigation.

FIG. 8 illustrates an example satellite communications system 800 that may be used for dynamic fade mitigation. The satellite communications system 800 may include a satellite 810 that forms beams that provide service over geographical areas. For example, the satellite 810 may generate a regional beam 820 that covers Seattle 822 and Los Angeles 824 and a spot beam 850 that covers Baltimore 852 and the District of Columbia (DC) 854.

In the context of fade mitigation, a regional beam and a spot beam may be differentiated in that the gain of the regional beam may be adjusted for geographical areas covered by the regional beam, e.g., the gain may be increased in one portion and decreased in another portion, while the gain of the spot beam may not be adjusted for geographical areas covered by the spot beam, e.g., the gain may not be increased in one portion and decreased in another portion. For example, the regional beam may be re-shaped so that a gain in a top quarter of the regional beam is increased by 3 dBW while the gain in the bottom three quarters of the regional beam is reduced by 1 dBW. Reshaping a regional beam may allow the total power of the beam to be maintained while still increasing power received in certain areas by offsetting the increase in power by decreasing power received in other areas. The ability of beams to be re-shaped may be based on the amount of area covered by the beams. For example, beams that cover larger areas, e.g., regional beams, may generally be re-shaped and beams that cover smaller areas, e.g., spot beams, may generally not be re-shaped.

As shown in FIG. 8, a rain cloud 830 is located over Los Angeles 824. The rain cloud 830 may fade the regional beam 820 for users in Los Angeles 824. For example, the regional beam 820 as received by users in Los Angeles 824 may be attenuated by −5 dBW. Because Seattle 822 has clear skies, the same regional beam 820 may be unfaded for users in Seattle 822. For example, the regional beam 820 received by users in Seattle may be attenuated by 0 dBW. FIG. 8 shows another rain cloud 860 over Baltimore 852 and DC 854. The rain cloud 860 entirely covers Baltimore 852 and partially covers DC 854, resulting in greater fade in Baltimore 852 and less fade in DC 854. For example, the spot beam 850 as received by users in Baltimore 852 may be attenuated by −10 dBW and the spot beam 850 as received by users in DC 854 may be attenuated by −3 dBW.

To mitigate fade, the satellite communications system 800 may re-shape and/or change the power level of the regional beam 820 and the spot beam 850. The power level for a beam may correspond to the power with which the beam is transmitted. In one mitigation example, the satellite 810 may increase the power for transponders that produce the regional beam 830 and may re-shape the regional beam 830 so that there is greater gain in the bottom half of the regional beam 830. The satellite 810 may increase the overall power of the regional beam 830 by 3 dBW and increase the gain in the bottom half of the regional beam 830 so that the power of the regional beam 830 is increased by 6 dBW for Los Angeles 824 to offset the fade of −5 dBW for Los Angeles 824.

The satellite 810 may increase the gain in the bottom half of the regional beam 830 by reducing the gain in the top half of the regional beam 830. For example, even though the overall power of the regional beam 820 may be increased by 3 dBW, the gain of the regional beam 820 in Seattle 822 may be reduced by 2 dBW so that the power of the regional beam 820 received in Seattle 822 is only increased by 1 dBW. Accordingly, if a constraint agreement as described above specifies 50 dBW of EIRP of clear sky power for Los Angeles 824, the satellite communications system 800 may mitigate for fade of −5 dBW in Los Angeles by increasing the EIRP for Los Angeles 824 to 56 dBW by increasing the power level of the beam by 3 dBW and increasing the gain in Los Angeles by another 3 dBW.

In another example, the satellite 810 may be able to increase the power of transponders that produce the spot beam 850 but may be unable to re-shape the spot beam 850. For example, the satellite 810 may increase the power level of the spot beam 850 by 10 dBW to offset the fade of −10 dBW in Baltimore. Accordingly, if a constraint agreement specifies 40 dBW of EIRP of clear sky power for Baltimore 852, the satellite communications system 800 may mitigate for fade of −10 dBW in Baltimore by increasing the EIRP for Baltimore 852 to 50 dBW by increasing the power level of the beam by 10 dBW.

Figure 9:
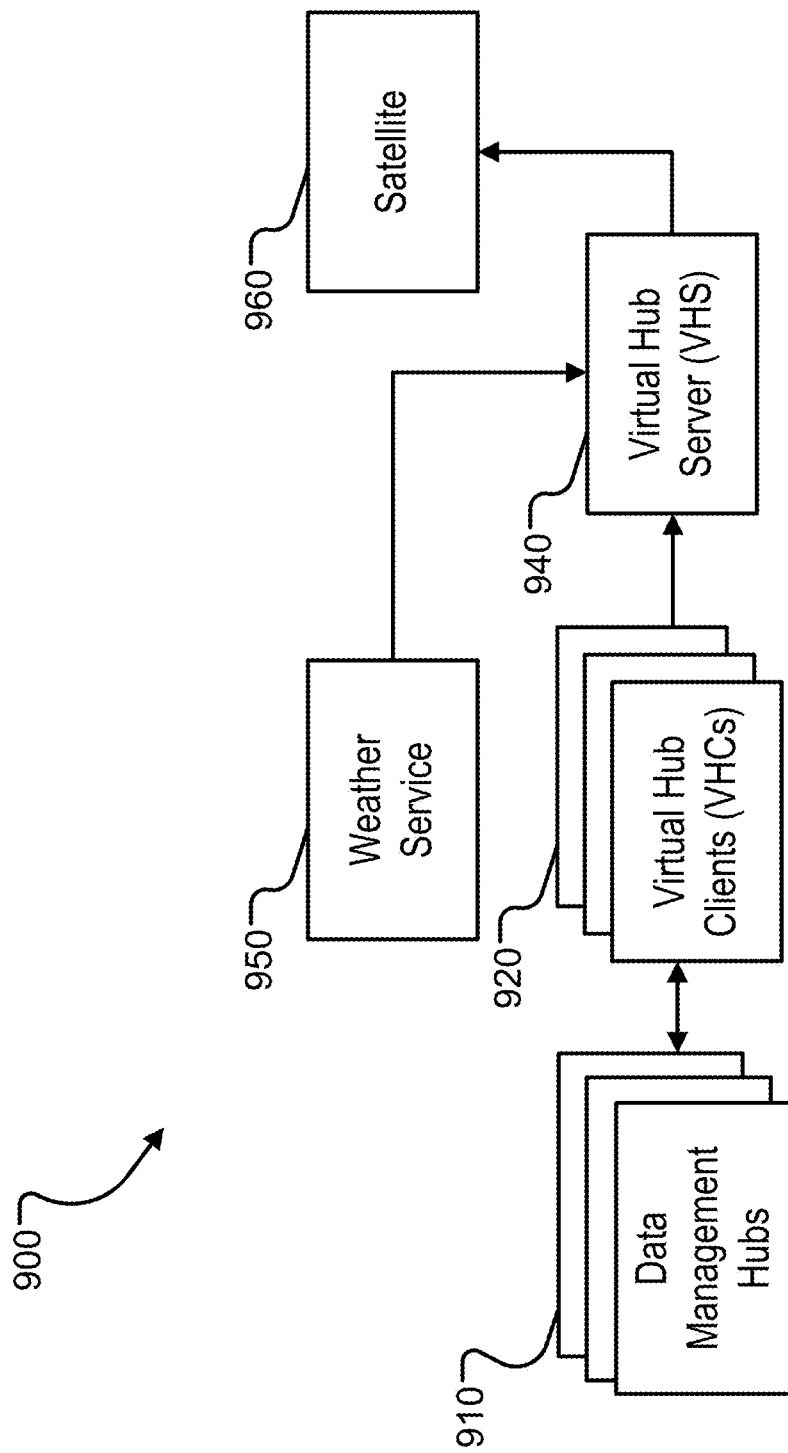
FIG. 9 illustrates a block diagram of an example satellite communications system that may be used for fade mitigation.

FIG. 9 illustrates a block diagram of an example satellite communications system 900 that may be used for fade mitigation. The satellite communications system 900 may include data management hubs 910, VHCs 920, a VHS 940, a weather service 950, and a satellite 960. The data management hubs 910 may be connected to multiple user terminals and may obtain QoS measurements for user terminals. A QoS measurement may be an indication of an amount of fade or may be an indication of a QoS from which the amount of fade may be extrapolated or otherwise determined.

The database management hubs 910 may obtain QoS measurements for user terminals based on information received from the user terminals. For example, each database management hub 910 may be connected to one hundred user terminals and may receive a frame error indicator each time a user terminal receives an incorrect frame. From the frame error indicators, the database management hubs 910 may calculate a frame error rate, and from the frame error rate, calculate an estimated fade for a location of the user terminals. Alternatively, the database management hubs 910 may calculate a signal to noise ratio, and from the signal to noise ratio, calculate an estimated fade experienced by the user terminals. The database management hubs 910 may use "Propagation Data and Prediction Methods Required for the Design of Earth-Space Telecommunication Systems," Recommendations of the ITU-R, Rec. P.618-10, 2009, Kalman filters, and/or other filters to estimate the amount of fade of a signal at a particular frequency based on a frame error rate or signal to noise ratio The data management hubs 910 may provide the QoS measurements to the VHCs 920. The data management hubs 910 may provide the QoS measurements to the VHCs 920 using a pulling methodology. For example, the data management hubs 910 may provide the QoS measurements for the last minute to the VHCs 920 in response to requests from the VHCs 920 that are received every minute. Alternatively, the data management hubs 910 may provide the QoS measurements to the VHCs 920 using a pushing methodology. For example, the data management hubs 910 may provide the QoS measurements for the last minute to the VHCs 920 every minute without any requests from the VHCs 920. While time intervals of a minute are described, the time interval may be other time intervals, e.g., a second, half a minute, fifteen minutes, an hour, a day, etc.

The VHCs 920 may be similar to the VHCs 206 described above for FIG. 2, and may particularly provide the QoS measurements received from the data management hubs 910 to the VHS 940. For example, the VHCs 920 may serve as passthroughs so that the QoS measurements from the data management hubs 910 may be forwarded to the VHS 940. The VHCs 920 may also provide QoS requirements to the VHS 940. For example, the VHCs 920 may provide data to the VHS 940 that indicates users serviced by a beam have a high priority of service because a service agreement specifies that these users are required to receive 99.99% uptime on their service. In contrast, other users serviced by another beam may have a lower priority because their service agreement instead specifies a lower 95% uptime. While the VHCs 920 may provide the QoS requirements to the VHS 940 with QoS measurements, the QoS requirements may change infrequently, e.g., daily or weekly, such that the QoS measurements provided to the VHS 940 by the VHCs 920 may not always be accompanied by QoS requirements. The VHS 940 may additionally or alternatively receive QoS requirements separately.

The weather service 950 may provide weather service data to the VHS 940. For example, the weather service data may indicate weather conditions for particular geographical areas. Weather conditions indicated by the weather service data may include temperatures, rain, snow, sleet, hail, thunderstorms, hurricanes, solar flares, etc. The weather service data may indicate previous weather conditions, e.g., for the last hour, current weather conditions, e.g., for the last minute, or predicted weather conditions, e.g., for the coming minute or hour. The weather service data may be provided in real-time to the VHS 940. For example, the weather service 950 may provide updated weather service data to the VHS 940 every second or minute, etc. The weather service data may be received in the form of satellite imagery or a listing of particular geographic areas and corresponding weather conditions for the geographic areas.

The VHS 940 may be similar to the VHS 300 that may include a dynamic fade mitigation module 304 as described above for FIG. 3, and may particularly receive the QoS measurements and QoS requirements from the VHCs 920, and receive the weather service data from the weather service 950. The VHS 940 may then calculate a mitigating unified beam plan that mitigates fade. The mitigating unified beam plan may be similar to the unified beam plan, except with modifications to beam coefficients and power levels of beams to mitigate fade. For example, to mitigate fade over a particular location that is covered by a regional beam, the mitigating unified beam plan calculated by the VHS 940 may both modify beam coefficients to re-shape the regional beam to increase gain over the particular location and increase the power level of the regional beam to increase the overall power of the particular regional beam. The VHS 940 may then transmit the mitigating unified beam plan to the satellite 960 for deployment. The VHS 940 may calculate and transmit the mitigating unified beam plan periodically, e.g., every minute, fifteen minutes, or hour, etc., or in response to a change in the mitigating unified beam plan, e.g., a change in beam coefficients and/or a power level indicated by the mitigating unified beam plan.

The satellite 960 may receive the mitigating unified beam plan from the VHS 940. For example, through a satellite gateway (not shown but may be similar to satellite gateway 204 shown in FIG. 2). The satellite 960 may then adjust the signals from individual antenna elements from the satellite 960 based on the beam coefficients and the power levels of beams. For example, the satellite 960 may change the phases and/or gain for particular signals from particular antenna elements based on changes in beam coefficients. In another example, the satellite 960 may change the gain for all signals from antenna elements for a particular regional beam or spot beam based on a change in power level of the regional beam.

Figure 10:
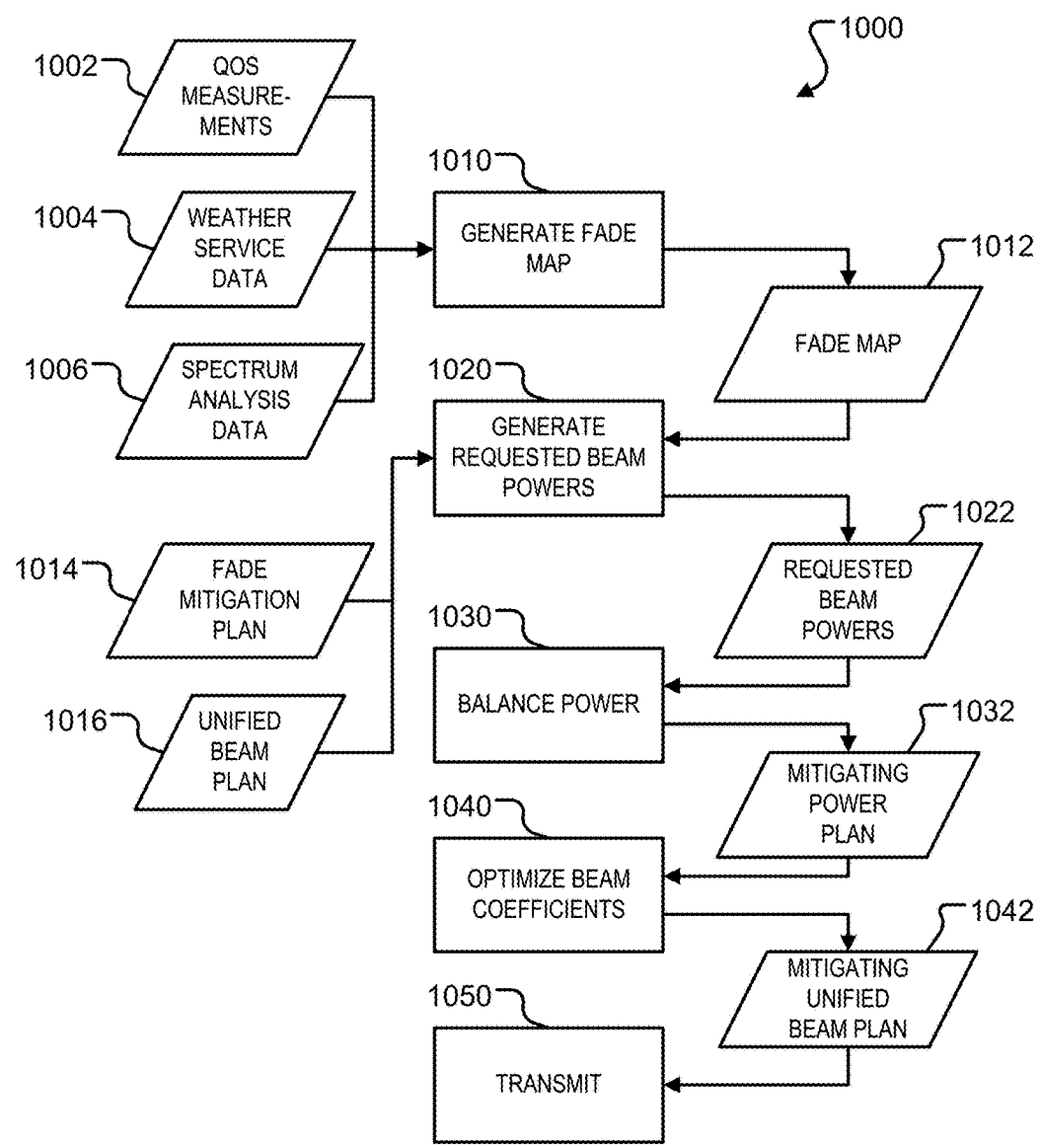
FIG. 10 illustrates an example process for fade mitigation.

FIG. 10 illustrates an example process 1000 for fade mitigation. The process 1000 may be performed by the VHS 940 in the satellite communications system 900. Accordingly, the following sections describe the process 1000 in the context of the satellite communications system 900. However, the process 1000 also may be performed by other devices in other networks or systems.

As a general overview, the VHS 940 may generate a fade map 1012 based on QoS measurements 1002, weather service data 1004, and spectrum analysis data 1006 (1010). The VHS 940 may then generate requested beam powers 1022 based on the fade map 1012, a fade mitigation plan 1014, and a unified beam plan 1016 (1020). The VHS 940 may then generate a mitigating power plan 1032 based on the requested beam powers (1030). The VHS 940 may then generate a mitigating unified beam plan 1042 based on the mitigating power plan 1032. The VHS 940 may then transmit the mitigating unified beam plan to the satellite 960 for deployment (1050).

Figure 11:
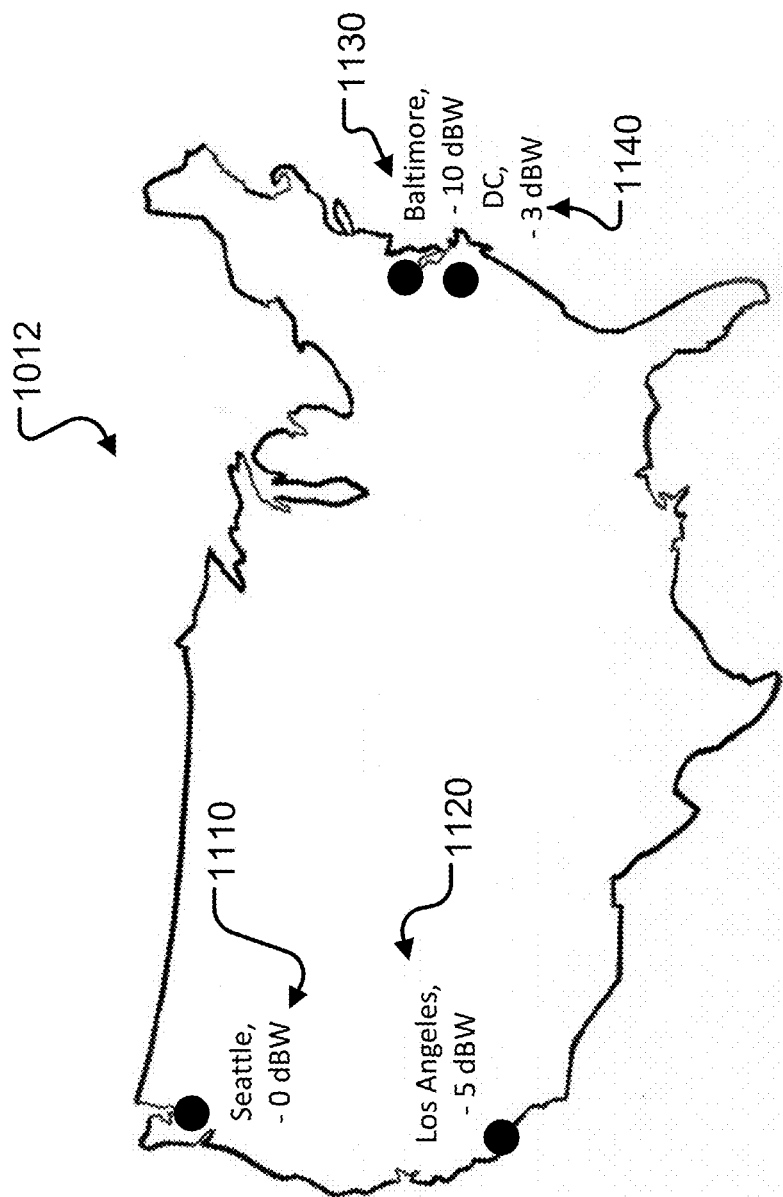
FIG. 11 illustrates an example fade map.

In more detail, the VHS 940 may generate the fade map 1012 based on received QoS measurements, weather service data, and spectrum analysis data (1010). FIG. 11 illustrates an example fade map 1012. The fade map 1012 may be a data structure that represents an amount of fade at particular locations and particular frequencies. The fade map 1012 may indicate the frequency for the fade as the amount of fade at the same location may be different for different frequencies. For example, rain may attenuate a beam with a frequency of 11 GHz for a location by −5 dBW and attenuate a beam with a frequency of 14 GHz for the location by −10 dBW.

The fade map 1012 may show the fade for signals at Seattle 1110, Los Angeles 1120, Baltimore 1130, and DC 1140. For example, the fade for a signal at 11 GHz to Seattle 1110 may be 0 dBW as the skies may be clear in Seattle 1110, the fade for a signal at 11 GHz to Los Angeles 1120 may be −5 dBW as it may be raining in Los Angeles 1120, the fade for a signal at 11 GHz to Baltimore 1130 may be −10 dBW as it may be heavily snowing in Baltimore 1130, and the fade for a signal at 11 GHz to DC 1140 may be −3 dBW as it may be cloudly in DC 1140.

As mentioned above, the fade map 1012 may also include additional fades for different locations and/or different frequencies. For example, while not shown, the fade map 1012 could also include a fade for a signal at 14 GHz to Los Angeles with −8 dBW and a fade for a signal at 13 GHz to Chicago. In some implementations, the fade at each location for each frequency may be based on an average fade across a period of time. For example, the fade may represent an average of fade during a previous minute instead of a fade at the exact instant in time.

Returning to FIG. 10, the VHS 940 may generate the fade map based on QoS measurements received from VHCs 920, weather service data received from the weather service 950, and spectrum analysis data received from the satellite 960. The spectrum analysis data may be information from the satellite 960 that may indicate noise based on signals received by the satellite 960. The VHS 940 may use the QoS measurements, weather service data, and spectrum analysis data to generate the fade map based on determining the fade at particular locations for particular frequencies.

For example, the VHS 940 may use known methods, e.g., methods based on "Propagation Data and Prediction Methods Required for the Design of Earth-Space Telecommunication Systems," Recommendations of the ITU-R, Rec. P.618-10, 2009, to calculate a fade for a particular location at a particular frequency based on a particular weather condition at the particular location. In another example, the VHS 940 may use known methods to calculate fade for a particular location at a particular frequency based on QoS measurements associated with the particular location. For example, the VHS 940 may receive frame error rates experienced by user terminals in various locations and calculate fade for the various locations based on the frame error rates. In yet another example, the VHS 940 may receive a signal to noise ratio for user terminals in various locations and calculate fade for the various locations based on the signal to noise ratios. In still another example, the VHS 940 may receive spectrum analysis data from the satellite 960 and calculate fade for various locations based on the spectrum analysis data.

In some implementations, the VHS 940 may generate the fade map 1012 based on averaging the fades calculated for particular locations and particular frequencies based on the QoS measurements, weather service data, and spectrum analysis data. For example, the VHS 940 may calculate a fade of −4 dBW for a signal at 11 GHz to Los Angeles based on the QoS measurements, a fade of −6 dBW for the signal based on the weather service data, and a fade of −5 dBW for the signal based on the spectrum analysis data. The VHS 940 may then average the fades of −4 dBW, −6 dBW, and −5 dBW to determine a fade of −5 dBW for a signal at 11 GHz to Los Angeles. In some implementations, the VHS 940 may also weight the QoS measurements, weather service data, and spectrum analysis data. For example, the VHS 940 may give greater weight to fade calculated based on the QoS measurements as the QoS measurements may be more accurate.

In some implementations, the fade map 1012 may represent a prediction of an amount of fade at particular locations and particular frequencies. For example, the VHS 940 may generate a fade map that indicates −3 dBW for a frequency of 12 GHz to DC 1140 even though the average fade during the last minute was −2 dBW based on determining from the weather service data that rain will intensify and/or determining from the QoS measurements that the fade is increasing.

In some implementations, the VHS 940 may generate the fade map 1012 based on requests from VHCs 920. The request may be to increase the power for a particular location for a certain amount of time. For example, QoS measurements, weather service data, and spectrum analysis data may indicate no fade in Baltimore, but an operator of a VHC may request that the power to Baltimore be increased by 5 dBW for the next hour. Accordingly, the VHS 940 may generate the fade map 1012 to indicate a corresponding amount of fade of −5 dBW in the fade map 1012 during the next hour.

Returning to FIG. 10, the VHS 940 may then generate requested beam powers 1022 based on the fade map 1012, a fade mitigation plan 1014, and a unified beam plan 1016 (1020).

Figure 12:
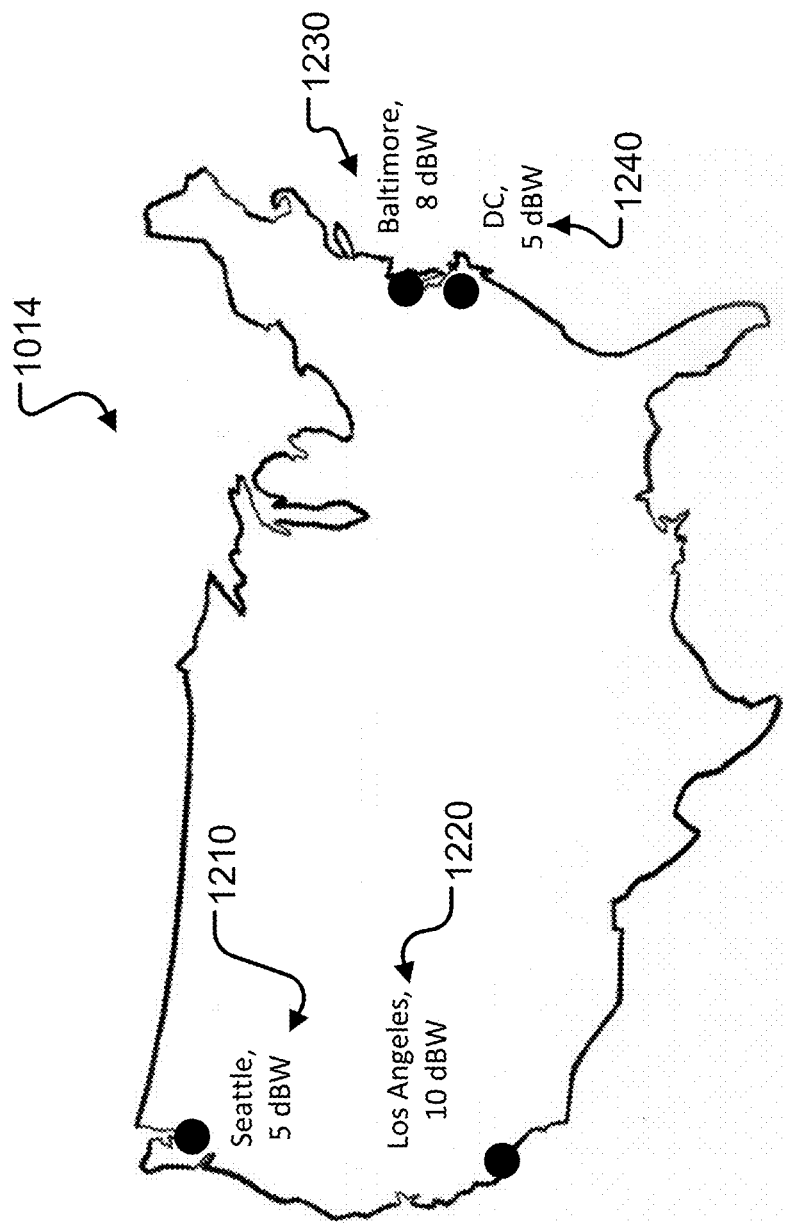
FIG. 12 illustrates an example fade mitigation plan.

FIG. 12 illustrates an example fade mitigation plan 1014. The fade mitigation plan 1014 may be a data structure that indicates a fade margin for particular locations. The fade margin may represent a maximum amount of power that a beam for the particular location may be increased to attempt to mitigate fade. For example, the fade mitigation plan 1014 may indicate a fade margin of a particular beam to Seattle 1210 may be 5 dBW, a fade margin of a particular beam to Los Angeles 1220 may be 10 dBW, a fade margin of a particular beam to Baltimore 1230 may be 8 dBW, and a fade margin of a particular beam to DC 1240 may be 5 dBW.

The VHS 940 may calculate the fade mitigation plan 1014 based on priority levels of beams, QoS requirements, and/or service agreements. For example, the VHS 940 may calculate higher fade margins for beams that are of high priority level to clients that have service agreements for higher QoS. In a particular example, enterprise customer one has a service agreement indicating that the service must have a 99% uptime and that the service be provided to users associated with enterprise customer one that are located in Los Angeles. Enterprise customer two has a service agreement indicating that the service must have a 95% uptime and that the service be provided to users associated with enterprise customer two that are located in Seattle and DC. These uptime requirements may then be converted to fade margins using known techniques for the calculation of the fade mitigation plan 1014.

FIG. 13 illustrates an example unified beam plan 1016. The unified beam plan 1016 may be similar to the unified beam plan that is determined in the process 400 performed by a VHC for hierarchical beam management in a satellite communications system, as described above for FIG. 4. The unified beam plan 1016 may be a data structure that identifies beams, and for each beam, identifies the frequency, beam coefficients, and the power level for the beam. For example, the unified beam plan 1016 may specify that a beam identified as "Beam 1" is at frequency "Frequency 1" with beam coefficients "Coefficients 1" and at a power level of "Power 1," and may specify that a beam identified as "Beam 2" is at frequency "Frequency 2" with beam coefficients "Coefficients 2" and at a power level of "Power 2."

FIG. 14 illustrates an example requested beam powers 1022. The requested beam powers 1022 may be a data structure that identifies beams and corresponding power levels for the beams. For example, the requested beam powers 1022 may specify that a beam identified as "Beam 1" may have a power level change of "Power Change 1" and a beam identified as "Beam 2" may have a power level change of "Beam Change 2." A power level change may indicate a change in power level from a power level for the beam indicated in the unified beam plan 1016.

Figure 15A:
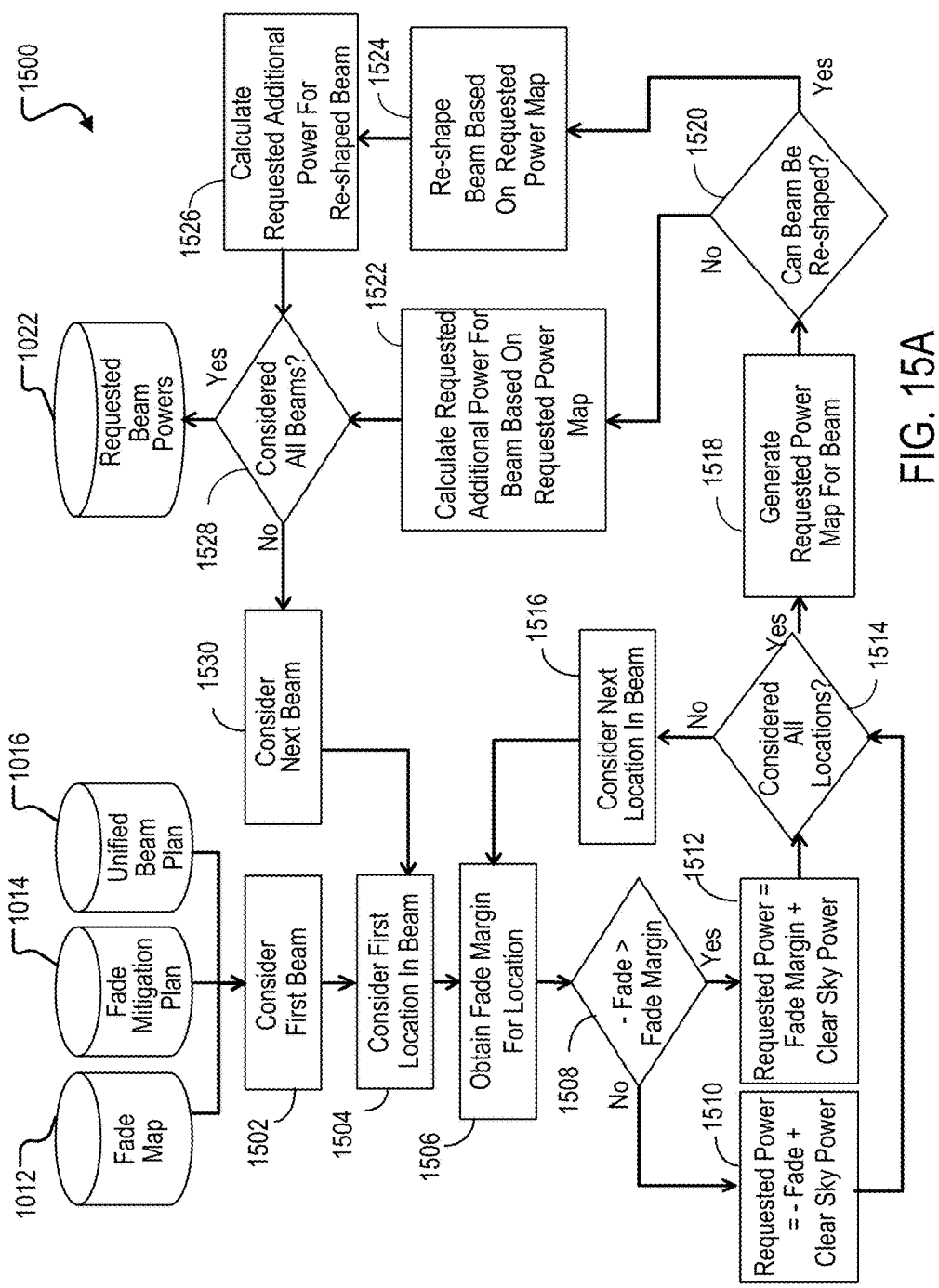
FIG. 15A illustrates an example process for generating requested beam powers.

FIG. 15A illustrates an example process 1500 for generating requested beam powers 1022. The process 1500 may be performed by the VHS 940 in the satellite communications system 900. Accordingly, the following sections describe the process 1500 in the context of the satellite communications system 900. However, the process 1500 also may be performed by other devices in other networks or systems.

Initially, the VHS 940 may obtain the fade map 1012, the fade mitigation plan 1014, and the unified beam plan 1016. For example, as described above, the VHS 940 may calculate the fade map 1012, the fade mitigation plan 1014, and the unified beam plan 1016. The VHS 940 may then consider a first beam (1502). The VHS 940 may consider the first beam by considering a beam in the unified beam plan 1016. For example, the VHS 940 may consider beam "Beam 1" in the unified beam plan 1016 which may cover both Baltimore and DC.

The VHS 940 may consider a first location in the beam (1504). The VHS 940 may consider the first location by considering a location indicated by the fade mitigation plan 1014. For example, the fade mitigation plan 1014 may indicate that the beam "Beam 1" covers both Baltimore and DC and the VHS 940 may first consider DC.

The VHS 940 may obtain a fade margin for the location (1506). The VHS 940 may obtain the fade margin for the location for the beam based on the fade mitigation plan 1014. For example, the VHS 940 may obtain a fade margin of 5 dBW for DC for the beam "Beam 1" based on an indication in the fade mitigation plan 1014 that the fade margin for DC for the beam "Beam 1" is 5 dBW.

The VHS 940 may determine if the negative of a fade for the location indicated by the fade map 1012 is greater than the fade margin (1508). For example, the VHS 940 may determine if the negative of a fade of −3 dBW, for a frequency that matches "Beam 1" and for DC, indicated by the fade map 1012 is greater than the obtained fade margin of 5 dBW for DC. In another example, the VHS 940 may determine if the negative of a fade of −10 dBW, for a frequency that matches "Beam 1" and for Baltimore, indicated by the fade map 1012 is greater than the fade margin of 8 dBW for Baltimore.

If the negative of the fade is not greater than the fade margin, then the VHS 940 may determine a requested power for the location based on the negative of the fade indicated by the fade map 1012 and a clear sky power for the location (1510). For example, the VHS 940 may determine the requested power for DC for "Beam 1" is 53 dBW based on adding the negative of the fade of −3 dBW for DC with a clear sky power of 50 dBW for DC.

If the negative of the fade is greater than the fade margin, then the VHS 940 may determine a request power for the location based on the fade margin for the location and the clear sky power (1512). For example, the VHS 940 may determine the requested power for Baltimore for "Beam 1" is 58 dbW based on adding the fade margin of 8 dBW for Baltimore for a frequency that matches "Beam 1" with a clear sky power of 50 dBW for Baltimore.

The VHS 940 may then determine if all locations for the beam have been considered (1514). For example, the VHS 940 may determine that beam "Beam 1" covers Baltimore and DC, and determine if a requested power has been calculated for Baltimore and DC. If the VHS 940 determines that not all locations for the beam have been considered, the VHS 940 may consider the next location in the beam (1516) and repeat the process 1500 from obtaining a fade margin for the location (1506). For example, after calculating a requested power for DC for beam "Beam 1," the VHS 940 may determine that a requested power has not yet been calculated for Baltimore and consider Baltimore as the location and repeat the process 1500 with obtaining a fade margin for a frequency that matches "Beam 1" and for Baltimore. The VHS 940 may iteratively consider each location in the beam until all locations for the beam have been considered. For example, if the beam covers one thousand locations for which a fade margin and a fade are available, the VHS 940 may iteratively consider all one thousand locations and calculate a requested power for each of the one thousand locations.

If the VHS 940 determines that all locations for the beam have been considered, the VHS 940 may generate a requested power map for the beam (1518). For example, after calculating the requested power for both DC and Baltimore, the VHS 940 may determine that all locations for beam "Beam 1" have been considered and generate a requested power map for beam "Beam 1." In some implementations, the VHS 940 may generate the requested power map gradually as each location is considered. For example, the VHS 940 may add the requested power for each location to the requested power map as the requested powers are calculated.

Figure 15B:
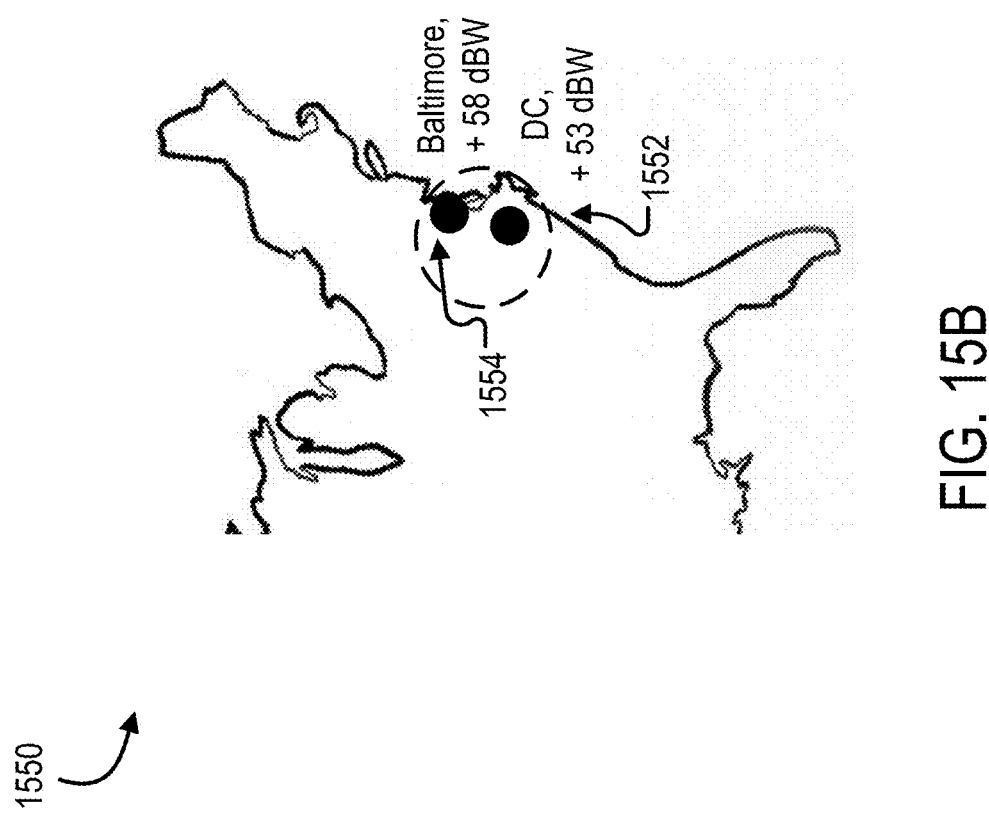

FIGS. 15B and 15C illustrate example requested power maps. FIG. 15B illustrates an example requested power map 1550 for a spot beam covering DC 1552 and Baltimore 1554. The requested power map 1150 may be a data structure that indicates calculated request powers for all locations for the spot beam. For example, the requested power map 1550 may indicate a calculated request power of 53 dBW for DC 1552 and a calculated request power of 58 dBW for Baltimore. FIG. 15C illustrates an example requested power map 1560 for a regional beam covering Seattle 1562 and Los Angeles 1564. The requested power map 1560 may be a data structure that indicates calculated request powers for all locations for the regional beam. For example, the requested power map 1560 may indicate calculated request powers of 50 dBW for Seattle 1562 and 55 dBW for Los Angeles 1564.

Returning to FIG. 15A, the VHS 940 may generate a requested power map for the beam (1518). The VHS 940 may generate the target requested map based on the calculated request powers for the locations in the beam. For example, if the VHS 940 calculates a request power of 58 dBW for Baltimore and a request power of 53 dBW for DC, the VHS 940 may generate the requested power map 1550 shown in FIG. 15B by mapping the calculated requested powers to a geographical map. In another example, if the VHS 940 calculates a request power of 50 dBW for Seattle and 55 dBW for Los Angeles, the VHS 940 may generate the requested power map 1560 shown in FIG. 15C by mapping the calculated requested powers to a geographical map.

The VHS 940 may determine if the beam being considered may be re-shaped (1520). The VHS 940 may determine if the beam being considered is a regional beam that may be re-shaped by changing gains in different areas covered by the regional beam, or a spot beam that may not be re-shaped by changing gains in different areas covered by the spot beam. For example, the VHS 940 may determine that a beam that covers Baltimore and DC is a spot beam that covers too little area to be re-shaped. In another example, the VHS 940 may determine that a beam that covers Seattle and Los Angeles is a regional beam that covers enough area to be re-shaped.

If the beam may not be re-shaped, the VHS 940 may calculate a requested additional power for the beam based on the requested power map for the beam (1522). For example, the VHS 940 may calculate that a power of a spot beam should be increased by 8 dBW based on the requested power map. The VHS 940 may calculate the requested additional power for the beam based on identifying the location in the requested power map with the highest requested power. For example, the VHS 940 may calculate the requested additional power of 8 dBW for the beam shown in the requested power map 1550 of FIG. 15B based on identifying that the power of 58 dBW for Baltimore 1554 is the highest requested power in the spot beam and is 8 dBW greater than the current power of 50 dBW for the spot beam. The VHS 940 may base the requested additional power based on the highest requested power because if the VHS 940 satisfies the highest requested power for a location in the beam, the VHS 940 will also satisfy any lower requested power for a location in the beam.

If the beam may be re-shaped, the VHS 940 may re-shape the beam based on the requested power map (1524). For example, if the beam is a regional beam that may be re-shaped, the VHS 940 may determine how to adjust the gains of different areas covered by the regional beam to best satisfy the requested powers indicated by the requested power map. The VHS 940 may re-shape the beam based on calculating new beam coefficients for the beam that result in gain changes in areas that best correspond to the requested powers indicated by the requested power map. For example, the VHS 940 may re-shape the regional beam shown in FIG. 15C by changing the beam coefficients by increasing the gain of the beam over Los Angeles by 2 dBW and decreasing the gain of the beam by 2 dBW over another area, e.g., the area over the ocean, areas with no users, and/or areas providing extra power to users.

The VHS 940 may then calculate a requested additional power for the re-shaped beam (1526). The VHS 940 may calculate the requested additional power for the re-shaped regional beam based on ensuring that all locations covered by the re-shaped regional beam receive at least the amount of requested power indicated by the requested power map. For example, the VHS 940 may calculate that a re-shaped regional beam that covers Seattle and Los Angeles needs an increase of 3 dBW in power to ensure that Seattle receives at least 50 dBW and Los Angeles receives at least 55 dbW. The VHS 940 may calculate the additional power to be the largest difference between requested powers for locations indicated by the requested power map of the regional beam and the power for the locations based on the re-shaped beam. For example, the VHS 940 may calculate that Seattle has a requested power of 50 dBW and with the re-shaped beam is still receiving 50 dBW, and calculate that Los Angeles has a requested power of 55 dBW and with the re-shaped beam is now receiving 52 dBW. Accordingly, the VHS 940 may determine that additional power needed for the regional beam is 3 dBW to increase the power of 52 dBW to Los Angeles to the requested power of 55 dBW for Los Angeles.

The VHS 940 may then determine if all beams have been considered (1528). For example, the VHS 940 may determine if all beams indicated in the unified beam plan 1016 have been considered in the process 1500. If the VHS 940 determines that all beams have not been considered, the VHS 940 may consider another beam (1530) and repeat the process 1500 from considering a first location in the beam (1504). For example, after calculating the additional power for beam "Beam 1" that covers Baltimore and DC, the VHS 940 may determine that the additional power for beam "Beam 2" that covers Seattle and Los Angeles has not been calculated and repeat the process 1500 with considering Seattle in beam "Beam 2" and obtaining a fade margin for Seattle.

If the VHS 940 determines that all beams have been considered, the VHS 940 may generate the requested beam powers (1022). For example, after calculating the additional power for beams "Beam 1" through "Beam N," and any beam coefficients for beams that may be re-shaped, the VHS 940 may generate the requested beam powers 1022 shown in FIG. 14 that may indicate each beam and a power level change for each beam. The power level change for a beam may be the requested additional power for the beam. For example, if the requested additional power for beam "Beam 1" is 8 dBW, the power level change indicated by requested beam powers 1022 for beam "Beam 1" may be 8 dBW. While not shown, the requested beam powers 1022 may also include any new calculated beam coefficients for re-shaping a beam. In some implementations, the VHS 940 may generate the requested beam powers gradually as each beam is considered. For example, the VHS 940 may add the requested additional power for each beam to the requested power map as the requested additional power is calculated.

In an example, based on the beams and requested fade maps shown in FIG. 15B and FIG. 15C and described above, the requested beam powers 1022 may include an indication of a first beam that covers Baltimore and DC has a power level change of 8 dBW, and a second beam that covers Seattle and Los Angeles has a power level change of 3 dBW with new beam coefficients that re-shape the second beam to increase the gain over Los Angeles by 2 dBW.

Returning to FIG. 10, the VHS 940 may then generate a mitigating power plan 1032 based on the requested beam powers (1030). FIG. 16 illustrates an example mitigating power plan 1032. The mitigating power plan 1032 may be a data structure that indicates beams and power level changes for the beams. The mitigating power plan 1032 may be similar to the requested beam powers 1022, but the mitigating power plan 1032 may indicate power level changes that have been balanced based on the power capabilities of the satellite communications system 900. For example, the requested beam powers 1022 may request power level changes that are an increase of 20 dBW, but the satellite communications system 900 may be only capable of increasing power levels by 16 dBW, or in other words, may only have a power margin of 16 dBW. Accordingly, the satellite communications system 900 may balance the power capabilities of the satellite communications system 900 with the requested beam powers 1022 to generate the mitigating power plan 1032 that may indicate power level changes that are within the capabilities of the satellite communications system 900.

Figure 17:
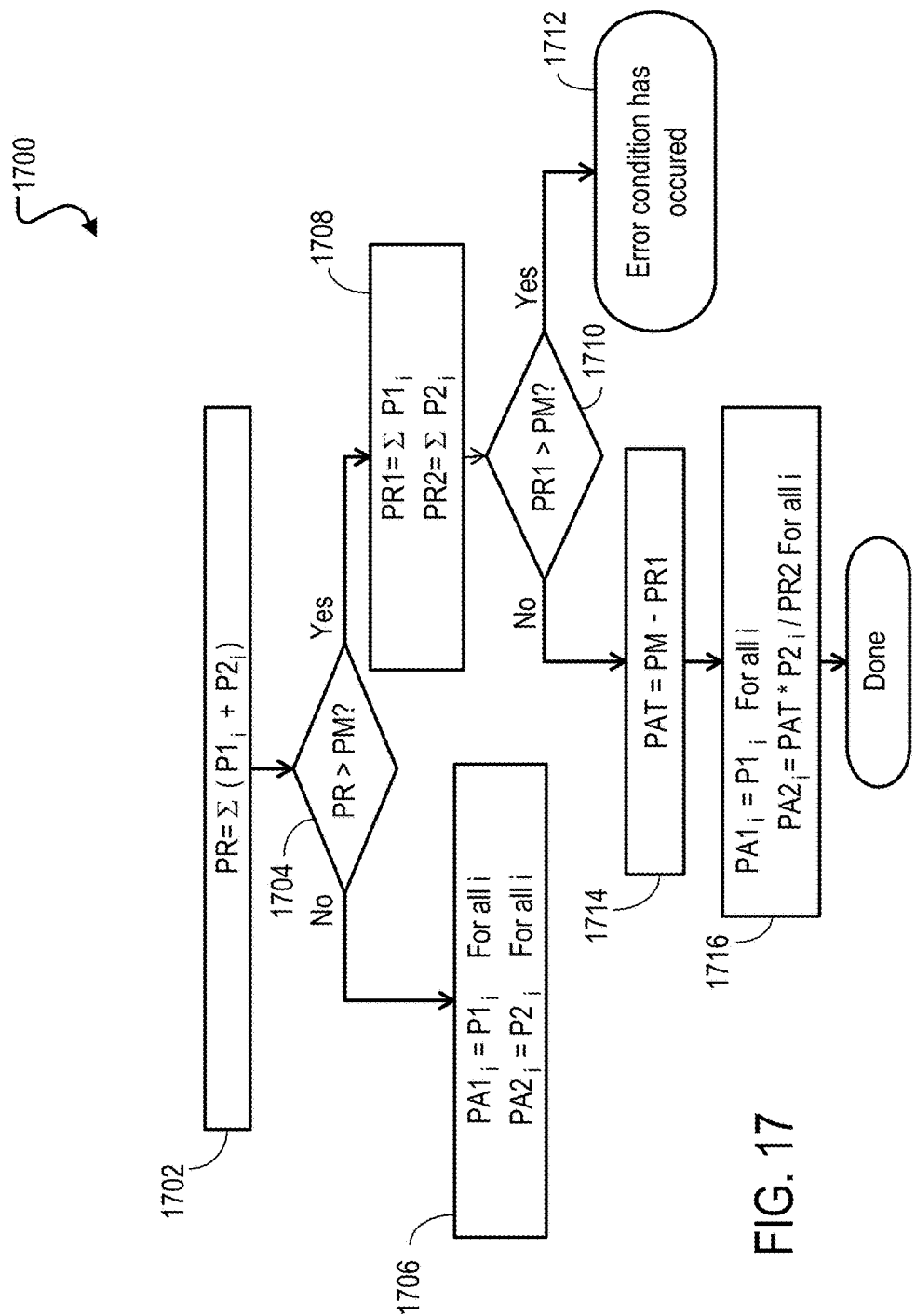
FIG. 17 illustrates an example process that may be performed to generate a mitigating power plan.

FIG. 17 illustrates an example process 1700 that may be performed to generate a mitigating power plan 1032. The process 1700 may be performed by the VHS 940 in the satellite communications system 900. Accordingly, the following sections describe the process 1700 in the context of the satellite communications system 900. However, the process 1700 also may be performed by other devices in other networks or systems.

Initially, the VHS 940 may obtain the requested beam powers 1022 and priorities of each of the beams indicated in the requested beam powers 1022. For example, the VHS 940 may obtain data that indicates beam "Beam 1" has a priority level of one indicating that the beam has a high priority, e.g., a beam to a customer that has contracted for high quality of service, and indicates beam "Beam 2" has a priority level of two indicating that the beam has low priority, e.g., a beam to a customer that has contracted for lower quality of service.

Generally, the VHS 940 may prioritize providing requested power level increases to beams with higher priority over providing requested power level increases to beams of lower priority. For example, if the satellite communications system 900 does not have enough power margin to satisfy all requested power level increases for all beams, but has enough of a power margin to satisfy power level increases requested by all beams with a priority level of one, the VHS 940 may satisfy the requested power level increases for beams with priority level one, and split the remaining power margin for beams of priority level two proportionally based on the requested power level for the beams with priority level two.

The process 1700 may initially begin with the VHS 940 calculating the total increase in power requested (PR) (1702). For example, the VHS 940 may determine that the total increase in power requested is 20 dBW. The VHS 940 may calculate the total increase in power requested based on summing all the increases in power level change requested as indicated by the requested beam powers 1022 for all beams, e.g., beams of priority level one ($P1_i$) and beams of priority level two ($P2_i$), where i represents an ith beam. For example, there may only be three beams in the requested beam powers, a first beam of a high priority level ($P1_1$) with a requested power level change of 8 dBW, a second beam of a low priority ($P2_1$) with a requested power level change of 3 dBW, and a third beam of low priority ($P2_2$) with a requested power level change of 9 dBW, and the VHS 940 may calculate a total increase in power requested of 20 dBW by summing 8 dBW from the first beam, 3 dBW from the second beam, and 9 dBW from the third beam.

The VHS 940 may determine if the total increase in power requested is greater than the power margin (PM) of the satellite communications system 900 (1704). For example, the VHS 940 may determine that the total increase in power requested of 20 dBW is great than that power margin of 16 dBW for the satellite communications system 900. In another example with a power margin of 50 dBW, the VHS 940 may determine that the total increase in power requested of 20 dBW is not greater than the power margin of 50 dBW for the satellite communications system 900.

If the VHS 940 determines that the total increase in power requested is not greater than the power margin, the VHS 940 may generate the mitigating power plan 1032 by determining that the power level change for each beam indicated by the mitigating power plan 1032 is the same as the requested power level change for each beam indicated by the requested beam powers 1022 (1706). For example, if the VHS 940 may determine that the total increase in power requested of 20 dBW is less than the power margin of 50 dBW for the satellite communications system 900, the VHS 940 may assign the power level change in the mitigating power plan 1032 for the first beam of a high priority level with a requested power level change of 8 dBW to be 8 dBW, the second beam of a low priority with a requested power level change of 3 dBW to be 3 dBW, and the third beam of low priority with a requested power level change of 9 dBW to be 9 dbW.

If the VHS 940 determines that the total increase in power requested is greater than the power margin, the VHS 940 may determine a sub-total power requested for each of the priority levels (1708). For example, the VHS 940 may sum the power requested for all of the beams with priority level one to generate a sub-total power level increase requested for beams of priority level one ($PR_1$), and sum the power requested for all of the beams with priority level two to generate a sub-total power level increase requested for beams of priority level two ($PR_2$). In particular example, the VHS 940 may determine that the sub-total power level increase requested for beams of priority level one for a single beam of priority level one with a power level change of 8 dBW is 8 dBW and determine that the sub-total power level increase requested for beams of priority level two for two beams of priority level two with power level changes of 3 dBW and 9 dbW is 12 dBW.

The VHS 940 may then determine if the sub-total power level increase requested for beams of priority level one is greater than the power margin (1710). For example, the VHS 940 may determine that the sub-total power level increase requested for beams of priority level one of 8 dBW is not greater than a power margin of 16 dBW. In another example where the sub-total power level increase requested for beams of priority level one is 30 dBW, the VHS 940 may determine that a sub-total power level increase requested for beams of priority level one of 30 dBW is greater than a power margin of 16 dBW.

If the VHS 940 determines that the sub-total power level increase requested for beams of priority level one is greater than the power margin, the VHS 940 may determines that an error condition has occurred (1712). For example, the error condition may indicate that it may not be possible for the satellite systems communications 900 to satisfy service agreements. Accordingly, the satellite systems communications 900 may notify an operator that the error condition occurs so that the operator may take action based on the error conditions, e.g., notify customers, perform emergency measures, etc.

If the VHS 940 determines that the sub-total power level increase requested for beams of priority level one is not greater than the power margin, the VHS 940 may determine a partial power margin (PAT) remaining for beams that are not of priority levels one (1714). For example, the VHS 940 may take a power margin of 16 dBW and subtract a sub-total power of 8 dBW requested for beams of priority level one to result in a partial power margin of 8 dBW.

The VHS 940 may then determine the power level change indicated by the mitigating power plan 1032 for each of the beams of priority level one to be the requested power level change for the beam indicated by the requested beam powers 1022, and determine that the power level change indicated by the mitigating power plan 1032 for each of the beams of priority level two to be the product of the partial power margin and the power level increase requested for the beam, divided by the sub-total of the power level increase requested for beams of priority level two. For example, with a partial power margin of 8 dBW, a requested power level increase of 8 dBW for a beam of a priority level of one, a requested power level increase of 3 dBW for a first beam of a priority level of two, and a requested power level increase of 9 dBW for a second beam of a priority level of two, the power level change indicated by the mitigating power plan 1032 for the beams of priority level one may be 8 dBW, the power level change indicated by the mitigating power plan 1032 for the first beam of priority level two may be 2 dBW, e.g., 8 dBW*3 dBW/(3 dBW+9 dBW), and the power level change indicated by the mitigating power plan 1032 for the second beam of priority level two may be 6 dBW, e.g., 8 dBW*9 dBW/(3 dBW+9 dBW).

While beams of only two types of priority levels are described above in process 1700, the same principles may be applied using beams that may be of more than two types of priority levels. For example, three priority levels or four priority levels may be used where requested power level changes for higher priority level beams are prioritized over requested power level changes for lower priority level beams.

Returning to FIG. 10, the VHS 940 may then generate a mitigating unified beam plan 1042 based on the mitigating power plan 1032 (1040). FIG. 18 illustrates an example mitigating unified beam plan 1042. The mitigating unified beam plan 1042 may be similar to the unified beam plan 1016, but may have beam coefficients and power levels that have been modified to mitigate fade. The mitigating unified beam plan 1042 may be a data structure that indicates beams, frequencies for the beams, mitigating beam coefficients for the beams, and mitigating power levels for the beams. For example, the mitigating unified beam plan 1042 may indicate a beam "Beam 1" at a frequency "Frequency 1," which corresponds with a beam "Beam 1" at the same frequency indicated by the unified beam plan 1016, has mitigating coefficients of "Mitigating Coefficients 1," and a power level of "Mitigating Power 1."

The VHS 940 may generate the mitigating unified beam plan 1042 based on adding the power level change for each of the beams indicated by the mitigating power plan 1032 to a clear sky power for the beams. For example, if beam "Beam 1" is indicated by the mitigating power plan 1032 as having a power level change of 8 dBW and the clear sky power for beam "Beam 1" is 50 dBW, then the VHS 940 may add 8 dBW to 50 dBW and indicate a mitigating power of 58 dBW for beam "Beam 1" in the mitigating unified beam plan 1042.

For the mitigating coefficients, the VHS 940 may consider the beam coefficients in the unified beam plan 1016, the mitigating power levels, and the new beam coefficients calculated to re-shape the beams in generating the requested beam powers, and generate the mitigating coefficients by attempting to reduce interference between beams caused by the changes in power levels and/or beam coefficients. For example, if a first beam that covers Seattle and Los Angeles and a second beam that covers Los Angeles and Las Vegas share the same frequency, increasing the power level or changing the beam coefficients of the first beam to mitigate for fade in Seattle may increase the power of the first beam for Los Angeles, which may increase interference with the second beam in Los Angeles.

Accordingly, the VHS 940 may identify the change in interference and optimize the beam coefficients to mitigate the interference. For example, the VHS 940 may change the beam coefficients for the first beam to re-shape the beam so that the gain is reduced in Los Angeles, reducing the interference of the first beam with the second beam in Los Angeles. The VHS 940 may optimize the beam coefficients to mitigate the interference based on identifying locations in the beam for which gain may be increased to offset a decrease in gain in another area for which interference is to be reduced. For example, the VHS 940 may identify that the first beam also covers San Francisco and that other beams in San Francisco can experience slightly more interference from the first beam while still satisfying minimum carrier to interference level constraints. Thus, the VHS 940 may decrease the gain of the first beam in Los Angeles by increasing the gain of the first beam in San Francisco. The VHS 940 may optimize the beam coefficients to mitigate the interference based on known techniques of direct matrix inversion, steepest descent, least mean squares, recursive least squares, minimum output energy, and constant modulus algorithm. However, in some implementations, optimizing the beam coefficients to account for changes in interference between beams may be optional.

The VHS 940 may then transmit the mitigating unified beam plan to the satellite 960 for deployment (1050). For example, the VHS 940 may provide the mitigating unified beam plan to a satellite gateway that may provide the mitigating unified beam plan to the satellite 960. The satellite 960 may then deploy the mitigating unified beam plan by adjusting transmissions based on the mitigating beam coefficients and the power level changes indicated by the mitigating unified beam plan 1042.

In some implementations, the VHS 940 may also generate information on QoS based on the mitigating unified beam plan 1042 and transmit the information to VHCs. For example, the VHS 940 may only partially account for fade for a beam of lower priority using the mitigating unified beam plan 1042 and may provide information indicating to the VHC corresponding to the beam that indicates that quality of service would have been reduced to 80% for the next hour but because of the partial mitigation of the fade, the quality of service is only reduced to 90%.

Implementations of the above techniques include one or more methods, computer program products and system. A computer program product is suitably embodied in a non-transitory machine-readable medium and includes instructions executable by one or more processors. The instructions are configured to cause the one or more processors to perform the above described actions.

A system includes one or more processors and instructions embedded in a non-transitory machine-readable medium that are executable by the one or more processors. The instructions, when executed, are configured to cause the one or more processors to perform the above described actions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (for example, a CRT (cathode ray tube) or LCD (liquid crystal display) monitor) for displaying information to the user and a keyboard and a pointing device (for example, a mouse or a trackball) by which the user can provide input to the computer. Other kinds of devices can be used to provide for interaction with a user as well; for example, feedback provided to the user can be any form of sensory feedback (for example, visual feedback, auditory feedback, or tactile feedback); and input from the user can be received in any form, including acoustic, speech, or tactile input.

The systems and techniques described here can be implemented in a computing system that includes a back end component (for example, as a data server), or that includes a middleware component (for example, an application server), or that includes a front end component (for example, a client computer having a graphical user interface or a Web browser through which a user can interact with an implementation of the systems and techniques described here), or any combination of such back end, middleware, or front end components. The components of the system can be interconnected by any form or medium of digital data communication (for example, a communication network). Examples of communication networks include a local area network ("LAN"), a wide area network ("WAN"), a satellite network and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method performed by a computer system of a satellite communications system, the method comprising:
   obtaining a beam plan that defines beams generated by a satellite that satisfy a set of communication service requirements;
   obtaining fade condition information that indicates amounts of fade at corresponding particular geographic areas covered by a beam;
   obtaining a fade mitigation plan that includes, for each of the particular geographic areas covered by the beam, a corresponding maximum amount of fade to mitigate for each particular geographic area, wherein the maximum amount of fade to mitigate for each particular geographic area covered by the beam differ between the particular geographic areas;
   determining whether the amount of fade at each particular geographic area indicated by the fade condition information exceeds the corresponding maximum amount of fade to mitigate that is included in the fade mitigation plan for each particular geographic area;
   determining, using a computer processor, a requested power for the amount of fade indicated by the fade condition information at each particular geographic area in which the amount of fade is determined not to exceed the maximum amount of fade to mitigate and a requested power for the maximum amount of fade included in the fade mitigation plan at each particular geographic area in which the amount of fade is determined to exceed the maximum amount of fade; selecting the greatest determined requested power for the amount of fade from among the multiple requested power for the amount of fade for the particular geographic areas covered by the beam as an amount of requested additional power for the beam;
   determining a modification to the beam plan based on the amount of requested additional power for the beam; and
   modifying the beam plan based on the determined modification.

2. The method of claim 1, wherein obtaining a beam plan comprises obtaining a beam plan that defines beams currently being generated by the satellite, and
   further comprising communicating the modified beam plan to the satellite such that the satellite deploys the modified beam plan in place of the beam plan.

3. The method of claim 1, wherein obtaining fade condition information comprises:
   receiving real-time weather service data; and
   generating a fade map that indicates an estimated fade at the particular geographic areas for the beam based on the real-time weather service data.

4. The method of claim 1, wherein obtaining fade condition information comprises:
   receiving quality of service measurements from users; and
   generating a fade map that indicates an estimated fade at the particular geographic areas for the beam based on the quality of service measurements from the users.

5. The method of claim 1, wherein determining a modification to the beam plan based on the amount of requested additional power for the beam comprises re-shaping the beam based on the requested additional powers for the particular geographic areas.

6. The method of claim 1, wherein determining a modification to the beam plan based on the amount of requested additional power for the beam comprises:
   balancing requested additional powers for multiple beams based on prioritizing power to beams with higher priority levels; and
   determining the modification to the beam plan based on the balanced requested additional beam powers.

7. The method of claim 1, wherein determining a modification to the beam plan based on the amount of requested additional power for the beam comprises re-shaping the beam to mitigate estimated changes in interference between another beam caused by the requested additional power for the beam.

8. The method of claim 1, wherein determining, using a computer processor,
   a requested power for the amount of fade indicated by the fade condition information at each particular geographic area in which the amount of fade is determined not to exceed the maximum amount of fade to mitigate and a requested power for the maximum amount of fade included in the fade mitigation plan at each particular geographic area in which the amount, of fade is determined to exceed the maximum amount of fade comprises:
   for each of multiple particular geographic areas covered by the beam, determining a requested power based on the respective fade condition for the each particular geographic area and a respective fade margin for each particular geographic area, and selecting the greatest determined requested power for the amount of fade from among the multiple requested power for the amount of fade for the particular geographic areas covered by the beam as an amount of requested additional power for the beam comprises:
   selecting the greatest determined requested power for the amount of fade from among the multiple requested power for the amount of fade for the particular geographic areas covered by the beam determined based on respective fade conditions and respective fade margins of the particular geographic areas.

9. A system comprising:
   a processor; and a non-transitory computer-readable medium storing instructions executable by the processor and, when executed, configured to cause the processor to perform operations comprising:
- obtaining a beam plan that defines beams generated by a satellite that satisfy a set of communication service requirements;
- obtaining fade condition information that indicates amounts of fade at corresponding particular geographic areas covered by a beam;
- obtaining a fade mitigation plan that includes, for each of the particular geographic areas covered by the beam, a corresponding maximum amount of fade to mitigate for each particular geographic area, wherein the maximum amount of fade to mitigate for each particular geographic area covered by the beam differ between the particular geographic areas;
- determining whether the amount of fade at each particular geographic area indicated by the fade condition information exceeds the corresponding maximum amount of fade to mitigate that is included in the fade mitigation plan for each particular geographic area;
- determining a requested power for the amount of fade indicated by the fade condition information at each particular geographic area in which the amount of fade is determined not to exceed the maximum amount of fade to mitigate and a requested power for the maximum amount of fade included in the fade mitigation plan at each particular geographic area in which the amount of fade is determined to exceed the maximum amount of fade;
- selecting the greatest determined requested power for the amount of fade from among the multiple requested power for the amount of fade for the particular geographic areas covered by the beam as an amount of requested additional power for the beam;
- determining a modification to the beam plan based on the amount of requested additional power for the beam; and
- modifying the beam plan based on the determined modification.

10. The system of claim 9, wherein obtaining a beam plan comprises obtaining a beam plan that defines beams currently being generated by the satellite, and
- the operations further comprise communicating the modified beam plan to the satellite such that the satellite deploys the modified beam plan in place of the beam plan.

11. The system of claim 9, further comprising the satellite.

12. The system of claim 9, wherein obtaining fade condition information comprises:
- receiving real-time weather service data; and
- generating a fade map that indicates an estimated fade at the particular geographic areas for the beam based on the real-time weather service data.

13. The system of claim 9, wherein obtaining fade condition information comprises:
- receiving quality of service measurements from users; and
- generating a fade map that indicates an estimated fade at the particular geographic areas for the beam based on the quality of service measurements from the users.

14. The system of claim 9, wherein determining a modification to the beam plan based on the amount of requested additional power for the beam comprises re-shaping the beam based on the requested additional powers for the particular geographic areas.

15. The system of claim 9, wherein determining a modification to the beam plan based on the amount of requested additional power for the beam comprises:
- balancing requested additional powers for multiple beams based on prioritizing power to beams with higher priority levels; and
- determining the modification to the beam plan based on the balanced requested additional beam powers.

16. The system of claim 9, wherein determining a modification to the beam plan based on the amount of requested additional power for the beam comprises:
- re-shaping the beam to mitigate estimated changes in interference between another beam caused by the requested additional power for the beam.

17. A non-transitory computer-readable medium storing instructions executable by a processor and, when executed, configured to cause a processor to perform operations comprising:
- obtaining a beam plan that defines beams generated by a satellite that satisfy a set of communication service requirements;
- obtaining fade condition information that indicates amounts of fade at corresponding particular geographic areas covered by a beam;
- obtaining a fade mitigation plan that includes, for each of the particular geographic areas covered by the beam, a corresponding maximum amount of fade to mitigate for each particular geographic area, wherein the maximum amount of fade to mitigate for each particular geographic area covered by the beam differ between the particular geographic areas;
- determining, whether the amount of fade at each particular geographic area indicated by the fade condition information exceeds the corresponding maximum amount of fade to mitigate that is included in the fade mitigation plan for each particular geographic area;
- determining a requested power for the amount of fade indicated by the fade condition information at each particular geographic area in which the amount of fade is determined not to exceed the maximum amount of fade to mitigate and a requested power for the maximum amount of fade included in the fade mitigation plan at each particular geographic area in which the amount of fade is determined to exceed the maximum amount of fade;
- selecting the greatest determined requested power for the amount of fade from among the multiple requested power for the amount of fade for the particular geographic areas covered by the beam as an amount of requested additional power for the beam;
- determining a modification to the beam plan based on the amount of requested additional power for the beam; and
- modifying the beam plan based on the determined modification.

* * * * *

UNITED STATES PATENT AND TRADEMARK OFFICE
CERTIFICATE OF CORRECTION

PATENT NO. : 9,748,989 B1  
APPLICATION NO. : 14/194085  
DATED : August 29, 2017  
INVENTOR(S) : Jeffrey Freedman et al.

Page 1 of 1

It is certified that error appears in the above-identified patent and that said Letters Patent is hereby corrected as shown below:

In the Specification

Column 1, Line 15 (approx.), delete "MANAGEMENT."All" and insert -- MANAGEMENT". All --, therefor.

In the Claims

In Claim 17, Column 62, Line 37, delete "determining," and insert -- determining --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*